United States Patent
Kim et al.

(10) Patent No.: US 11,154,159 B2
(45) Date of Patent: Oct. 26, 2021

(54) BEVERAGE-MAKING APPARATUS

(71) Applicant: LG ELECTRONICS INC., Seoul (KR)

(72) Inventors: Heeyeon Kim, Seoul (KR); Sunyoung Park, Seoul (KR); Chungook Chong, Seoul (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 15/999,608

(22) Filed: Aug. 20, 2018

(65) Prior Publication Data

US 2019/0008315 A1    Jan. 10, 2019

Related U.S. Application Data

(63) Continuation of application No. 15/598,941, filed on May 18, 2017.

(Continued)

(30) Foreign Application Priority Data

Aug. 19, 2016 (KR) ........................ 10-2016-0105790

(51) Int. Cl.
| | |
|---|---|
| *C12C 11/00* | (2006.01) |
| *A47J 31/46* | (2006.01) |
| *A47J 31/60* | (2006.01) |
| *A47J 31/44* | (2006.01) |
| *C12C 3/00* | (2006.01) |

(Continued)

(52) U.S. Cl.
CPC ......... *A47J 31/465* (2013.01); *A47J 31/4403* (2013.01); *A47J 31/60* (2013.01); *C12C 7/00* (2013.01); *C12C 7/28* (2013.01); *C12C 9/00* (2013.01); *C12C 11/00* (2013.01); *C12C 11/07* (2013.01)

(58) Field of Classification Search
CPC ....... C12C 11/00; C12C 11/07; C12C 11/003; C12C 11/006; C12C 13/00; C12C 13/02; C12H 3/00
USPC .......................................... 99/276, 277, 278
See application file for complete search history.

(56) References Cited

U.S. PATENT DOCUMENTS

| | | | |
|---|---|---|---|
| 2,333,154 | A | 11/1943 | De Markus |
| 2,521,397 | A | 9/1950 | Muller |

(Continued)

FOREIGN PATENT DOCUMENTS

| | | |
|---|---|---|
| CN | 2185267 | 12/1994 |
| CN | 2275582 | 3/1998 |

(Continued)

OTHER PUBLICATIONS

European Office Action in European Appln. No. 17171788.7, dated Aug. 3, 2017, 6 pages.

(Continued)

*Primary Examiner* — Reginald Alexander
(74) *Attorney, Agent, or Firm* — Fish & Richardson P.C.

(57) ABSTRACT

A beverage-making apparatus includes a water supply heater configured to heat water; an ingredient supplier connected to the water supply heater through a water supply channel; a container connected to the ingredient supplier through a first channel; a first valve configured to regulate a flow through the first channel; and a beverage extractor connected to the first channel at a location between the ingredient supplier and the first valve.

4 Claims, 31 Drawing Sheets

Related U.S. Application Data

(60) Provisional application No. 62/338,498, filed on May 18, 2016.

(51) Int. Cl.
*C12C 7/00* (2006.01)
*C12C 7/28* (2006.01)
*C12C 11/07* (2006.01)

(56) References Cited

U.S. PATENT DOCUMENTS

| | | |
|---|---|---|
| 3,032,182 A | 5/1962 | Bechtold |
| 3,207,606 A | 9/1965 | Williams |
| 3,415,654 A | 12/1968 | Zinn |
| 3,433,148 A | 3/1969 | Sho Takayanagi |
| 3,486,437 A | 12/1969 | Bazhenov et al. |
| 3,524,402 A | 8/1970 | Bosewitz et al. |
| 3,834,296 A | 9/1974 | Kehse et al. |
| 3,875,303 A | 4/1975 | Hieber |
| 3,926,342 A | 12/1975 | Selvia et al. |
| 3,946,780 A | 3/1976 | Sellers |
| 4,002,111 A | 1/1977 | Pujol |
| 4,009,286 A | 2/1977 | Moll et al. |
| 4,021,579 A | 5/1977 | Barrett |
| 4,064,015 A | 12/1977 | Nyiri et al. |
| 4,233,407 A | 11/1980 | Seebeck et al. |
| 4,329,433 A | 5/1982 | Seebeck et al. |
| 4,353,293 A | 10/1982 | Illy |
| 4,388,857 A | 6/1983 | Korek |
| 4,494,451 A | 1/1985 | Hickey |
| 4,557,186 A | 12/1985 | Brown |
| 4,581,239 A | 4/1986 | Woolman et al. |
| 4,615,887 A | 10/1986 | Hickinbotham |
| 4,626,437 A | 12/1986 | Schobinger et al. |
| 4,652,451 A | 3/1987 | Leedham et al. |
| 4,653,388 A * | 3/1987 | Wilkinson ............... C12C 7/22 99/277.2 |
| 4,708,938 A | 11/1987 | Hickinbotham |
| 4,754,698 A | 7/1988 | Naish |
| 4,801,462 A | 1/1989 | Tonna |
| 4,810,505 A | 3/1989 | Pachernegg |
| 4,813,346 A | 3/1989 | Widhopf |
| 4,814,189 A | 3/1989 | Laude-Bousquet |
| 4,852,781 A | 8/1989 | Shurnik et al. |
| 4,856,421 A | 8/1989 | Whitford |
| 5,364,639 A | 11/1994 | MacLennan et al. |
| 5,365,830 A | 11/1994 | MacLennan et al. |
| 5,497,694 A | 3/1996 | Klein |
| 5,618,572 A | 4/1997 | Tripp et al. |
| 5,690,020 A | 11/1997 | Kitani et al. |
| 5,718,161 A | 2/1998 | Beadle |
| 5,731,981 A | 3/1998 | Simard |
| 5,992,300 A | 11/1999 | Fukushima |
| 6,032,571 A | 3/2000 | Brous et al. |
| 6,045,852 A | 4/2000 | Talley |
| 6,082,247 A | 7/2000 | Beaulicu |
| 6,130,990 A | 10/2000 | Herrick et al. |
| 6,142,063 A | 11/2000 | Beaulieu et al. |
| 6,631,732 B1 | 10/2003 | Koster et al. |
| 6,752,069 B1 | 6/2004 | Burke et al. |
| 6,827,238 B2 | 12/2004 | Barker et al. |
| 6,871,579 B2 | 3/2005 | Belkin et al. |
| 7,311,224 B2 | 12/2007 | Emmendoerfer et al. |
| 7,735,412 B2 | 6/2010 | Burdick |
| 8,101,217 B2 | 1/2012 | Sovereign et al. |
| 8,141,477 B2 | 3/2012 | Broderick |
| 8,156,857 B2 | 4/2012 | Vason |
| 8,528,758 B2 | 9/2013 | Morlot et al. |
| 8,586,117 B2 | 11/2013 | Vastardis et al. |
| 8,601,936 B2 | 12/2013 | Williams et al. |
| 8,692,165 B2 | 4/2014 | Geockner et al. |
| 9,228,163 B1 | 1/2016 | Mitchell et al. |
| 9,241,497 B2 | 1/2016 | Luchansky et al. |
| 9,422,514 B2 | 8/2016 | Plutshack |
| 9,499,333 B2 | 11/2016 | Magniet et al. |
| 9,598,232 B2 | 3/2017 | Flick |
| 9,719,060 B1 | 8/2017 | MacLennan et al. |
| 9,776,789 B2 | 10/2017 | Talon |
| 9,833,103 B2 | 12/2017 | Talon |
| 10,070,751 B2 | 9/2018 | Magniet et al. |
| 10,343,839 B2 | 7/2019 | Talon |
| 10,448,778 B2 | 10/2019 | Watson et al. |
| 10,486,953 B2 | 11/2019 | Pellaud et al. |
| 2002/0088826 A1 | 7/2002 | Barker et al. |
| 2004/0004007 A1 | 1/2004 | Orolin et al. |
| 2004/0139697 A1 | 7/2004 | Reddy et al. |
| 2004/0194629 A1 | 10/2004 | Jones et al. |
| 2005/0126401 A1 | 6/2005 | Streeter et al. |
| 2005/0260554 A1 | 11/2005 | Gaalswyk |
| 2006/0000851 A1 | 1/2006 | Girard et al. |
| 2006/0005712 A1 | 1/2006 | Greenwald et al. |
| 2006/0006055 A1 | 1/2006 | Bonde |
| 2006/0102008 A1 | 5/2006 | Lin |
| 2006/0138177 A1 | 6/2006 | Wauters et al. |
| 2006/0196363 A1 | 9/2006 | Rahn |
| 2006/0266223 A1 | 11/2006 | Hammad et al. |
| 2006/0266224 A1 | 11/2006 | Hammad et al. |
| 2006/0266225 A1 | 11/2006 | Hammad |
| 2007/0266713 A1 | 11/2007 | Matveev et al. |
| 2008/0011597 A1 | 1/2008 | Spani |
| 2008/0185405 A1 | 8/2008 | Murray |
| 2009/0007792 A1 | 1/2009 | Glucksman et al. |
| 2009/0120299 A1 | 5/2009 | Rahn et al. |
| 2009/0136639 A1 | 5/2009 | Doglioni Majer |
| 2009/0155422 A1 | 6/2009 | Ozanne |
| 2009/0183637 A1 | 7/2009 | Nijboer et al. |
| 2009/0285971 A1 | 11/2009 | Broderick |
| 2009/0320693 A1 | 12/2009 | Ozanne |
| 2010/0003371 A1 | 1/2010 | Ozanne et al. |
| 2010/0018404 A1 | 1/2010 | Villa et al. |
| 2010/0047386 A1 | 2/2010 | Tatera |
| 2010/0124583 A1 | 5/2010 | Medoff |
| 2010/0129490 A1 | 5/2010 | Williams et al. |
| 2010/0163113 A1 | 7/2010 | Bax |
| 2010/0314412 A1 | 12/2010 | Kadyk et al. |
| 2011/0003355 A1 | 1/2011 | Clark et al. |
| 2011/0036244 A1 | 2/2011 | Chatterjee et al. |
| 2011/0041701 A1 | 2/2011 | Chatterjee et al. |
| 2011/0094388 A1 | 4/2011 | Stanley et al. |
| 2011/0119843 A1 | 5/2011 | Nikitczuk et al. |
| 2011/0142376 A1 | 6/2011 | Morlot et al. |
| 2011/0226343 A1 | 9/2011 | Novak et al. |
| 2011/0271843 A1 | 11/2011 | Cheng et al. |
| 2011/0277633 A1 | 11/2011 | Sonnek et al. |
| 2012/0067223 A1 | 3/2012 | Vuagniaux et al. |
| 2012/0156336 A1 | 6/2012 | Hansen et al. |
| 2012/0187153 A1 | 7/2012 | Burge et al. |
| 2012/0305597 A1 | 12/2012 | Larzul et al. |
| 2012/0318148 A1 | 12/2012 | MacDonald et al. |
| 2013/0129260 A1 | 5/2013 | Pellingra et al. |
| 2013/0129885 A1 | 5/2013 | Doglioni Majer |
| 2013/0177677 A1 | 7/2013 | Ozanne et al. |
| 2013/0199376 A1 | 8/2013 | Rule |
| 2013/0209636 A1 | 8/2013 | Cominelli et al. |
| 2013/0236609 A1 | 9/2013 | Magniet et al. |
| 2013/0276635 A1 | 10/2013 | Favero et al. |
| 2014/0013958 A1 | 1/2014 | Krasne et al. |
| 2014/0017354 A1 | 1/2014 | Joseph et al. |
| 2014/0130679 A1 | 5/2014 | Baldo et al. |
| 2014/0144328 A1 | 5/2014 | Greene et al. |
| 2014/0150666 A1 | 6/2014 | Fin et al. |
| 2014/0199443 A1 | 7/2014 | Norton et al. |
| 2014/0234482 A1 | 8/2014 | Kempfert |
| 2014/0272019 A1 | 9/2014 | Schuh et al. |
| 2014/0287104 A1 | 9/2014 | Austin et al. |
| 2014/0331868 A1 | 11/2014 | Novak et al. |
| 2014/0332364 A1 | 11/2014 | Lusk et al. |
| 2014/0339270 A1 | 11/2014 | Johnson |
| 2014/0360376 A1 | 12/2014 | Evanko et al. |
| 2015/0000530 A1 | 1/2015 | Mitchell et al. |
| 2015/0000531 A1 | 1/2015 | Mitchell et al. |
| 2015/0000532 A1 | 1/2015 | Mitchell et al. |
| 2015/0027315 A1 | 1/2015 | Lussi et al. |
| 2015/0140628 A1 | 5/2015 | Norkin et al. |

(56) References Cited

U.S. PATENT DOCUMENTS

| | | |
|---|---|---|
| 2015/0164263 A1 | 6/2015 | Cross et al. |
| 2015/0203801 A1 | 7/2015 | Perez Narcue et al. |
| 2015/0246768 A1 | 9/2015 | Talon |
| 2015/0266665 A1 | 9/2015 | Flick |
| 2015/0282663 A1 | 10/2015 | Talon |
| 2015/0322390 A1 | 11/2015 | Jones |
| 2015/0329808 A1 | 11/2015 | Ramsey |
| 2016/0023879 A1 | 1/2016 | Walker |
| 2016/0037963 A1 | 2/2016 | Tuchrelo et al. |
| 2016/0045059 A1 | 2/2016 | Cross et al. |
| 2016/0073673 A1 | 3/2016 | Schuh et al. |
| 2016/0194586 A1 | 7/2016 | Nordkvist et al. |
| 2016/0201018 A1 | 7/2016 | Watson et al. |
| 2016/0242591 A1 | 8/2016 | Rubin et al. |
| 2016/0270580 A1 | 9/2016 | Smith |
| 2016/0326471 A1 | 11/2016 | Aown et al. |
| 2017/0020328 A1 | 1/2017 | Magniet et al. |
| 2017/0035235 A1 | 2/2017 | Kollep et al. |
| 2017/0135518 A1 | 5/2017 | Flick |
| 2017/0240400 A1 | 8/2017 | Pellaud et al. |
| 2017/0240411 A1 | 8/2017 | Pellaud et al. |
| 2017/0355516 A1 | 12/2017 | Talon |
| 2018/0132650 A1 | 5/2018 | Affolter et al. |
| 2018/0146819 A1 | 5/2018 | Kuang |

FOREIGN PATENT DOCUMENTS

| | | |
|---|---|---|
| CN | 2320624 | 5/1999 |
| CN | 1349475 | 5/2002 |
| CN | 2510497 | 9/2002 |
| CN | 2651253 | 10/2004 |
| CN | 1749385 | 3/2006 |
| CN | 201074230 | 6/2008 |
| CN | 101215496 | 7/2008 |
| CN | 201224723 | 4/2009 |
| CN | 101454238 | 6/2009 |
| CN | 101839471 | 9/2010 |
| CN | 102083703 | 6/2011 |
| CN | 202051535 | 11/2011 |
| CN | 102574673 | 7/2012 |
| CN | 202610213 | 12/2012 |
| CN | 103013728 | 4/2013 |
| CN | 103221320 | 7/2013 |
| CN | 103848386 | 6/2014 |
| CN | 104120055 | 10/2014 |
| CN | 204162692 | 2/2015 |
| CN | 204265732 | 4/2015 |
| CN | 104703517 | 6/2015 |
| CN | 104703518 | 6/2015 |
| CN | 104703894 | 6/2015 |
| CN | 105008511 | 10/2015 |
| CN | 105142470 | 12/2015 |
| CN | 105339483 | 2/2016 |
| CN | 205774431 | 12/2016 |
| DE | 29618312 | 11/1996 |
| DE | 202015106465 | 12/2015 |
| EP | 1847591 | 10/2007 |
| EP | 2061865 | 5/2009 |
| EP | 2856917 | 4/2015 |
| EP | 3000777 | 3/2016 |
| EP | 3000778 | 3/2016 |
| EP | 3406540 A1 | 11/2018 |
| EP | 3578481 A1 | 12/2019 |
| GB | 274225 | 7/1927 |
| GB | 2077759 | 12/1981 |
| GB | 2335902 | 10/1999 |
| JP | 05032293 | 2/1993 |
| JP | H0779673 | 8/1995 |
| JP | 2000255696 | 9/2000 |
| JP | 2001120253 | 5/2001 |
| JP | 2002225991 | 8/2002 |
| KR | 200319526 | 7/2003 |
| KR | 20-0325551 | 9/2003 |
| KR | 20-0343143 | 2/2004 |
| KR | 1020060114066 | 11/2006 |
| KR | 1020060129579 | 12/2006 |
| KR | 100793354 | 1/2008 |
| KR | 100813648 | 3/2008 |
| KR | 10-2008-0041245 | 5/2008 |
| KR | 10-0942169 | 2/2010 |
| KR | 20150065577 | 6/2015 |
| KR | 20150067340 | 6/2015 |
| KR | 1020150091955 | 8/2015 |
| KR | 1020150092025 | 8/2015 |
| KR | 20160018206 | 2/2016 |
| KR | 20160031626 | 3/2016 |
| KR | 1020160182006 | 7/2018 |
| WO | WO199850521 | 11/1998 |
| WO | WO1999050383 | 10/1999 |
| WO | WO2009017428 | 2/2009 |
| WO | WO2015173127 | 11/2015 |
| WO | WO2016016074 | 2/2016 |
| WO | WO2016023726 | 2/2016 |

OTHER PUBLICATIONS

U.S. Office Action in U.S. Appl. No. 15/598,555, dated Mar. 21, 2019, 11 pages.

U.S. Office Action in U.S. Appl. No. 15/598,508, dated Jan. 23, 2019, 31 pages.

CN Office Action in Chinese Appln. No. 201710342839.7, dated Apr. 7, 2020, 11 pages (with English translation).

KR Office Action in Korean Appln. No. 10-2020-0052651, dated Oct. 30, 2020, 10 pages (with English translation).

U.S. Final Office Action in U.S. Appl. No. 15/598,508, dated Apr. 20, 2020, 10 pages.

U.S. Final Office Action in U.S. Appl. No. 15/598,809, dated Mar. 4, 2020, 41 pages.

U.S. Office Action in U.S. Appl. No. 15/598,508, dated Sep. 21, 2020, 4 pages.

U.S. Office Action in U.S. Appl. No. 15/598,809, dated Sep. 4, 2020, 28 pages.

European Search Report in European Appln. No. 17171788.7, dated Aug. 3, 2017, 6 pages.

Chinese Office Action in Chinese Appln. No. 2017-10342772.7, dated Apr. 7, 2020, 33 pages (with English translation).

Chinese Office Action in Chinese Application No. 201710342839.7, dated Apr. 7, 2020, 16 pages (with English translation).

Chinese Office Action in Chinese Application No. 201710343669.4, dated Apr. 7, 2020, 14 pages (with English translation).

Extended European Search Report in European Application No. 17171791.1, dated Aug. 3, 2017, 3 pages.

Korean Office Action in Korean Application No. 2016-0105794, dated Jul. 3, 2019, 16 pages (with English translation).

Korean Office Action in Korean Application No. 2016-0105794, dated Oct. 31, 2019, 46 pages (with English translation).

Korean Office Action in Korean Application No. 2020-0053898, dated Oct. 30, 2019, 47 pages (with English translation).

Pack "A number of individual components packaged as a unit (Noun)" https://www.merriam-webster.com/dictionary/pack?src=search-dict-box, 3 pages.

United States Office Action in U.S. Appl. No. 15/598,941, dated Feb. 5, 2020, 13 pages.

United States Office Action in U.S. Appl. No. 16/680,188, dated Jun. 24, 2020, 25 pages.

United States Office Action in U.S. Appl. No. 15/598,617, dated May 1, 2019, 15 pages.

Erniegraves, "What Type of Flow Measurement is Best?," Erniegraves Process Measurement & Control, Feb. 10, 2016, 3 pages.

Hunter Industries, "Winterizing Your Irrigation System," dated Jun. 29, 2012, 6 pages.

United States Office Action in U.S. Appl. No. 15/598,941, dated Aug. 1, 2019, 43 pages.

United States Office Action in U.S. Appl. No. 15/598,809, dated Aug. 22, 2019, 48 pages.

Chinese Office Action in Chinese Appln. No. 201710343208.7, dated Apr. 3, 2020, 14 pages (with English translation).

Chinese Office Action in Chinese Appln. No. 201310343666.0, dated Aug. 12, 2020, 8 pages (with English translation).

(56) References Cited

OTHER PUBLICATIONS

Chinese Office Action in Chinese Appln. No. 201710342839.7, dated Aug. 21, 2020, 13 pages (with English translation).
Korean Notice of Allowance in Korean Application No. 10-2020-0052651, dated Apr. 21, 2021, 7 pages (with English translation).
United States Final Office Action in U.S. Appl. No. 15/598,508, dated May 3, 2021, 34 pages.
United States Office Action in U.S. Appl. No. 16/680,188, dated Jan. 26, 2019, 35 pages.

\* cited by examiner

BEVERAGE-MAKING APPARATUS

CROSS-REFERENCE TO RELATED APPLICATIONS

This application is a continuation of U.S. application Ser. No. 15/598,941, filed on May 18, 2017, which claims the benefit of an earlier filing date and right of priority under 35 U.S.C. 119 and 365 to U.S. Provisional Application No. 62/338,498 filed on May 18, 2016 and Korean Patent Application No. 10-2016-0105790, filed on Aug. 19, 2016 in the Korean Intellectual Property Office, the disclosures of which are incorporated herein by reference.

TECHNICAL FIELD

The present disclosure relates to a beverage making apparatus.

BACKGROUND

Various types of beverages are made via fermentation. Such beverages are typically made using various ingredients that are combined and fermented to yield the resulting beverage. As an example, beer is an alcoholic beverage that is brewed by filtering wort, adding hops to the wort, and then fermenting the resulting wort mixture with yeast. Wort is typically made with malt, which is made from germinated barley.

Materials for brewing beer typically include water, malt, hops, yeast, fragrance additives, and the like. The yeast is often referred to as leaven, and is typically added to malt to induce fermentation. The yeast may also facilitate the generation of alcohol and carbonic acid. In some scenarios, fragrance additives are added that improve the taste of beer, such as fruit, syrup, and vanilla bean additives.

SUMMARY

Implementations described herein provide a beverage making apparatus.

In one aspect, a beverage-making apparatus includes a water supply heater configured to heat water; an ingredient supplier connected to the water supply heater through a water supply channel; a container connected to the ingredient supplier through a first channel; a first valve configured to regulate a flow through the first channel; and a beverage extractor connected to the first channel at a location between the ingredient supplier and the first valve.

In some implementations, the beverage extractor includes a beverage extraction channel connected to the first channel; and a beverage extraction valve configured to regulate a flow through the beverage extraction channel.

In some implementations, the beverage-making apparatus further includes at least one processor configured to control the first valve to open the first channel in a state in which the beverage extraction channel is closed by the beverage extraction valve.

In some implementations, the beverage-making apparatus further includes at least one processor configured to control the first valve to close the first channel in a state in which the beverage extraction channel is opened by the beverage extraction valve.

In some implementations, the beverage-making apparatus further includes at least one processor configured to activate the water supply heater in a cleaning mode of the beverage-making apparatus.

In some implementations, the beverage-making apparatus includes at least one processor configured to activate the water supply heater in a cleaning mode of the beverage-making apparatus, and in a state in which the water supply heater is activated, deactivate the water supply heater after a threshold duration of time.

In some implementations, the beverage-making apparatus further includes a water tank configured to hold water therein; a water supply pump configured to pump the water out of the water tank towards the water supply heater; and at least one processor configured to activate the water supply pump in a cleaning mode of the beverage-making apparatus.

In some implementations, the beverage-making apparatus further includes a flow meter configured to measure a flow rate of water introduced into the water supply heater, the flow meter provided in a water supply pump outlet channel that connects the water supply pump and the water supply heater. The at least one processor is further configured to activate the water supply heater based on the flow rate measured by the flow meter being within a first range of flow rate values and based on activation of a cleaning mode of the beverage-making apparatus.

In some implementations, the beverage-making apparatus further includes a thermistor configured to measure a temperature of the water that is heated by the water supply heater, the thermistor provided in at least one of the water supply channel or the water supply heater. The at least one processor is further configured to, based on a first duration of time elapsing after a determination that the temperature measured by the thermistor is within a first range of temperature values, deactivate the water supply heater.

In some implementations, the beverage-making apparatus further includes: a bypass channel connected to the water supply channel and to the first channel by bypassing the ingredient supplier; a bypass valve configured to regulate a flow through the bypass channel; and at least one processor configured to open the bypass valve in a cleaning mode of the beverage-making apparatus.

In some implementations, the beverage-making apparatus further includes an air injector includes an air injection channel connected to the water supply channel; an air injection pump configured to pump air into the air injection channel; and at least one processor configured to activate the air injection pump during a water discharging mode.

In some implementations, the at least one processor is further configured to: based on the air injection pump being activated and based on a first duration of time elapsing, deactivate the air injection pump.

In some implementations, the beverage-making apparatus further includes a pack accommodated in the container; and a gas discharger configured to discharge gas from inside the pack to an outside of the pack. The gas discharger includes a gas extraction channel connected to the container; and a gas extraction valve configured to regulate a flow through the gas extraction channel.

In some implementations, the beverage-making apparatus further includes an air pump connected the container through an air supply channel, the air pump configured to supply air in a space between an inside wall of the container and an outside surface of the pack accommodated inside the container.

In some implementations, the beverage-making apparatus further includes at least one processor configured to, in a cleaning mode of the beverage-making apparatus: open the first valve based on the beverage extraction channel being closed by the beverage extraction valve; and open the gas extraction valve; and based on the cleaning mode of the beverage-making apparatus being completed, activate the air pump.

In some implementations, the beverage-making apparatus further includes: a water tank configured to hold water therein; a water supply pump configured to pump the water out of the water tank towards the water supply heater; and at least one processor configured to, in a cleaning mode of the beverage-making apparatus: activate the water supply pump; in a first cleaning step, open the first valve and activate the water supply heater and the water supply pump based on the beverage extraction channel being closed by the beverage extraction valve, and in a second cleaning step performed after the first cleaning step, close the first valve and activate the water supply heater and the water supply pump based on the beverage extraction channel being opened by the beverage extraction valve.

In some implementations, the at least one processor is further configured to: open the first valve in a third cleaning step performed between the first cleaning step and the second cleaning step, and close the first valve in a fourth cleaning step performed after the third cleaning step.

In some implementations, the beverage-making apparatus further includes a flow meter configured to measure a flow rate of water introduced into the water supply heater, the flow meter provided in a water supply pump outlet channel connecting the water supply pump and the water supply heater. The at least one processor is further configured to, in the first cleaning step and the second cleaning step, activate the water supply heater based on a flow rate measured by the flow meter being within a predetermined flow rate range.

In some implementations, the beverage-making apparatus further includes a thermistor configured to measure a temperature of the water heated by the water supply heater, the thermistor provided in at least one of the water supply channel or the water supply heater. The at least one processor is further configured to, in the first cleaning step and in the second cleaning step, deactivate the water supply heater based on first duration of time elapsing after a determination that the temperature measured by the thermistor is within a first range of temperature values.

In some implementations, the beverage-making apparatus further includes: a pack accommodated in the container; a gas discharger configured to discharge gas from inside the pack to an outside of the pack; and an air pump connected to the container through an air supply channel, the air pump configured to supply air in a space between an inside wall of the container and an outside surface of the pack mounted inside the container. The gas discharger includes: a gas extraction channel connected to the container; and a gas extraction valve configured to regulate a flow through the gas extraction channel, and at least one processor configured to: open the gas extraction valve in the first cleaning step and in the third cleaning step; and based on a first duration of time elapsing after the third cleaning step is initiated, deactivate the water supply pump and activate the air pump.

Further scope of applicability of the present disclosure will become apparent from the detailed description given hereinafter. However, it should be understood that the detailed description and specific examples, while indicating some implementations of the disclosure, are given by illustration only, since various changes and modifications within the spirit and scope of the disclosure may be made.

DETAILED DESCRIPTION

The present disclosure relates to a beverage-making apparatus configured to brew a beverage, and more particularly, to a beverage maker configured to clean and sterilize the inside thereof.

Some implementations also provide a beverage maker configured to perform cleansing and sterilization using components that are utilized to brew a beverage. As such, the beverage maker need not necessarily implement separate components for the cleansing and sterilization process.

In some implementations, water introduced into a water supply channel flows in an ingredient supplier and a main channel, so that the inside of the ingredient supplier and the channels may be cleansed and sterilized.

Further, in some implementations, cleansing and sterilization may be performed using only components required to brew beverage.

Further, in some implementations, the water flowing in the main channel is introduced into a container, which may be a fermentation tank assembly, so that channels used when beverage is brewed may be cleansed and sterilized.

Further, in some implementations, the water flowing in the main channel may be discharged to the outside through a beverage extraction channel, so that channels used for extracting a beverage may also be sterilized and cleansed.

Some of the examples below describe a scenario in which the beverage-making apparatus is specifically a beer-making apparatus. However, implementations are not limited therefore, and may be implemented as any suitable beverage making apparatus that utilizes fermentation.

Figure 1:
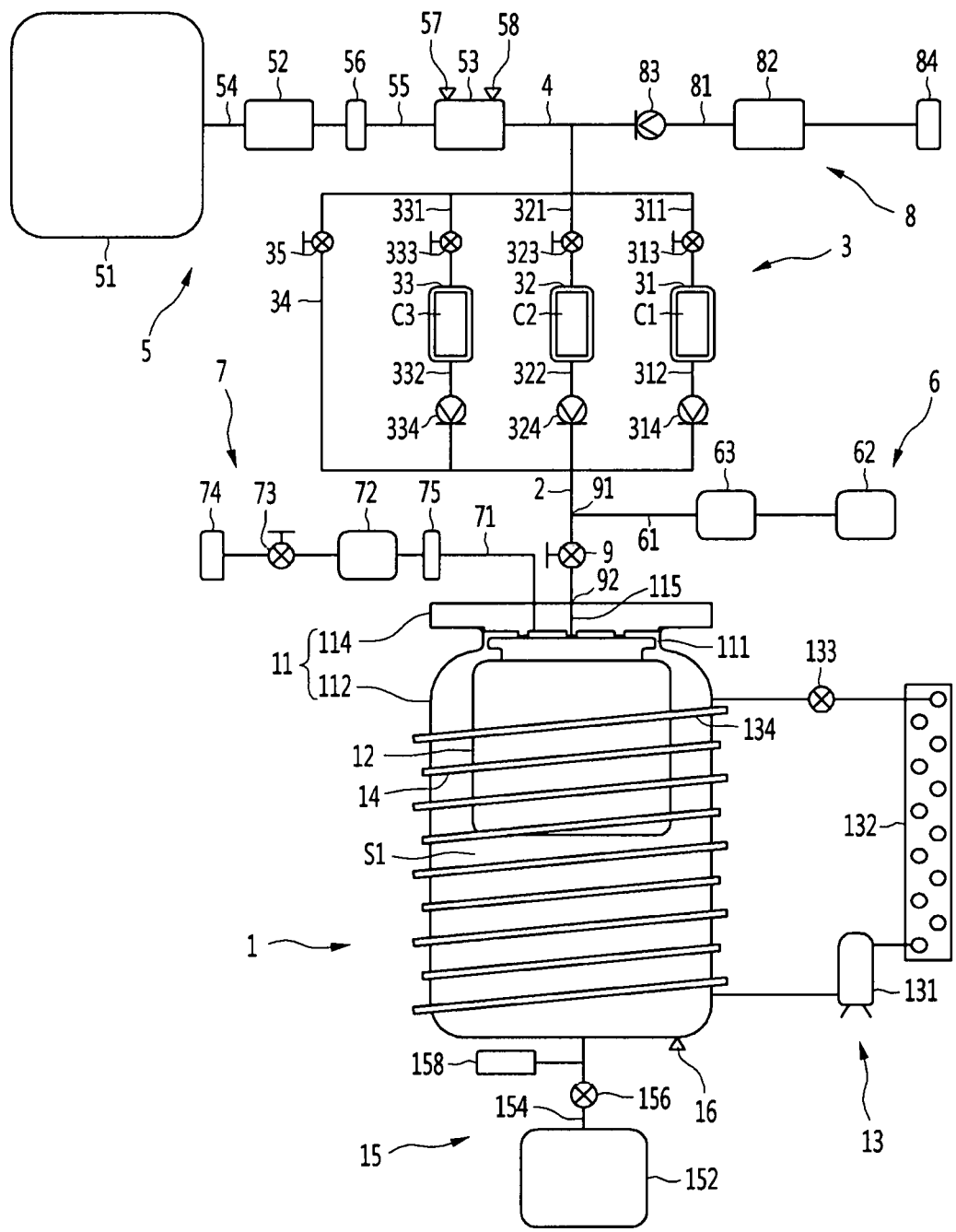
FIG. 1 is a diagram illustrating an example of a beverage maker according to some implementations.

FIG. 1 is an entire configuration view of a beverage maker according to an implementation.

The beverage making apparatus, as shown in FIG. 1, may include a fermentation module 1, an ingredient supplier 3 (or simply, supplier 3) connected to the fermentation module 1 through a main channel 2 (also referred to as main flow path 2), a water supply module 5 connected to the supplier 3 through a water supply channel 4 (also referred to as water supply flow path 4), and a beverage extractor 6 that allows a beverage fermented in the fermentation module 1 to be extracted to the outside.

The fermentation module 1 includes a container, for example fermentation tank assembly 11, having a space S1 formed therein. The container may include a container body, such as fermentation tank 112, and a container cover, such as fermentation tank cover 114.

In the example of FIG. 1, the fermentation tank assembly 11 includes a fermentation tank 112 has an opening 111 formed at an upper portion thereof, the fermentation tank 112 having the space S1 formed therein, and a fermentation tank cover 114 covering the opening 111.

The fermentation tank 112 may be configured as an assembly of a plurality of members.

The fermentation tank cover 114 is used to seal the inside of the fermentation tank 112, and may be disposed at an upper portion of the fermentation tank 112 to cover the opening 111. A main flow path connecting part 115 connected to the main flow path 2 may be formed in the fermentation tank cover 114.

In addition, the fermentation module 1 may further include a removable beverage ingredient pack 12 that holds at least some of the ingredients for making the beverage. As shown in the example of FIG. 1, the beverage ingredient pack 12 may be a beverage ingredient pack that is inserted and accommodated in the fermentation tank assembly 11.

In this example, the beverage ingredient pack 12 may be a pack in which materials for brewing a beverage are accommodated. The following description will focus on the scenario of a beverage brewing pack 12 as the beverage ingredient pack, although implementations may be applied to any suitable beverage ingredient pack utilized for fermentation.

The beverage brewing pack 12 may be formed smaller than the space S1 formed in the fermentation tank assembly 11. The beverage brewing pack 12 may be inserted and accommodated in the fermentation tank assembly 11 in a state in which the materials are accommodated therein. The beverage brewing pack 12 may be inserted into the fermentation tank 112 to be accommodated in the fermentation tank 112 in a state in which the opening 111 of the fermentation tank 112 is opened. The fermentation tank cover 114 may cover the opening 111 of the fermentation tank 112 after the beverage brewing pack 12 is inserted into the fermentation tank 112. The beverage brewing pack 12 may assist the materials to be fermented in a state in which the beverage brewing pack 12 is accommodated in the space S1 sealed by the fermentation tank 112 and the fermentation tank cover 114. The beverage brewing pack 12 may be expanded by a pressure therein while the beverage is being brewed.

As an example, in the case where the beverage is beer, the materials for brewing the beer may include water, malt, yeast, hops, fragrance additives, and the like.

The beverage maker may include both of the supplier 3 and the beverage ingredient pack 12, and the materials for brewing the beverage may be distributed and accommodated in the supplier 3 and the beverage ingredient pack 12. Some materials among the materials for brewing the beverage may be accommodated in the beverage ingredient pack 12, and the other materials may be accommodated in the supplier 3. The other materials accommodated in the supplier 3 may be supplied to the beverage ingredient pack 12 together with water supplied from the water supply module 5, and be mixed with the materials accommodated in the beverage ingredient pack 12.

A main material essential to brew the beverage may be accommodated in the beverage ingredient pack 12, and additives added to the main material may be accommodated in the supplier 3. In this case, the additives accommodated in the supplier 3 may be mixed with the water supplied from the water supply module 5 to be supplied to the beverage ingredient pack 12, and be mixed with the main material accommodated in the beverage ingredient pack 12.

The main material accommodated in the beverage ingredient pack 12 is a material having a larger volume than the other materials, and may be, in the case of beer, the malt among the malt, the yeast, the hops, and the fragrance additives. In addition, the additives accommodated in the supplier 3 may be the other materials except the malt among the material for brewing the beer, and be the yeast, the hops, the fragrance additives, and the like.

Meanwhile, the beverage maker does not include both of the beverage ingredient pack 12 and the supplier 3 as described above, but may include only the supplier 3 without any separate beverage ingredient pack 12. All of the materials for brewing the beverage may be accommodated in the supplier 3. In this case, all of the materials accommodated in the supplier 3 may be supplied to the inside of the fermentation tank assembly 11 together with the water supplied from the water supply module 5. The main material and the additives may be accommodated together in the supplier 3. The main material and additives, which are accommodated in the supplier 3, may be simultaneously supplied to the inside of the fermentation tank assembly 11 or be sequentially supplied with a time difference.

In addition, the beverage maker does not include any separate beverage ingredient pack 12, but may directly inject some materials among the materials for brewing the beverage into the fermentation tank assembly 11 and allow the other materials for brewing the beverage to be accommodated in the supplier 3. In this case, a user may directly inject the main material into the fermentation tank assembly 11, and the additives may be accommodated in the supplier 3. The additives accommodated in the supplier 3 may be mixed with the water supplied from the water supply module 5, and be mixed with the main material previously injected into the fermentation tank assembly 11.

In addition, the beverage maker does not include the supplier 3, but may include the beverage ingredient pack 12. In this case, the main material may be accommodated in the beverage ingredient pack 12, and the user may directly inject the additives into the beverage ingredient pack 12.

In addition, the beverage maker does not include both of the supplier 3 and the beverage ingredient pack 12, but the user may directly inject the main material and the additives simultaneously or with a time difference into the fermentation tank assembly 11.

When the beverage maker includes both of the supplier 3 and the beverage ingredient pack 12, the beverage can be more conveniently brewed. Hereinafter, the case where the beverage maker includes both of the supplier 3 and the beverage ingredient pack 12 is described as an example. However, it will be apparent that the present disclosure is not limited to the case where the beverage maker includes both of the supplier 3 and the beverage ingredient pack 12.

The materials injected into the beverage ingredient pack 12 may be fermented as time elapses. The beverage that has been completely brewed in the beverage ingredient pack 12 may flow in the main flow path 2 through the main flow path connecting part 115, and flow from the main flow path 2 to the beverage extractor 6 to be extracted from the beverage extractor 6.

The fermentation module 1 may further include a temperature controller that changes a temperature of the fermentation tank assembly 11. As the temperature controller heats or cools the fermentation tank assembly 11, the temperature of the fermentation tank assembly 11 can be controlled to an optimum temperature for brewing the beverage.

The temperature controller may include a refrigeration cycle apparatus 13 including a compressor 131, a condenser 132, an expansion device 133, and an evaporator 134, and any one of the condenser 132 and the evaporator 134 may be disposed at the fermentation tank assembly 11.

When the condenser 132 is disposed in contact with the fermentation tank 112, the refrigeration cycle apparatus 13 may control a temperature of the fermentation tank 112 by heating the fermentation tank 112. In this case, the condenser 132 may be disposed in contact with the outer surface of the fermentation tank 112. The condenser 132 may include a condensing tube wound around the outer surface of the fermentation tank 112.

When the evaporator 134 is disposed in contact with the fermentation tank 112, the refrigeration cycle apparatus 13 may control the temperature of the fermentation tank 112 by cooling the fermentation tank 112. In this case, the evaporator 134 may be disposed in contact with the outer surface of the fermentation tank 112. The evaporator 134 may include an evaporating tube wound around the outer surface of the fermentation tank 112. The evaporating tube may be accommodated between the fermentation tank 112 and a heat insulating wall 102 (see FIGS. 3 and 4), and cool the inside of a heat insulating space S2 heat-insulated by the heat insulating wall 102.

The temperature controller may further include a heater 14 that heats the fermentation tank assembly 11. The heater 14 may be disposed in contact with the outer surface of the fermentation tank 112, and be configured as a heater that generates heat when power is applied thereto. The heater 14 may be configured as a line heater, and be wound around the outer surface of the fermentation tank 112.

The refrigeration cycle apparatus 13 may be configured as a heat pump. The refrigeration cycle apparatus 13 may include a flow path switching valve. The flow path switching valve may be configured as a four-way valve. The flow path switching valve may be connected to each of an inlet flow path of the compressor 131 and an outlet flow path of the compressor 131. The flow path switching valve may be connected to the condenser 132 through a condenser connection flow path, and be connected to the evaporator 134 through an evaporator connection flow path.

When the fermentation tank 112 is cooled, the flow path switching valve may guide a refrigerant compressed by the compressor 131 to the condenser 132 and guide the refrigerant discharged from the evaporator 134 to the compressor 131.

When the fermentation tank 112 is heated, the flow path switching valve may guide the refrigerant compressed by the compressor 131 to the evaporator 134 and guide the refrigerant discharged from the condenser 132 to the compressor 131.

The beverage maker may include a beverage extraction pressurizing device 15 that injects air between the beverage ingredient pack 12 and the fermentation tank assembly 11. In a state in which the beverage ingredient pack 12 is accommodated in the fermentation tank assembly 11, the beverage extraction pressurizing device 15 may inject air between the beverage ingredient pack 12 and the fermentation tank assembly 11, and the air injected into the fermentation tank assembly 11 may pressurize the beverage ingredient pack 12. The beverage in the beverage ingredient pack 12 may be pressurized by the air, and flow in the main flow path 2 by passing through the main flow path connecting part 115. The beverage flowing in the main flow path 2 from the beverage ingredient pack 12 may be extracted to the outside through the beverage extractor 6.

That is, in the beverage maker, if the beverage is completely brewed, the beverage in the beverage ingredient pack 12 may be extracted through the beverage extractor 6 in a state in which the beverage ingredient pack 12 is not taken out of the fermentation tank assembly 11 but located in the fermentation tank assembly 11.

The beverage extraction pressurizing device 15 may include an air pump 152 that pumps air and an air supply flow path 154 that connects the air pump 152 and the inside of the fermentation tank assembly 11. The beverage extraction pressurizing device 15 may further include an air control valve 156 installed in the air supply flow path 154. The beverage extraction pressurizing device 15 may further include an air relief valve 158 provided to the air supply flow path 154. The air relief valve 158 may be installed posterior to the air control valve 156 in an air supply direction in the air supply flow path 154.

The air control valve 156 may be opened only when the beverage is extracted to allow air to be introduced into the fermentation tank assembly 11, and maintain a closed state while the beverage is not being extracted.

The beverage maker may further include a temperature sensor 16 that measures a temperature of the fermentation tank assembly 11. The temperature sensor 16 may be installed to measure a temperature of the fermentation tank 112.

Hereinafter, the supplier 3 will be described as follows.

The supplier 3 may be connected to a water supply heater 53 through the water supply flow path 4, and be connected to the fermentation tank assembly 11 through the main flow path 2.

The supplier 3 may accommodate materials required to brew the beverage therein, and be configured to allow water supplied from the water supply module 5 to pass therethrough. For example, in the case of beer, the materials accommodated in the supplier 3 may be yeast, hops, fragrance additives, and the like.

The materials accommodated in the supplier 3 may be directly accommodated in a material accommodation part formed in the supplier 3. At least one material accommodation part may be formed in the supplier 3. A plurality of material accommodation parts may be formed in the supplier 3. In this case, the plurality of material accommodation parts may be formed to be divided from one another.

Meanwhile, the materials accommodated in the supplier 3 may be accommodated in a capsule, and at least one capsule accommodation part in which the capsule is accommodated may be formed in the supplier 3. When the materials are accommodated in the capsule, the supplier 3 may be configured such that the capsule is mountable and extractable. The supplier 3 may be configured as a capsule kit assembly in which the capsule is separably accommodated.

Each of the main flow path 2 and the water supply flow path 4 may be connected to the supplier 3. The water supplied through the water supply flow path 4 may be mixed with the materials by passing through the material accommodation part or the capsule. The materials accommodated in the material accommodation part or the capsule may flow in the main flow path 2 together with the water.

A plurality of different kinds of additives may be separated from one another to be accommodated in the supplier 3. The plurality of additives accommodated in the supplier 3 may be yeast, hops, and fragrance additives, and be separated from one another to be accommodated in the supplier 3.

When a plurality of material accommodation parts are formed in the supplier 3, each of the plurality of material accommodation parts may be connected to the water supply flow path through a supplier entrance flow path, and be connected to the main flow path 2 through a supplier exit flow path.

When a plurality of capsule accommodation parts are formed in the supplier 3, each of the plurality of capsule accommodation parts may be connected to the water supply flow path 4 through the supplier entrance flow path, and be connected to the main flow path 2 through the supplier exit flow path.

The material accommodation part of the supplier 3 and the capsule accommodation part of the supplier 3 may be the substantially same component. When the capsule is inserted into the supplier 3 in a state in which the materials are accommodated in the capsule, the component may be referred to as the capsule accommodation part. When the materials are directly accommodated in the supplier 3 in a state in which the materials are not contained in the capsule, the component may be referred to as the material accommodation part. Since the material accommodation part and the capsule accommodation part may be the substantially same component, it will be described below that, for convenience of description, the capsule accommodation part is formed in the supplier 3.

The capsule accommodation part in which a capsule containing additives is attachably/detachably accommodated may be formed in the supplier 3. The supplier 3 may be connected to the water supply flow path 4 through the supplier entrance flow path, and be connected to the main flow path 2 through the supplier exit flow path.

An opening/closing valve that opens/closes the supplier entrance flow path may be installed in the supplier entrance flow path.

A check valve that blocks a fluid of the main flow path 2 from flowing backward to the capsule accommodation part may be installed in the supplier exit flow path.

A plurality of capsule accommodation parts 31, 32, and 33 may be formed in the supplier 3. The plurality of capsule accommodation parts 31, 32, and 33 may be formed to be divided from one another. The plurality of capsule accommodation parts 31, 32, and 33 may be connected to supplier entrance flow paths and supplier exit flow paths, respectively.

Hereinafter, a first additive, a second additive, and a third additive may be accommodated in the supplier 3. The first additive may be yeast, the second additive may be hop, and the third additive may be a fragrance additive.

The supplier 3 may include a first capsule accommodation part 31 in which a first capsule C1 containing the first additive is accommodated, a second capsule accommodation part 32 in which a second capsule C2 containing the second additive is accommodated, and a third capsule accommodation part 33 in which a third capsule C3 containing the third additive is accommodated.

A first supplier entrance flow path 311 that guides water or air to the first capsule accommodation part 31 may be connected to the first capsule accommodation part 31, and a first supplier exit flow path 312 through which water discharged from the first capsule accommodation part 31, a mixture of the water and the first additive, and air are guided may be connected to the first capsule accommodation part 31. A first opening/closing valve 313 that opens/closes the first supplier entrance flow path 311 may be installed in the first supplier entrance flow path 311. A first check valve 314 that blocks the fluid of the main flow path 2 from flowing backward to the first capsule accommodation part 31 while allowing a fluid of the first capsule accommodation part 31 to flow in the main flow path 2 may be installed in the first supplier exit flow path 312. Here, the fluid may include the water discharged from the first capsule accommodation part 31, the mixture of the water and the first additive, and the air.

A second supplier entrance flow path 321 that guides water or air to the second capsule accommodation part 32 may be connected to the second capsule accommodation part 32, and a second supplier exit flow path 322 through which water discharged from the second capsule accommodation part 32, a mixture of the water and the second additive, and air are guided may be connected to the second capsule accommodation part 32. A second opening/closing valve 323 that opens/closes the second supplier entrance flow path 321 may be installed in the second supplier entrance flow path 321. A second check valve 324 that blocks the fluid of the main flow path 2 from flowing backward to the second capsule accommodation part 32 while allowing a fluid of the second capsule accommodation part 32 to flow in the main flow path 2 may be installed in the second supplier exit flow path 322. Here, the fluid may include the water discharged from the second capsule accommodation part 32, the mixture of the water and the second additive, and the air.

A third supplier entrance flow path 331 that guides water or air to the third capsule accommodation part 33 may be connected to the third capsule accommodation part 33, and a third supplier exit flow path 332 through which water discharged from the third capsule accommodation part 33, a mixture of the water and the third additive, and air are guided may be connected to the third capsule accommodation part 33. A third opening/closing valve 323 that opens/closes the third supplier entrance flow path 331 may be installed in the third supplier entrance flow path 331. A third check valve 334 that blocks the fluid of the main flow path 2 from flowing backward to the third capsule accommodation part 33 while allowing a fluid of the third capsule accommodation part 33 to flow in the main flow path 2 may be installed in the third supplier exit flow path 332. Here, the fluid may include the water discharged from the third capsule accommodation part 33, the mixture of the water and the third additive, and the air.

The beverage maker may include a bypass flow path 34 that enables the water supplied from the water flow path 4 to be supplied to the main flow path 2 by bypassing the capsule accommodation parts 31, 32, and 33.

The bypass flow path 34 may be connected to the water supply flow path 4 and the main flow path 2, and water or air of the water flow path 4 may be guided to the bypass flow path 34 to flow in the main flow path 2 by bypassing the capsule accommodation parts 31, 32, and 33.

The bypass flow path 34 may be connected in parallel to flow paths of the first capsule accommodation part 31, the second capsule accommodation part 32, and the third capsule accommodation part 33.

A bypass valve 35 that opens/closes the bypass flow path 34 may be installed in the bypass flow path 34.

The beverage maker may include a main supply flow path that guides the water, the materials of the beverage, or the air to the fermentation tank assembly 11 therethrough.

When the beverage maker includes both of the supplier 3 and the water supply module 5, the main supply flow path may include all of the main flow path 2, the bypass flow path 34, and the water supply flow path 4. In this case, the main supply flow path may supply all of the water, the air, and the materials of the beverage to the fermentation tank assembly 11.

The beverage maker includes the supplier 3, but may not include the water supply module 5. In this case, the main supply flow path may include all of the main flow path 2, the bypass flow path 34, and the water supply flow path 4. The water supply flow path 4 may be directly connected to a water faucet or include a water supply tube that is connected to the water faucet through a separate connection hose to be supplied with external water. The water supply tube may be supplied with external water to supply the external water to the bypass flow path 34 or the supplier 3. That is, the main supply flow path may supply all of the water, the air, and the materials of the beverage to the fermentation tank assembly 11 therethrough.

The beverage maker includes the water supply module 5, but may not include the supplier 3. In this case, the main supply flow path may include the main flow path 2, and the main flow path 2 may be directly connected to the water supply module 5. In addition, an air injection flow path 81 of an air injector 8 may be connected to the main flow path 2.

When the beverage maker includes the water supply module 5 but does not include the supplier 3, the main supply flow path does not require a separate water supply flow path 4 or bypass flow path 34 that connects the water supply module 5 and the supplier 3, and the main flow path 2 may be directly supplied from the water supply module 5. In addition, the air injection flow path 81 of the air injector 8 may be connected to a portion located between the water supply module 5 and a main valve 9 in the main flow path 2.

When the beverage maker includes the water supply module 5 but does not include the supplier 3, water of the water supply module 5 may be supplied to the fermentation tank assembly 11 through the main flow path 2, and air of the air injector 8 may be supplied to the fermentation tank assembly 11 through the main flow path 2. That is, the main flow path may supply water and air to the fermentation tank assembly 11.

The beverage maker may not include both of the supplier 3 and the water supply module 5. In this case, the main supply flow path may include the main flow path 2, and the main flow path 2 may be directly connected to a water faucet or include a water supply tube that is connected to the water faucet through a separate connection hose to be supplied with external water. The water supply tube may be supplied with external water to supply the external water to the fermentation tank assembly 11.

When the beverage maker does not include both of the supplier 3 and the water supply module 5, the main supply flow path does not require a separate water supply flow path 4 or bypass flow path 34 that connects the water supply module 5 and the supplier 3, and the main flow path 2 may be directly supplied from the water supply module 5. In this case, the air injection flow path 81 of the air injector 8 may be connected to the main flow path 2, and be connected prior to the main valve 9 in the main flow path 2. That is, the main supply flow path may supply water and air to the fermentation tank assembly 11.

Hereinafter, the case where the beverage maker includes all of the main flow path 2, the water supply flow path 4, and the bypass flow path 34 will be described as an example.

The main flow path 2 may be connected to the first supplier exit flow path 312, the second supplier exit flow path 322, the third supplier exit flow path 332, and the bypass flow path 34. The main flow path 2 may include a common tube connected to the fermentation tank assembly 11 and a combination tube connected to the first supplier exit flow path 312, the second supplier exit flow path 322, the third supplier exit flow path 332, the bypass flow path 34 and the common tube.

The main flow path 2 may be connected to the fermentation tank assembly 11, and be connected to the fermentation tank cover 114 in the fermentation tank assembly 11.

The water supply flow path 4 may be connected to the first supplier entrance flow path 311, the second supplier entrance flow path 321, the third supplier entrance flow path 331, and the bypass flow path 34.

The water supply flow path 4 may include a common tube connected to the water supply module 5, and a plurality of branch tubes branching off from the common tube, the plurality of branch tubes being connected to the first supplier entrance flow path 311, the second supplier entrance flow path 321, the third supplier entrance flow path 331, and the bypass flow path 34.

The water supply module 5 may include a water tank 51 containing water, a water supply pump 52 that pumps the water of the water tank 51, and the water supply heater 53 that heats the water pumped by the water supply pump 52.

A water tank outlet flow path 54 may be connected to the water tank 51, and the water supply pump 52 may be connected to the water tank outlet flow path 54.

A water supply pump outlet flow path 55 may be connected to the water supply pump 52, and the water supply heater 53 may be connected to the water supply pump outlet flow path 55.

A flow meter 56 that measures a flow rate of the water supply pump outlet flow path 55 may be installed in the water supply pump outlet flow path 55.

The water supply heater 53 may be a mold heater, and include a heater case through which the water pumped by the water supply pump 52 passes, and a heater installed in the heater case to heat water introduced into the heater case. A thermistor 57 that measures a temperature of the water supply heater 53 may be installed in the water supply heater 53. In addition, a thermal fuse 58 that cuts off current applied to the water supply heater 53 as a circuit is interrupted when the temperature of the water supply heater 53 is high.

When the water supply pump 52 is driven, water of the water tank 51 may be guided to the water supply heater 53 through the water tank outlet flow path 54, the water supply pump 52, and the water supply pump outlet flow path 55. The water guided to the water heater 53 may be heated by the water supply heater 53 and then guided to the water supply flow path 4.

The beverage extractor 6 may be connected to the main flow path 2. The beverage extractor 6 may include a beverage extraction flow path 61 connected to the main flow path 2, the beverage extraction flow path 61 allowing the beverage of the main flow path 2 to be guided therethrough. The beverage extractor 6 may further include a beverage extraction valve 62 connected to the beverage extraction flow path 61.

An anti-foaming path 63 may be provided in the beverage extraction flow path 61, and foam of the beverage flowing from the main flow path 2 to the beverage extraction flow path 61 may be minimized by passing through the anti-foaming path 63. A mesh, etc., through which foam is filtered, may be provided in the anti-foaming path 63.

The beverage extraction valve 62 may include a lever manipulated by the user and a tap valve having a micro switch that detects a manipulation of the user.

Meanwhile, the beverage maker may further include a gas discharger that discharges gas in the fermentation module 1 to the outside.

The gas discharger 7 may include a gas extraction flow path 71 connected to the fermentation module 1 and a pressure sensor 72 installed in the gas extraction flow path 71. The gas discharger 7 may further include a gas extraction valve 73 that opens/closes the gas extraction flow path 71. The gas discharger 7 may further include an air filter 74 through which gas passing through the gas extraction valve 73 passes.

The gas extraction flow path 71 may be connected to the fermentation tank assembly 11, particularly, the fermentation tank cover 114.

The gas extraction valve 73 may be turned on when air is injected into the beverage ingredient pack 12, to be opened. The beverage maker may allow malt and water to be uniformly mixed together by injecting air into the beverage ingredient pack 12. As such, in the case of beer making, bubbles generated from the liquid malt may be discharged to the outside at an upper portion of the beer brewing pack 12 through the gas extraction flow path 71 and the gas extraction valve 73.

The gas extraction valve 73 may be opened to detect a fermentation degree during a fermentation process. The gas in the beverage brewing pack 12 may flow in the pressure sensor 72. The pressure sensor 72 may sense a pressure of the gas discharged from the beverage brewing pack 12.

The pressure sensor 72, the gas extraction valve 73, and the air filter 74 may be sequentially disposed in a gas discharge direction in the gas extraction flow path 71.

The gas discharger 7 may further include a gas discharge relief valve 75 provided in the gas extraction flow path 71. The gas discharge relief valve 75 may be installed prior to the pressure sensor 72 in the gas discharge direction.

The beverage maker may further include the air injector 8 connected to at least one of the main flow path 2 and the water supply flow path 4 to inject air.

When the air injector 8 is connected to the water supply flow path 4, air may be injected into the supplier 3 through the water supply flow path 4. The air injected into the water supply flow path 4 may sequentially pass through the supplier 3 and the main flow path 2 and then be injected into the beverage brewing pack 12. When the air injector 8 is connected to the water supply flow path 4, air may be injected into the beverage brewing pack 12 through the water supply flow path 4, the bypass flow path 34, and the main flow path 2. The air injector 8 may supply the air to materials in the beverage brewing pack 12.

When the air injector 8 is connected to the water supply flow path 4, air may be injected into the capsule accommodation parts 31, 32, and 33 through the water supply flow path 4, remaining water or sludge in the capsules C1, C2, and C3 and the capsule accommodation parts 31, 32, and 32 may flow in the main flow path 2, and the capsules C1, C2, and C3 and the capsule accommodation parts 31, 32, and 32 may be cleanly maintained.

The air injector 8 may include the air injection flow path 81 connected to the water supply flow path 4 and an air injection pump 82 that pumps air to the air injection flow path 81.

The air injector 8 may further include a check valve 83 that blocks the water of the water supply flow path 4 from being introduced into the air injection pump 82 through the air injection flow path 81. The check valve 83 may be installed posterior to the air injection pump 82 in an air injection direction.

The air injector 8 may further include an air filter 84 connected to the air injection flow path 81, the air filter 84 being installed prior to the air injection pump 82 in the air injection direction.

When the air injection pump 82 is driven, dust, etc. in air may be filtered by the air filter 84, and the air passing through the air filter 84 may be flowed by the air injection pump 82 to flow in the water supply flow path 4.

The beverage maker may further include the main valve 9 that opens/closes the main flow path 2.

The main valve 9 may be installed, in the main flow path 2, between a connection part 91 of the main flow path 2 and the beverage extraction flow path 61 and a connection part 92 of the main flow path 2 and the fermentation tank assembly 11.

The main valve 9 may opened when hot water is injected into the beverage ingredient pack 12, to open the main flow path 2. The main valve 9 may be closed while the fermentation tank assembly 11 is cooled, to close the main flow path 2. The main valve 9 may be opened when air is injected into the beverage ingredient pack 12, to open the main flow path 2. The main valve 9 may be opened when an additive is supplied to the inside of the beverage ingredient pack 12, to open the main flow path 2. The main valve 9 may be closed while materials are being fermented, to close the inside of the beverage ingredient pack 12. The main valve 9 may be closed when the beverage is ripened and kept, to close the inside of the beverage ingredient pack 12. The main valve 9 may be opened when the beverage is extracted from the beverage extractor 6, to open the main flow path 2.

Figure 2:
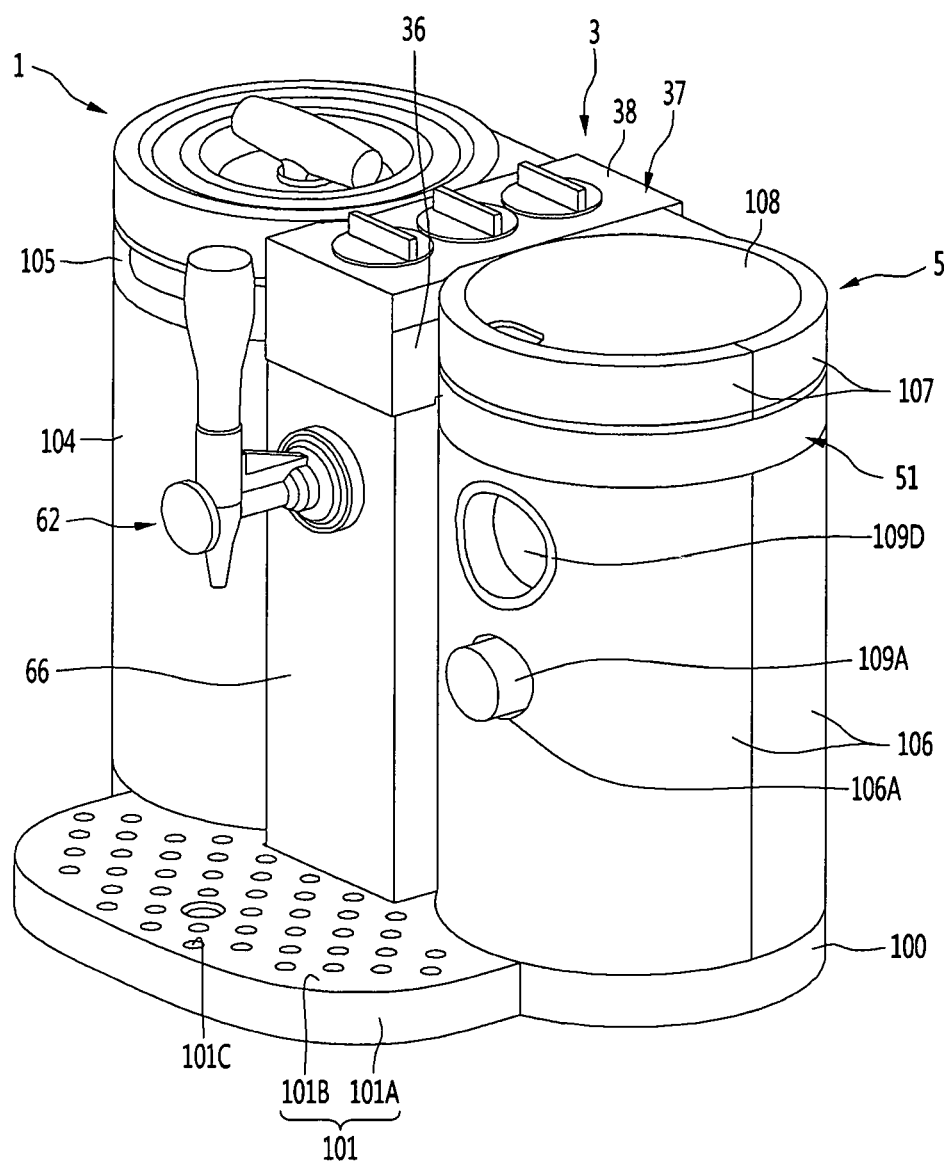
FIG. 2 is a diagram illustrating an example of a perspective view of the beverage maker according to some implementations.
Figure 3:
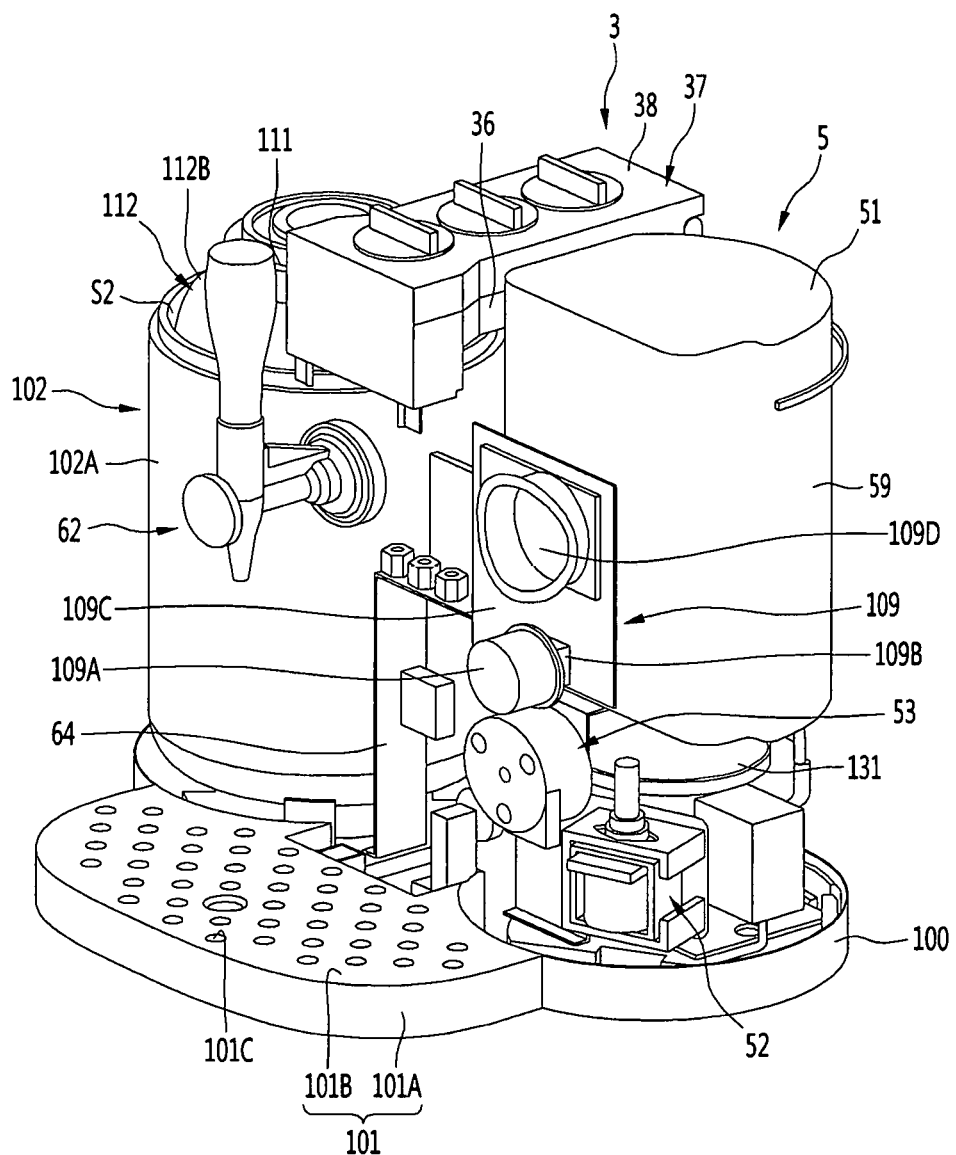
FIG. 3 is a diagram illustrating an example of a perspective view of an inside of the beverage maker according to some implementations.
Figure 4:
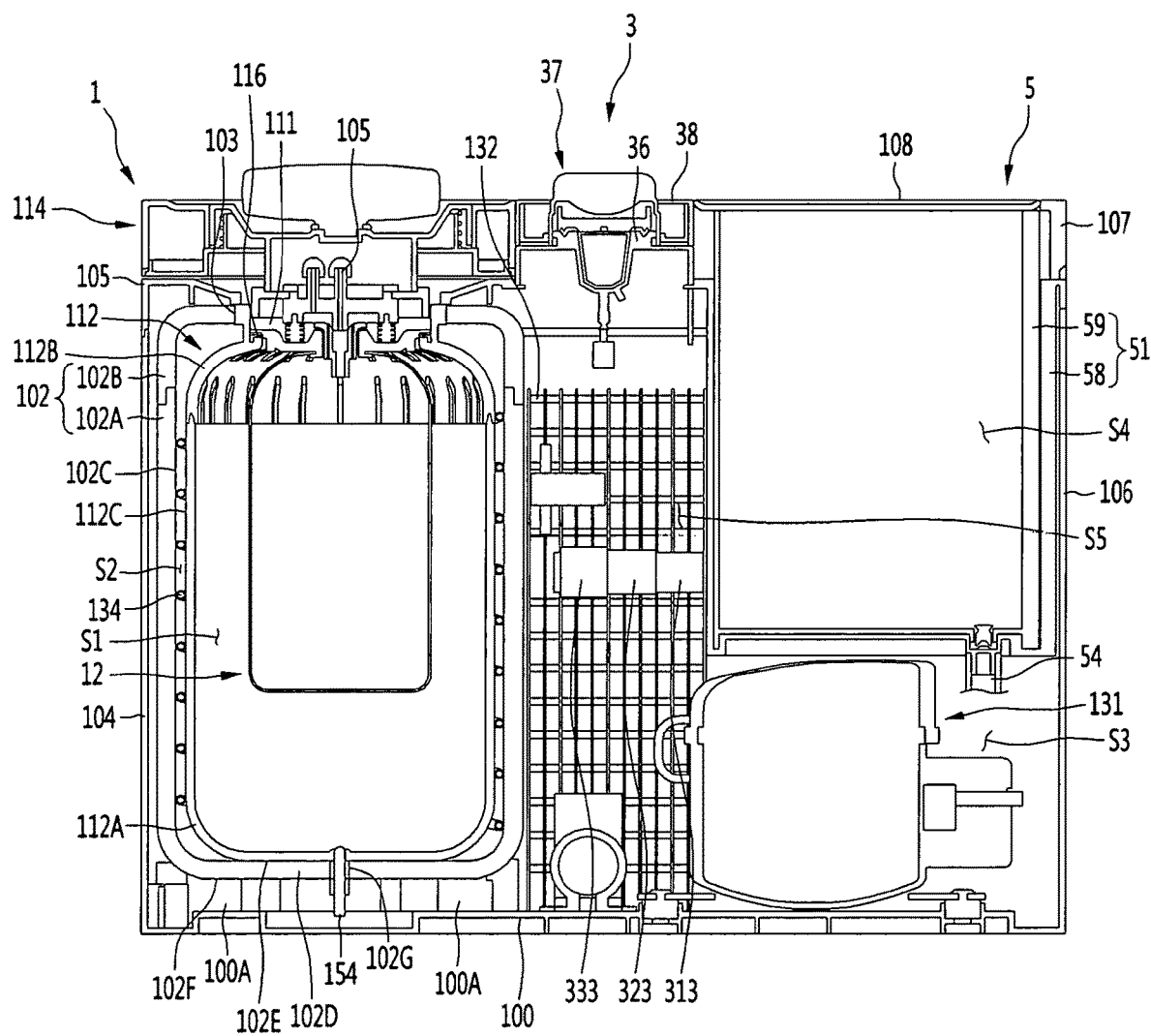
FIG. 4 is a diagram illustrating an example of a front view of an inside of the beverage maker according to some implementations.

FIG. 2 is a perspective view of the beverage maker according to some implementations. FIG. 3 is a perspective view illustrating an inside of the beverage maker according to some implementations. FIG. 4 is a front view illustrating an inside of the beverage maker according to some implementations.

The beverage maker may further include a base 100. The base 100 may form a bottom appearance of the beverage maker, and support the fermentation tank assembly 11, the compressor 131, the water supply heater 53, the water supply pump 52, the water tank 51, and the like, which are located at the top side thereof.

The beverage maker may further include a beverage container 101 configured to receive and keep beverage dropping from the beverage extraction valve 62. The beverage container 101 may be integrally formed with the base 100 or be coupled to the base 100.

The beverage container 101 may include a container body 101A having a space in which the beverage dropping from the beverage extraction valve 62 is accommodated. The beverage container 101 may include a container top plate 101B disposed at the top surface of the container body 101A to cover the space in the container body 101A.

The container body 101A may be formed to protrude forward at a front portion of the base 100. The top surface of the container body 101A may be opened.

Holes 101C through which the beverage drops into the container body 101A may be formed in the container top plate 101B.

Beverage dropping around a beverage container in the beverage dropping from the beverage extraction valve 62 may drop to the container top plate 101B, and be temporarily kept inside the beverage container 101 through the holes 101C of the container top plate 101B. Thus, surroundings of the beverage maker can be cleanly maintained.

The fermentation tank 112, as shown in FIG. 4, may include a lower fermentation tank 112A of which top surface is opened, the lower fermentation tank 112A having a space formed therein, and an upper fermentation tank 112B disposed at the top of the lower fermentation tank 112A, the upper fermentation tank 112B having the opening 111 formed in the top surface thereof.

A seat part 116 on which the beverage ingredient pack 12 is mounted may be provided in the fermentation tank 112. The seat part 116 may be provided to protrude from the opening 111, and a circumferential part of the beverage ingredient pack 12 may be mounted on the seat part 116.

The beverage maker may include the heat insulating wall 102 surrounding both of the fermentation tank 112 and the evaporator 134.

The heat insulating wall 102 may be formed of polystyrene foam or the like, which has high heat insulation performance and can absorb vibration.

A heat insulating wall opening 103 may be formed at an upper portion of the heat insulating wall 102, and the heat insulating space S2 may be formed inside the heat insulating wall 102.

The heat insulating wall 102 may be configured as an assembly of a plurality of members. The heat insulating wall 102 may include a lower heat insulating wall 102A of which top surface is opened, the lower heat insulating wall 102A having a space formed therein, and an upper heat insulating wall 102B disposed at the top of the lower heat insulating wall 102A, the upper heat insulating wall 102B having the heat insulating wall opening 103 formed in the top surface thereof.

The heat insulating wall 102 having the lower heat insulating wall 102A and the upper heat insulating wall 102B may surround the circumferential and bottom surfaces of the fermentation tank 112.

The heat insulating wall opening 103 of the heat insulating wall 102 may surround an upper portion of the fermentation tank 112. The heat insulating wall opening 103 of the heat insulating wall 102 may surround the outer surface of a portion at which the heat insulating wall opening 103 is formed in the fermentation tank 112.

An inner surface 102C of the heat insulating wall 102 may have a larger diameter than an outer surface 112C of the fermentation tank 112, and a gap may be formed between the inner surface 102C of the heat insulating wall 102 and the outer surface 112C of the fermentation tank 112. Air may be filled in the gap, and the air between the inner surface 102C of the heat insulating wall 102 and the outer surface 112C of the fermentation tank 112 may heat-insulate the fermentation tank 112. The gap between the inner surface 102C of the heat insulating wall 102 and the outer surface 112C of the fermentation tank 112 may be a space in which the evaporator 134 is accommodated, and simultaneously be a space that can minimize a change in temperature of the fermentation tank 112.

The fermentation tank 112 may be mounted on a top surface 102E of a bottom plate part 102D of the heat insulating wall 102, and be supported by the top surface 102E of the bottom plate part 102D of the heat insulating wall 102.

A bottom surface 102F of the bottom plate part 102D of the heat insulating wall 102 may be placed on a heat insulating wall supporter 100A formed on the top surface of the base 100.

An air supply flow path through-hole 102G through which the air supply flow path 154 passes may be formed in the bottom plate part 102D of the heat insulating wall 102. The air supply flow path through-hole 102G may form at least part of a channel that is communicative with a space that is formed in the interior of the container body between a wall of the container body and the beverage ingredient pack 12 mounted inside the container body. Air that is supplied through this channel may exert pressure on the flexible beverage ingredient pack 12, causing the manufactured beverage to be extracted. At least a portion of the air supply flow path 154 may be formed through the heat insulating wall 102, and be connected to the fermentation tank 112.

Meanwhile, the evaporator 134 may be an evaporating tube wound around the outer surface of the fermentation tank 112 to be located in the gap. The evaporator 134 may be in contact with each of the outer surface 112C of the fermentation tank 112 and the inner surface 102C of the heat insulating wall 102. The evaporator 134 may be supported by the heat insulating wall 102.

The evaporator 134 may include an extending tube (not shown) extending to the outside of the heat insulating wall 102 by passing through an evaporating tube through-hole (not shown) formed in the heat insulating wall 102.

The beverage maker may include a heat insulating wall cover 104 and 105 surrounding the circumferential and top surfaces of the heat insulating wall 102.

The heat insulating wall cover 104 and 105 may be configured as one cover, and be configured as an assembly of a plurality of covers.

The heat insulating wall cover 104 and 105 may include a lower heat insulating wall cover 104 of which bottom surface is opened, the lower heat insulating wall cover 104 surrounding the outer circumferential surface of the heat insulating wall 102, and an upper heat insulating wall cover 105 disposed at the top of the lower heat insulating wall cover 104, the upper heat insulating wall cover 105 covering the top surface of the heat insulating wall 102.

A lower portion of the lower heat insulating wall cover 104 may be placed on the base 100.

A lower portion of the upper heat insulating wall cover 105 may be placed on the top end of the lower heat insulating wall cover 104.

The heat insulating wall cover 104 and 105 may protect the heat insulating wall 102, and form a portion of the appearance of the beverage maker.

The heat insulating wall cover 104 and 105 may surround the entire circumferential surface of the heat insulating wall 102, and surround only a portion of the circumferential surface of the heat insulating wall 102.

A side opening may be formed in a surface of the heat insulating wall cover 104 and 105, which faces the water tank 51. The extending tube of the evaporator 134 may be disposed to pass through the side opening. The extending tube of the evaporator 134 may extend to an accommodation space S5 shown in FIG. 4, which will be described later, by passing through the side opening of the heat insulating wall cover 104 and 105.

Meanwhile, the water tank 51 may be spaced apart from the base 100 at the top side of the base 100. The water tank 51 may be spaced apart from the base 100 in the vertical direction. A space S3 in which at least one of the compressor 131, the water supply heater 53, and the water supply pump 52 is to be accommodated may be formed between the water tank 51 and the base 100. In addition, the water tank 51 may be spaced apart from the heat insulating wall 102 in the horizontal direction.

The beverage maker may include a water tank supporter 106 supporting the water tank 51 to be spaced apart from the base 100. The water tank supporter 106 may be disposed at the base 100, and support the water tank 51 to be spaced apart from the base 100 at the top side of the base 100. The bottom end of water tank supporter 106 may be placed on the base 100, and the water tank 51 may be placed at an upper portion of the water tank supporter 106.

The water tank supporter 106 may be configured such that a plurality of supporter members are coupled in a hollow cylindrical shape. A side opening may be formed in a surface of the water tank supporter 106, which faces the heat insulating wall 102.

The water tank 51 may include an outer water tank 58, and an inner water tank 59 accommodated in the outer water tank 58, the inner water tank 59 in which a space S4 having water accommodated therein is formed.

The outer water tank 58 may be placed at an upper portion of the water tank supporter 106, and the bottom surface of the outer water tank 58 may be spaced apart from the top surface of the base 100. The space S3 in which at least one of the compressor 131, the water supply heater 53, and the water supply pump 52 is to be accommodated may be formed between the outer water tank 58 and the base 100.

The outer water tank 58 may have a vessel shape of which top surface is opened, and protect the inner water tank 59 by surrounding the outer circumferential and bottom surfaces of the inner water tank 59 located therein.

The inner water tank 59 may be inserted into the outer water tank 58, and be supported by the outer water tank 58.

The beverage maker may further include a water tank protector 107 disposed at the top side of the outer water tank 58 to surround an upper outer circumferential surface of the inner water tank 59. The water tank protector 107 may be disposed to surround the entire or a portion of the upper outer circumferential surface of the inner water tank 59. The water tank protector 107 may be configured such that a plurality of protector members are coupled in a ring shape.

The beverage maker may further include a water tank lid 108 coupled to the water tank 51 or the water tank protector 107 to cover the top surface of the water tank 51. One side of the water tank lid 108 may be rotatably connected to the water tank 51 or the water tank protector 107. The water tank lid 108 may be separably mounted on the top surface of the water tank 51 or the water tank protector 107.

Meanwhile, at least one of the compressor 131, the water supply heater 53, and the water supply pump 52 may be disposed between the base 100 and the water tank 51.

The condenser 132 may be disposed to face at least one of the space between the heat insulating wall 102 and the water tank 51, and the heat insulating wall 102.

The supplier 3 may be disposed between the fermentation tank cover 114 and the water tank 51. In this case, the beverage maker may be compactly manufactured as compared with when the supplier 3 is located at a position except the space between the fermentation tank cover 114 and the water tank 51, and the supplier 3 may be protected by the fermentation tank cover 114 and the water tank 51.

As shown in FIG. 4, one side of the supplier 3 may be mounted on the outer water tank 58, and the other side of the supplier 3 may be mounted on the heat insulating wall cover 104 and 105. The supplier 3 may be vertically spaced apart from the base 100 at the top side of the base 100.

The supplier 3 may include a capsule accommodation body 36 having the capsule accommodation part in which the capsules C1, C2, and C3 shown in FIG. 1 are attachably/detachably accommodated, and a lid module 37 covering the capsule accommodation part.

One side plate facing the water tank 51 among left and right side plates of the capsule accommodation body 36 may be mounted on a mounting part formed in the outer water tank 58 to be supported by the outer water tank 58.

The other side plate facing the fermentation tank cover 114 among the left and right side plates of the capsule accommodation body 36 may be mounted on the heat insulating wall cover 104 and 105, and be supported by the heat insulating wall cover 104 and 105.

The lid module 37 may include a lid 38 covering the capsule accommodation body 36. The lid 38 may be slidingly disposed at the capsule accommodation body 36 or be rotatably connected to the capsule accommodation body 36. The lid 38 may be hinge-connected to the capsule accommodation body 36.

The supplier 3 may be installed to be located at an approximately central upper portion of the beverage maker, and the user may easily mount or separate the capsules C1, C2, and C3 by upwardly rotating the lid module 37 of the supplier 3.

The accommodation space S5 in which a plurality of parts are to be accommodated may be formed in the beverage maker. Here, the accommodation space S5 may be a space that becomes a space between the heat insulating wall 102 and the water tank 51 in the left-right direction and becomes a space between the supplier 3 and the base 100 in the top-bottom direction.

In the beverage maker, a plurality of parts are preferably accommodated in the accommodation space S5. In this case, the beverage maker may become compact. The plurality of parts accommodated in the accommodation space S5 may be protected by being surrounded by the heat insulating wall 102, the water tank 51, the base 100, the supplier 3, the condenser 132, and a center cover 66 which will be described later.

The opening/closing valves 313, 323, and 333 installed in the supplier entrance flow paths 311, 321, and 331 shown in FIG. 1 to open/close the supplier entrance flow paths 311, 321, and 331, as shown in FIG. 4, may be located under the capsule accommodation body 36.

The opening/closing valves 313, 323, and 333 may be installed in a bracket 64 (see FIG. 3) disposed at the base 100.

The bracket 64 may be disposed to be located at a side of the heat insulating wall 102, and the opening/closing valves 313, 323, and 333 may be installed to be located between the heat insulating wall 102 and the water tank 51 by the bracket 64. The opening/closing valves 313, 323, and 333 may be located between the heat insulating wall 102 and the water tank 51 in the left-right direction, and be located between the base 100 and the supplier 3 in the top-bottom direction.

The beverage maker may further include the center cover 66 covering the front of the opening/closing valves 313, 323, and 333.

The center cover 66, as shown in FIG. 2, may be disposed to cover between the heat insulating wall cover 104 and the water tank supporter 106 in the left-right direction and cover between the supplier 3 and the base 100 in the top-bottom direction. The rear surface of the center cover 66 may face the condenser 132 in the front-rear direction, and protect a plurality of parts.

In addition, a front portion of the supplier 3 may be placed on the top end of the center cover 66, and the supplier 3 may be supported by the center cover 66.

Meanwhile, the beverage extraction valve 62 may be mounted to the center cover 66. The beverage extraction valve 62 may be mounted to protrude forward from the center cover 66. The beverage extraction valve 62 may be mounted to the center cover 66 to be located at the top side of the beverage container 101.

The beverage maker may include a controller 109 that controls the beverage maker.

The controller 109 may include a main PCB 109C.

The controller 109 may include a wireless communication element that performs wireless communication with a wireless communication device such as a remote controller or a portable terminal. The wireless communication element, such as a Wi-Fi module or a Bluetooth module, is not limited to its kind as long as it can perform wireless communication with a remote controller or a wireless communication device. The wireless communication element may be mounted on the main PCB 109C or a display PCB which will be described later.

The controller 109 may include an input unit that receives a command related to the manufacturing of the beverage maker. The input unit may include a rotary knob 109A and a rotary switch 109B switched by the rotary knob 109A. A knob hole 106A through which the rotary knob 109A rotatably passes may be formed at one side of the water tank supporter 106. The rotary knob 109A may be disposed such that at least one portion of the rotary knob 109A is exposed to the outside. The rotary switch 109B may be mounted on the main PCB 109C. The input unit may include a touch screen that receives a command of the user in a touch scheme. The touch screen may be provided in a display 109D which will be described later. The user may input a command through the remote controller or the wireless communication device, and the controller 109 may receive the command of the user through the wireless communication element.

The controller 109 may include the display 109D that displays various information of the beverage maker. The display 109D may include a display element such as LCD, LED, or OLED. The display 109D may include the display PCB on which the display element is mounted. The display PCB may be mounted on the main PCB 109C or be connected to the main PCB 109C through a separate connector.

The display 109D may display information input by the input unit.

The display 109D may display information of the beverage brewing pack 12 and information on a fermentation time of beverage materials, a beverage completion time, or the like. The fermentation time of the beverage materials or the beverage completion time may be changed depending on kinds of the beverage materials contained in the beverage brewing pack 12. If beverage brewing pack 12 approaches the fermentation tank assembly 11, the controller 109 may acquire information from the beverage brewing pack 12 through a communication module such as NFC.

In some implementations, a compact chip 109E (see FIG. 14) in which various information related to the beverage materials may be attached in the shape of a sticker, etc. to the beverage brewing pack 12, and the chip 109E and an NFC tag 109F (see FIG. 14) that transmits/receives data may be installed in the beverage maker. In such implementations, the NFC tag 109F may be mounted on the fermentation tank assembly 11, the main PCB 109C, or the display PCB. When the NFC tag 109F is mounted on the fermentation tank assembly 11, the NFC tag 109F may be mounted on the opening 111 of the fermentation tank 112 or the fermentation tank cover 114. The NFC tag 109F may be connected to the controller 109 through a data line.

If the beverage brewing pack 12 is accommodated in the fermentation tank assembly 11, the controller 109 may acquire information of the beverage brewing pack 12 from a chip provided in the beverage brewing pack 12.

The controller 109 may transmit the information acquired from the NFC tag 109F to the display 109D or the wireless communication device, and the display 109D or the wireless communication device may display kinds of beverage materials, a total fermentation time, a beverage completion time, or the like.

The display 109D may display various information related to brewing of beverage while the beverage is being brewed. The controller 109 may be connected to the temperature sensor 16. The controller 109 may transmit information on a temperature sensed by the temperature sensor 16 to the display 109D or the wireless communication device, and the display 109D or the communication device may display the temperature sensed by the temperature sensor 16 through a numerical value, a graph, or the like.

The display 109D may display a completion degree of the beverage, an amount of carbonic acid contained in the beverage, or the like through a numerical value, a graph, or the like while the beverage is being brewed.

The display 109D may differently display a completion degree of the beverage in primary fermentation and a completion degree of the beverage in secondary fermentation. The amount of carbonic acid in the beverage of the beverage brewing pack 12 may be gradually increased as time elapses. The controller 109 may detect a pressure in the beverage brewing pack 12 through the pressure sensor 72, and detect a temperature of the fermentation tank assembly 11 through the temperature sensor 16. The controller 109 may calculate an amount of carbonic acid using the detected pressure and temperature according to a preset equation or table. The controller 109 may transmit information on the calculated amount of carbonic acid to the display 109D or the wireless communication device, and at least one of the display 109D and the wireless communication device may display the calculated amount of carbonic acid.

The display 109D may display a remaining amount of the beverage after the beverage is completely brewed.

If the secondary fermentation which will be described later is ended, the controller 109 may determine that the beverage has been completely brewed.

The controller 109 may add up at least one of a time at which a micro switch 630 which will be described later is on, a time at which the air pump 152 is driven, and a time at which the main valve 9 is on after the beverage is completely brewed. The controller 109 may calculate an extraction amount of the beverage according to the added-up time, and calculate a remaining amount of the beverage from the calculated extraction amount. The controller 109 may transmit information on the remaining amount of the beverage to the display 109D or the wireless communication device, and at least one of the display 109D and the wireless communication device may display the remaining amount of the beverage.

Figure 5:
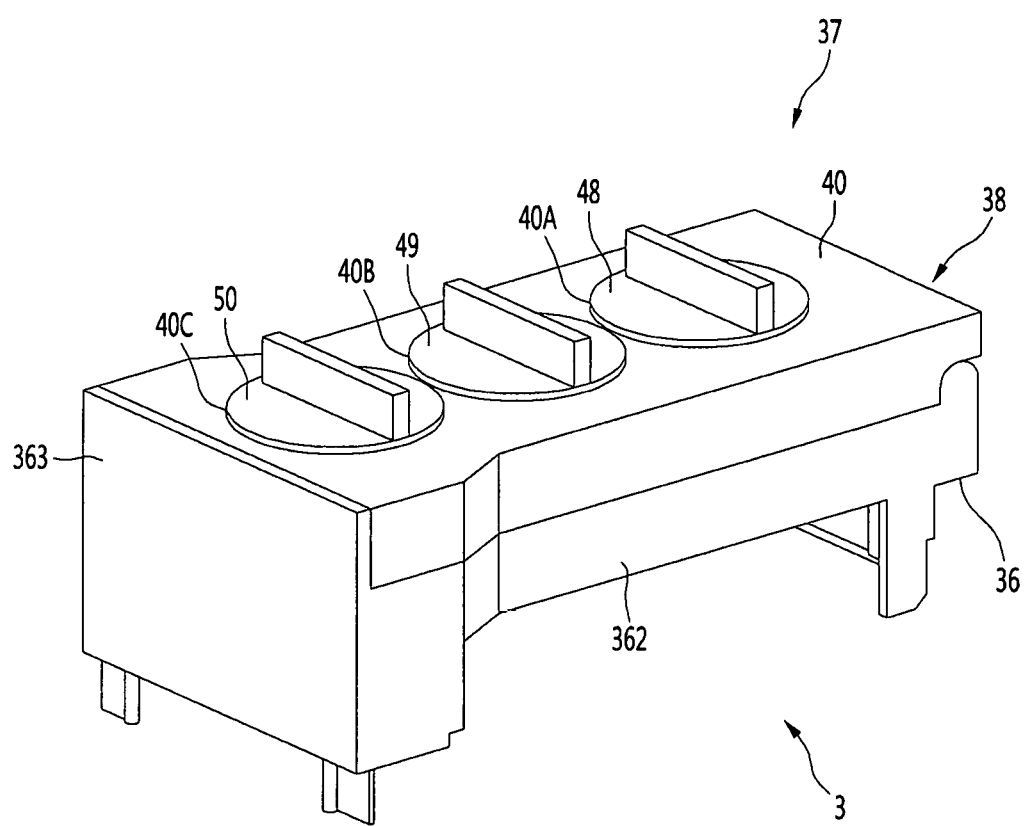
FIG. 5 is a diagram illustrating an example of a perspective view of a supplier of the beverage maker according to some implementations.
Figure 6:
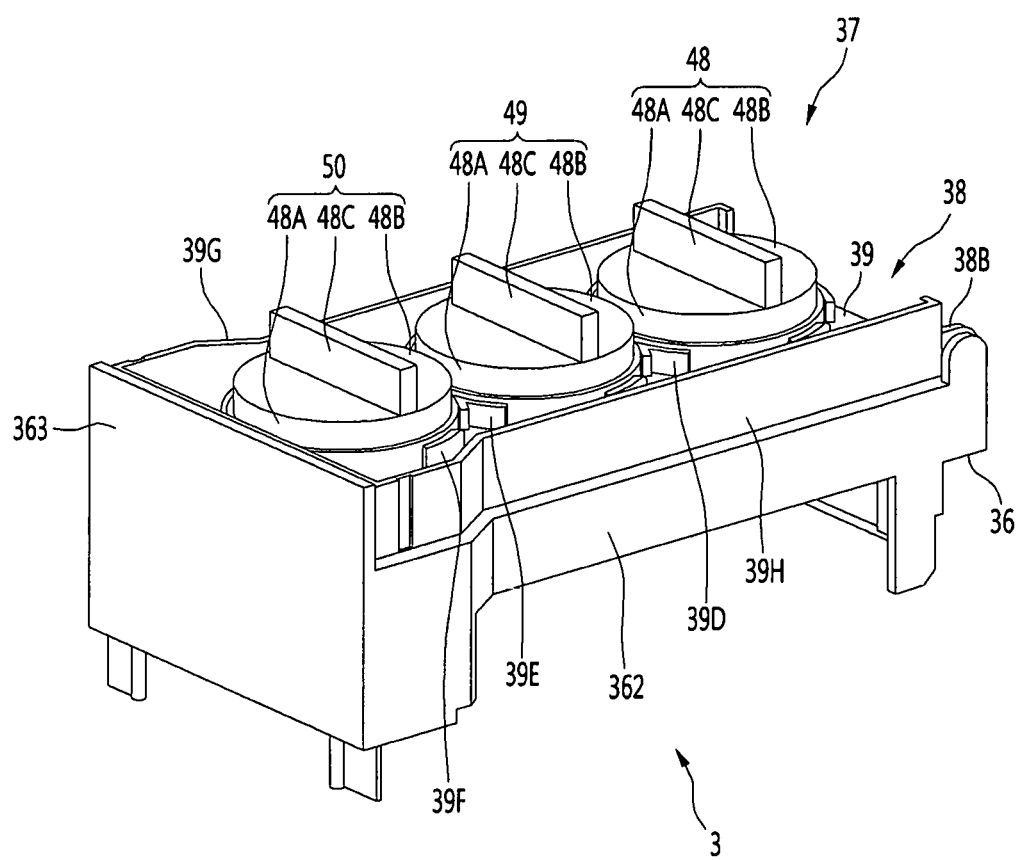
FIG. 6 is a diagram illustrating an example of a perspective view of an inside of a lid module shown in FIG. 5.
Figure 7:
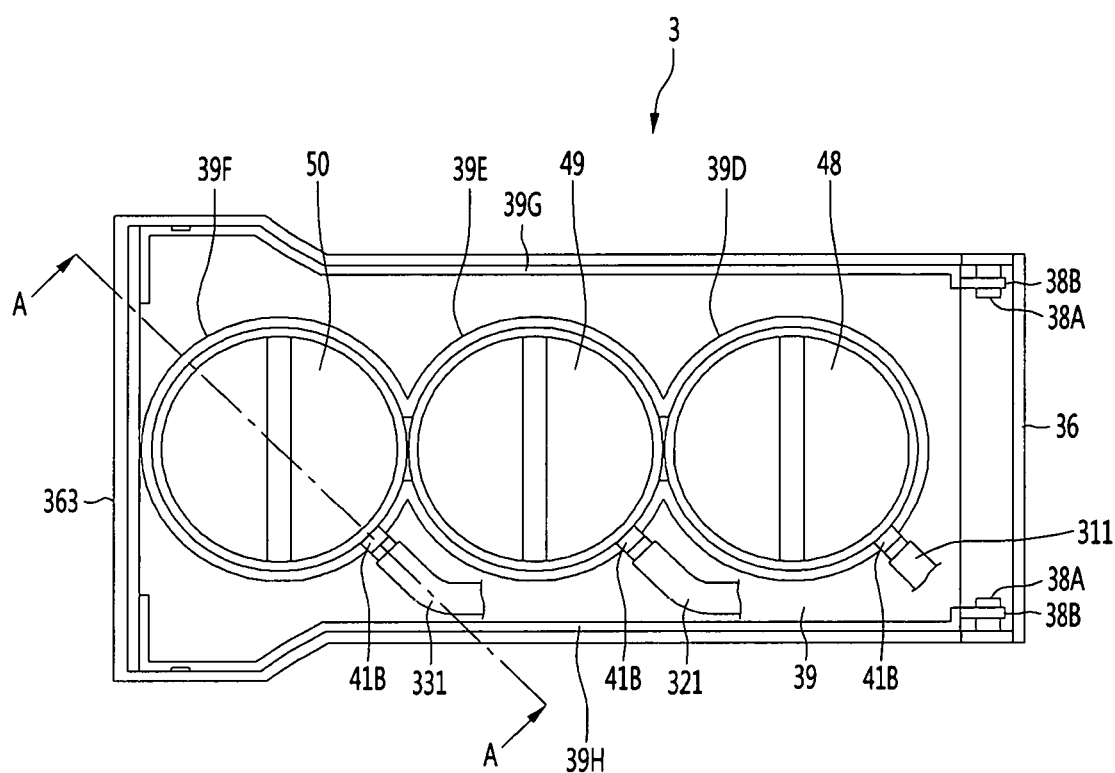
FIG. 7 is a diagram illustrating an example of a plan view of an inside of the supplier of the beverage maker according to some implementations.
Figure 8:
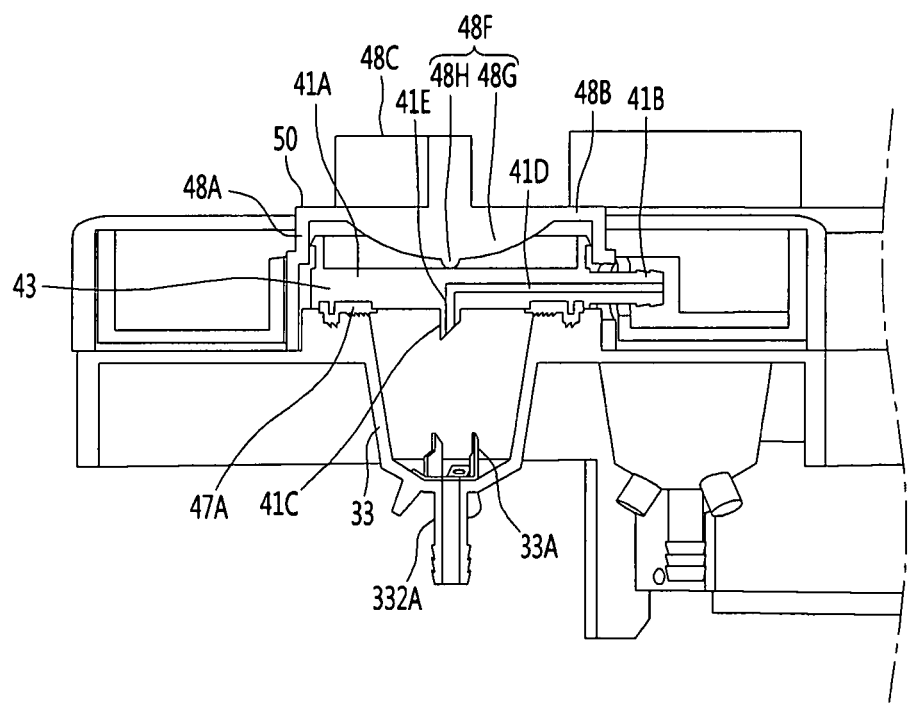
FIG. 8 is a diagram illustrating an example of a sectional view taken along line A-A of FIG. 7.
Figure 9:
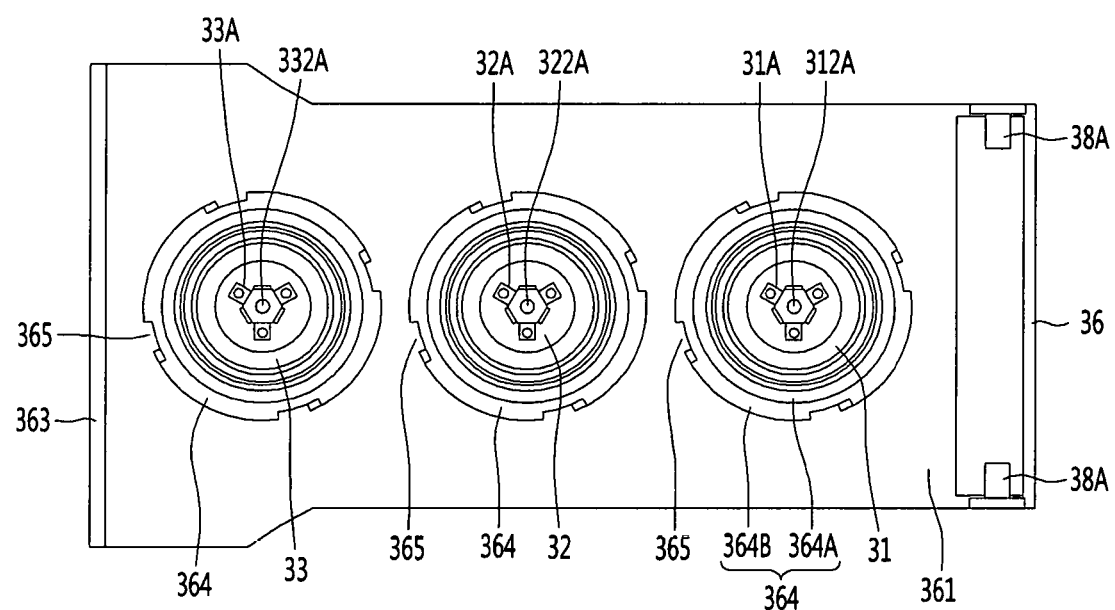
FIG. 9 is a diagram illustrating an example of a plan view of a capsule accommodation body of the beverage maker according to some implementations.
Figure 10:
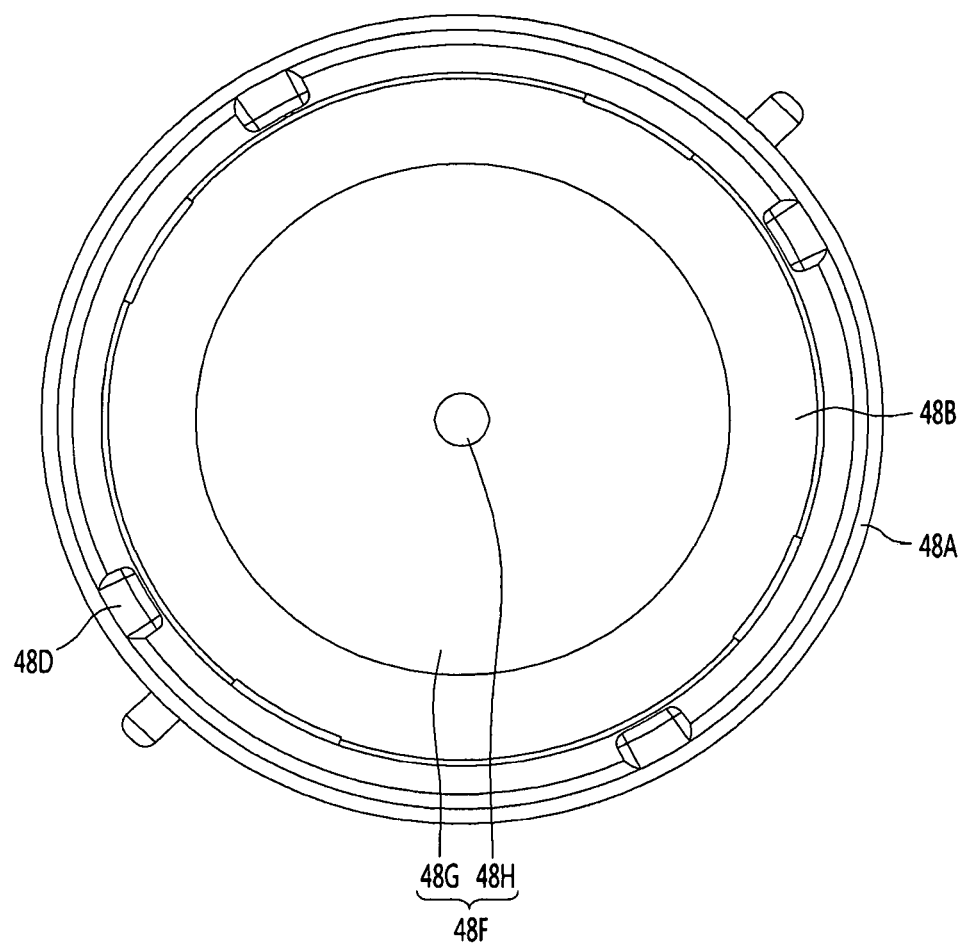
FIG. 10 is a diagram illustrating an example of a bottom view of a locking mechanism for the capsule accommodation body of the beverage maker according to some implementations.
Figure 11:
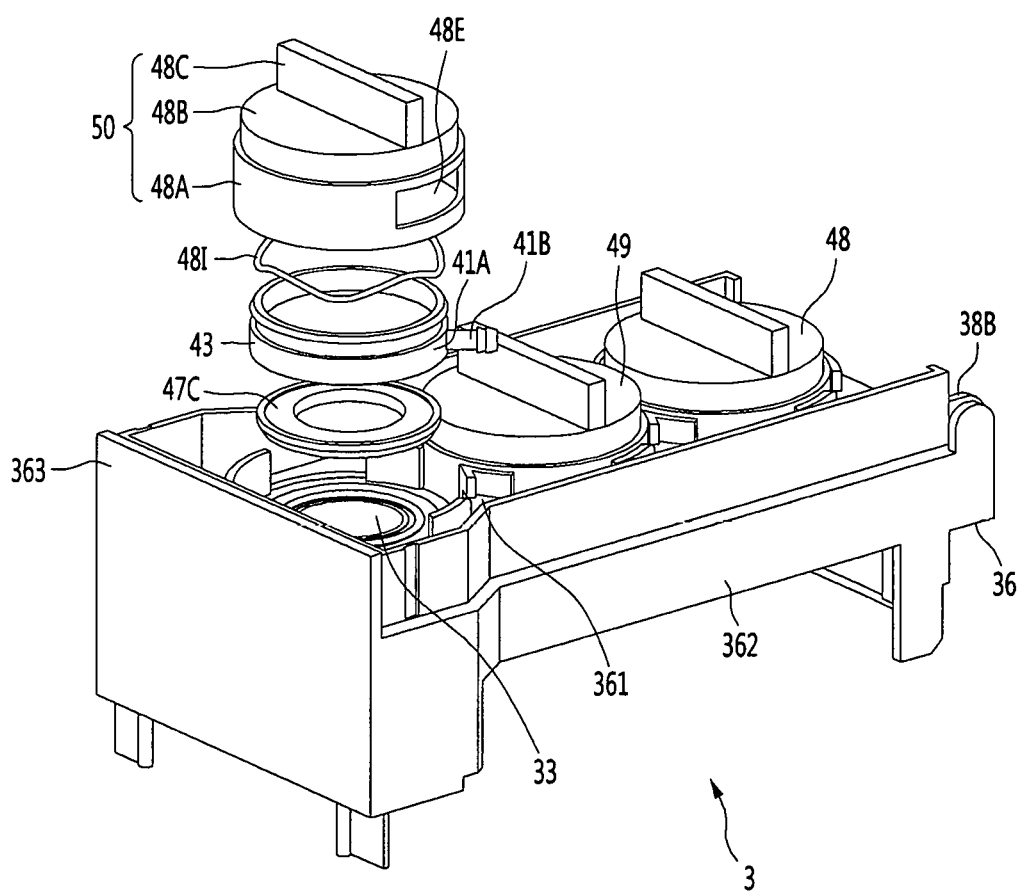
FIG. 11 is a diagram illustrating an example of a partially exploded perspective view of the supplier of the beverage maker according to some implementations.
Figure 12:
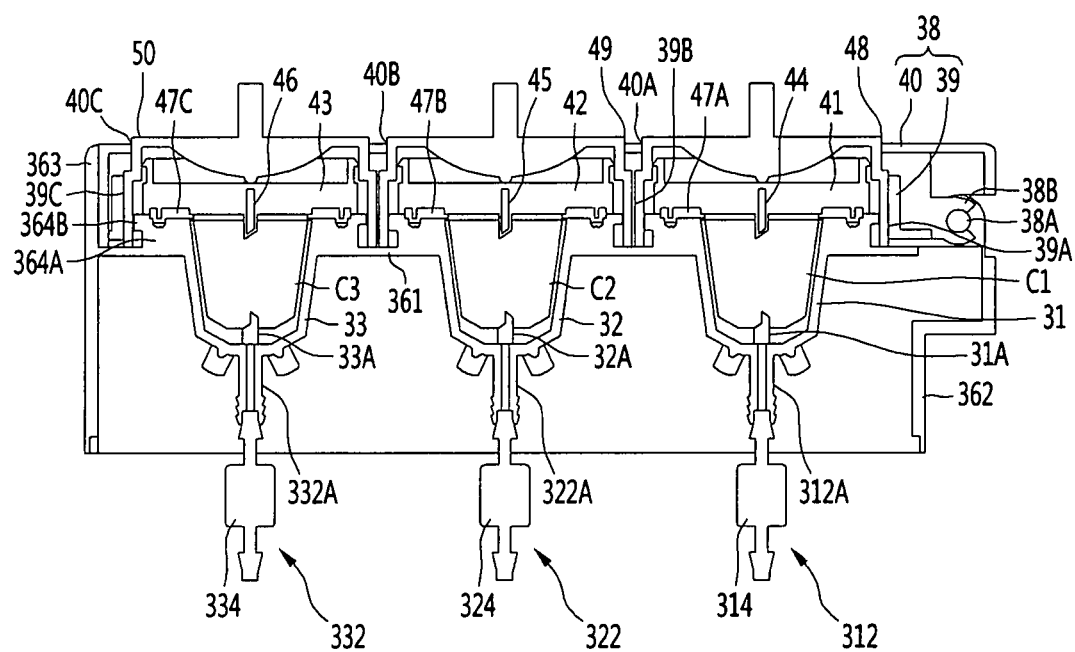
FIG. 12 is a diagram illustrating an example of a sectional view of an inside of the supplier of the beverage maker according to some implementations.
Figure 13:
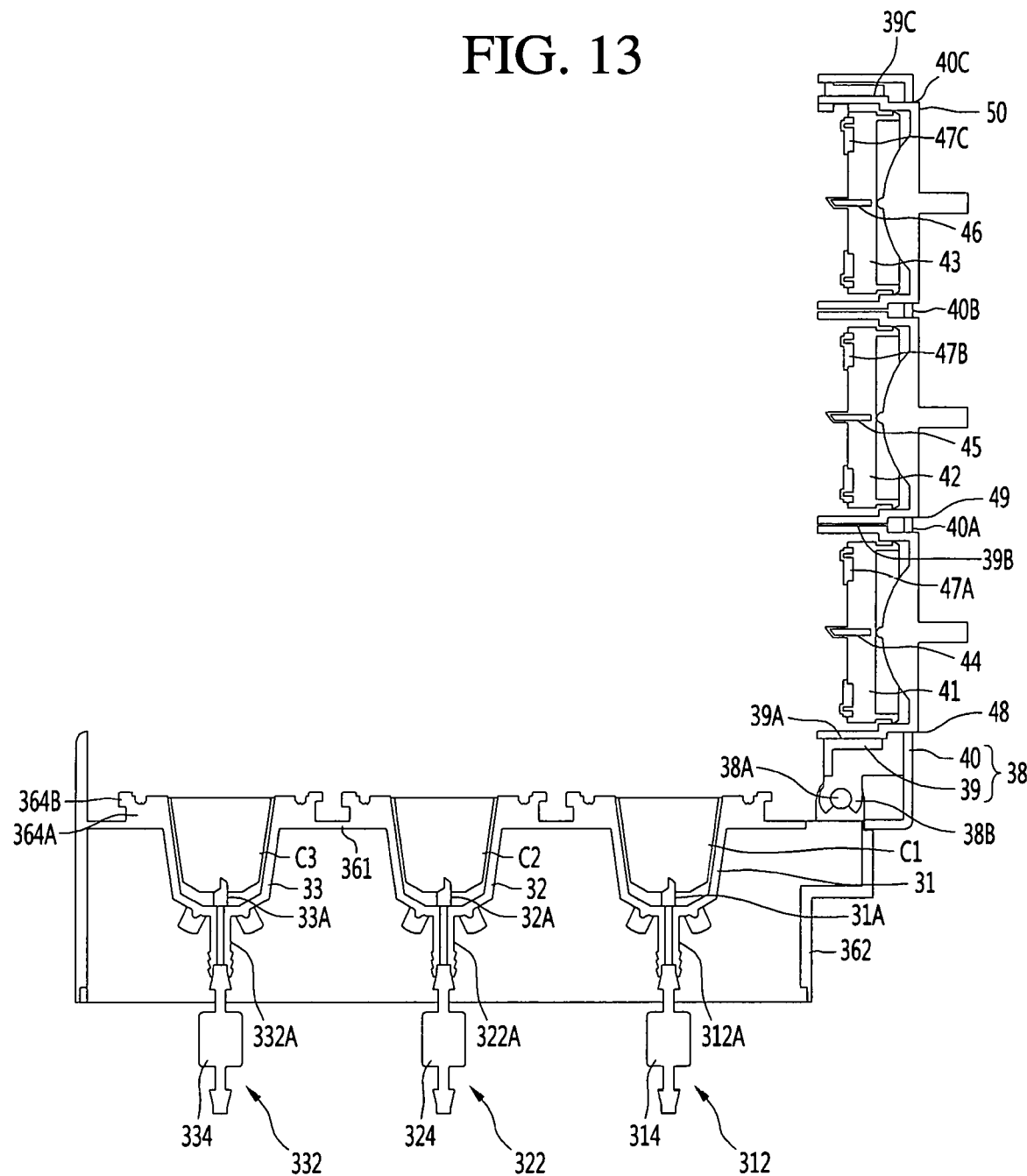
FIG. 13 is a diagram illustrating an example of a sectional view when a plurality of capsule accommodation parts shown in FIG. 12 are opened.

FIG. 5 is a perspective view of the supplier of the beverage maker according to some implementations. FIG. 6 is a perspective view illustrating an inside of the lid module shown in FIG. 5. FIG. 7 is a plan view illustrating an inside of the supplier of the beverage maker according to some implementations. FIG. 8 is a sectional view taken along line A-A of FIG. 7. FIG. 9 is a plan view of the capsule accommodation body of the beverage maker according to some implementations. FIG. 10 is a bottom view of a locking mechanism for the capsule accommodation body of the beverage maker according to some implementations. FIG. 11 is a partially exploded perspective view illustrating the supplier of the beverage maker according to some implementations. FIG. 12 is a sectional view illustrating an inside of the supplier of the beverage maker according to some implementations. FIG. 13 is a sectional view when the plurality of capsule accommodation parts shown in FIG. 12 are opened.

A plurality of capsule accommodation parts 31, 32, and 33 in which the capsules C1, C2, and C3 containing beverage making materials are separably accommodated may be formed in the capsule accommodation body 36.

The plurality of capsule accommodation parts 31, 32, and 33 may be disposed in a row in the capsule accommodation body 36. The plurality of capsule accommodation parts 31, 32, and 33 may be formed to be spaced apart from one another in the front-rear direction or the left-right direction. The beverage maker is preferably configured to be slim in the left-right direction. The supplier 3 may be formed long in the front-rear direction, and the plurality of capsule accommodation parts 31, 32, and 33 may be formed to be spaced apart from one another in the front-rear direction in the capsule accommodation body 36.

The capsule accommodation body 36 may be connected to the main flow path 2 and the supplier exit flow paths 312, 322, and 332, which are shown in FIG. 1. The capsule accommodation body 36 may include lower guide parts 312A, 322A, and 332A at which a mixture of water and materials is guided. The lower guide parts 312A, 322A, and 332A may be formed to protrude downward of the capsule accommodation parts 31, 32, and 33. Extraction flow paths through the mixture of the water and the materials is guided may be formed in the lower guide parts 312A, 322A, and 332A. The lower guide parts 312A, 322A, and 332A may become portions of the supplier exit flow paths 312, 322, and 332 shown in FIG. 1. The check valves 314, 324, and 334 may be, connected to the lower guide parts 312A, 322A, and 332A.

The capsule accommodation body 36 may include capsule punching members 31A, 32A, and 33A forming holes in the capsules C1, C2, and C3. The capsule punching members 31A, 32A, and 33A may be installed to protrude at inner lower portions of the capsule accommodation parts 31, 32, and 33. The capsule punching members 31A, 32A, and 33A may be installed at inner bottom surfaces of the capsule accommodation parts 31, 32, and 33. When the capsules C1, C2, and C3 are mounted, the capsules C1, C2, and C3 may be inserted into the capsule accommodation parts 31, 32, and 33 at upper positions of the capsule accommodation parts 31, 32, and 33, and lower portions of the capsules C1, C2, and C3 may be in contact with the capsule punching members 31A, 32A, and 33A located at the capsule accommodation parts 31, 32, and 33 to be cut out, and holes through which the water and the materials are discharged together may be formed at the lower portions of the capsules C1, C2, and C3.

The capsule accommodation body 36 will be described in detail as follows.

A first capsule punching member 31A forming a hole in the first capsule C1 may be installed at the first capsule accommodation part 31 in which the first capsule C1 is accommodated. A first lower guide part 312A having an extraction flow path through which a mixture of water and a material is guided may be formed at a lower portion of the first capsule accommodation part 31. In addition, the first check valve 314 may be connected to the first lower guide part 312A. The first lower guide part 312A may constitute a portion of the first supplier exit flow path 312 shown in FIG. 1.

A second capsule punching member 32A forming a hole in the second capsule C2 may be installed at the second capsule accommodation part 32 in which the second capsule C2 is accommodated. A second lower guide part 322A having an extraction flow path through which a mixture of water and a material is guided may be formed at a lower portion of the second capsule accommodation part 32. In addition, the second check valve 324 may be connected to the second lower guide part 322A. The second lower guide part 322A may constitute a portion of the second supplier exit flow path 322 shown in FIG. 1.

A third capsule punching member 33A forming a hole in the third capsule C3 may be installed at the third capsule accommodation part 33 in which the third capsule C3 is accommodated. A third lower guide part 332A having an extraction flow path through which a mixture of water and a material is guided may be formed at a lower portion of the third capsule accommodation part 33. In addition, the third check valve 334 may be connected to the third lower guide part 332A. The third lower guide part 332A may constitute a portion of the third supplier exit flow path 332 shown in FIG. 1.

The capsule accommodation body 36 may include a horizontal plate 361 (see FIGS. 12 and 13). The capsule accommodation body 36 may further include a lower protection part 362 protruding downward from the horizontal plate 361 to protect the plurality of capsule accommodation parts 31, 32, and 33. In some implementations, as shown in FIGS. 6 and 7, the capsule accommodation body 36 may further include an upper protection part 363 formed at the opposite side of a hinge formed by hinge 38A and hinge shaft connecting part 38B to face one surface of the lid module 37.

The plurality of capsule accommodation parts 31, 32, and 33 may be provided to protrude in the lower direction from the horizontal plate 361.

The lower protection part 362 may be formed to surround the front, rear, left and right of portions of the plurality of capsule accommodation parts 31, 32, and 33, which are located under the horizontal plate 361.

The upper protection part 363 may be formed to protrude in the upper direction from the lower protection part 362. The upper protection part 363 may protrude to have a height covering the entire surface of the lid module 37.

The plurality of capsule accommodation parts 31, 32, and 33 may be opened or closed together by the lid module 37. The sum of areas of the plurality of capsule accommodation parts 31, 32, and 33 may be smaller than an area of the lid module 37.

The lid module 37 may open/close the plurality of capsule accommodation parts 31, 32, and 33 together. As shown in the examples of FIGS. 6 and 7, the lid module 37 may be connected to the capsule accommodation body 36 by the hinge formed by hinge shaft 38A and hinge shaft connecting part 38B. A hinge shaft 38A may be formed at any one of the lid module 37 and the capsule accommodation body 36. A hinge shaft connecting part 38B rotatably supported by the hinge shaft 38A may be formed at the other of the lid module 37 and the capsule accommodation body 36. The lid module 37 may be vertically rotated about the hinge shaft 38A. The lid module 37 may be formed larger than the sum of the areas of the plurality of capsule accommodation parts 31, 32, and 33, and be rotated about the hinge shaft 38A to open or close all of the plurality of capsule accommodation parts 31, 32, and 33.

Meanwhile, the supplier 3 may include a lid module for each capsule accommodation part. That is, in the supplier 3, one lid module may open/close one capsule accommodation part. In this case, if three capsule accommodation parts are formed in the supplier 3, three lid modules capable of being rotated independently from one another may be connected to the capsule accommodation body 36. However, if a plurality of lid modules are installed in the capsule accommodation body 36, the number of parts of the supplier 3 increases, and an operation of mounting or separating a plurality capsules may be cumbersome.

Meanwhile, when one lid module 37 opens/closes all of the plurality of capsule accommodation parts 31, 32, and 33, the number of parts of the supplier 3 can be minimized, and the structure of the supplier 3 can be simplified. Further, the user can simply handle the supplier 3. The user can open all of the plurality of capsule accommodation parts 31, 32, and 33 through a simple operation of rotating the lid module 37 in the upper direction. In addition, the user can simultaneously cover all of the plurality of capsule accommodation parts 31, 32, and 33 through a simple operation of rotating the lid module 37 in the lower direction.

The supplier 3 may be configured to allow water to be supplied through the lid module 37. The lid module 37 may include the lid 38 connected to the capsule accommodation body 36 by the hinge shaft 38A and hinge shaft connecting part 38B, and one or more water supply bodies 41, 42, and 43 disposed at the lid 38. Meanwhile, the lid module 37 may further include one or more locking mechanisms, which may be referred to as lockers. In the example of FIG. 5, lockers 48, 49, and 50 are rotatably disposed at the lid 38, the one or more lockers 48, 49, and 50 being locked to or unlocked from the capsule accommodation body 36.

The one or more water supply bodies 41, 42, and 43 may be disposed at the lid 38, and the one or more lockers 48, 49, and 50 may be rotatably disposed at the lid 38. The lid 38 may be configured as an assembly of a plurality of members.

The lid 38 may include a lower lid 39 and an upper lid 40. One of the lower lid 39 and the upper lid 40 may be connected to the capsule accommodation body 36.

The lower lid 39 may be connected to the capsule accommodation body 36 by the hinge shaft 38A and hinge shaft connecting part 38B, and the upper lid 40 may be coupled to the lower lid 39 to cover the top surface of the lower lid 39.

Lower through-holes 39A, 39B, and 39C through which lower portions of the lockers 48, 49, and 50 pass may be formed in the lower lid 39. Supporting walls 39D, 39E, and 39F surrounding at least portions of the outer surfaces of the lockers 48, 49, and 50 may be formed at the lower lid 39.

The lower lid 39 may further include a pair of side walls 39G and 39H, and the supporting walls 39D, 39E, and 39F may be formed to be located between the pair of side walls 39G and 39H. A space in which portions of the supplier entrance flow paths 311, 321, and 331 shown in FIG. 1 can be accommodated may be formed in the lower lid 39. The space of the lower lid 39, in which the portions of the supplier entrance flow paths 311, 321, and 331 can be accommodated, may be formed between the pair of side walls 39G and 39H.

When a plurality of lockers 48, 49, and 50 are provided at the lid 38, a first lower through-hole 39A through which a lower portion of a first locker 48 passes may be formed in the lower lid 39, a second lower through-hole 39B through which a lower portion of a second locker 49 passes may be formed in the lower lid 39, and a third lower through-hole 39C through which a lower portion of a third locker 50 passes may be formed in the lower lid 39. In addition, a first supporting wall 39D surrounding at least one portion of the outer surface of the first locker 48 may be formed at the lower lid 39, a second supporting wall 39E surrounding at least one portion of the outer surface of the second locker 49 may be formed at the lower lid 39, and a third supporting wall 39F surrounding at least one portion of the outer surface of the third locker 50 may be formed at the lower lid 39.

The upper lid 40 may be coupled to the lower lid 39, and upper through-holes 40A, 40B, and 40C through which upper portions of the lockers 48, 49, and 50 pass may be formed in the upper lid 40. The upper lid 40 may be coupled to the lower lid 39 to cover the top surface of the lower lid 39. At least portions of the supplier entrance flow paths 311, 321, and 331 shown in FIG. 1 may be accommodated between the lower lid 39 and the upper lid 40.

In addition, when a plurality of lockers 48, 49, and 50 are provided at the lid 38, a first upper through-hole 40A through which an upper portion of the first locker 48 passes may be formed in the upper lid 40, a second upper through-hole 40B through which an upper portion of the second locker 49 passes may be formed in the upper lid 40, and a third upper through-hole 40C through which an upper portion of the third locker 50 passes may be formed in the upper lid 40. Portions of the lockers 48, 49, and 50 may be disposed to be exposed to the outside of the upper lid 40.

The water supply bodies 41, 42, and 43 may be connected to the water supply flow path 4 and the supplier entrance flow paths 311, 321, and 331, which are shown in FIG. 1. Inner water supply flow paths 44, 45, and 46 that guide water to the capsules C1, C2, and C3 accommodated in the capsule accommodation parts 31, 32, and 33 may be formed in the water supply bodies 41, 42, and 43. If the supplier entrance flow paths 311, 321, and 331 are connected to the water supply bodies 41, 42, and 43, the inner water supply flow paths 44, 45, and 46 may communicate with the supplier entrance flow paths 311, 321, and 331, and water passing through the supplier entrance flow paths 311, 321, and 331 may be guided to the inner water supply flow paths 44, 45, and 46 to be introduced into the capsules C1, C2, and C3.

The water supply bodies 41, 42, and 43 may be provided at the capsule accommodation parts 31, 32, and 33, respectively, and one water supply body may correspond to one capsule accommodation part.

The first capsule accommodation part 31, the second capsule accommodation part 32, and the third capsule accommodation part 33 may be formed at the capsule accommodation body 36. A first water supply body 41 capable of facing the first capsule accommodation part 31, a second water supply body 42 capable of facing the second capsule accommodation body 32, and a third water supply body 43 capable of facing the third capsule accommodation part 33 may be provided at the lid 38.

A first inner water supply flow path 44 that guides water toward the first capsule accommodation part 31 may be formed in the first water supply body 41. In addition, a second inner water supply flow path 45 that guides water toward the second capsule accommodation part 32 may be formed in the second water supply body 42. In addition, a third inner water supply flow path 46 that guides water toward the third capsule accommodation part 33 may be formed in the third water supply body 43.

The plurality of water supply bodies 41, 42, and 43 installed at the lid 38 have different arrangement positions but may have the same detailed structure. Hereinafter, for convenience, common detailed components of the water supply bodies 41, 42, and 43 are designated by like reference numerals.

Each of the water supply bodies 41, 42, and 43 may include a body 41A in which the inner water supply flow path is formed, and a connecting part 41B that guides water to each of the inner water supply flow paths 44, 45, and 46. In addition, each of the water supply bodies 41, 42, and 43 may further include an upper guide part 41C punching the capsule, the upper guide part 41C guiding water of the inner water supply flow path to the inside of the capsule.

The body 41A may be formed in a disk shape, and be disposed inside the locker which will be described later.

Each of the inner water supply flow paths 44, 45, and 46 may include a horizontal flow path 41D horizontally formed from the outer circumferential surface of the body 41A to the center of the body 41A, and a vertical flow path 41E vertically formed in the lower direction of the body 41A from the horizontal flow path 41D.

The horizontal flow path 41D may communicate with the inside of the connecting part 41B. In addition, the vertical flow path 41E may communicate with the inside of the upper guide part 41C.

The connecting part 41B may be formed to protrude from the body 41A. The connecting part 41B may protrude at the circumferential surface of the body 41A. The supplier entrance flow paths 311, 321, and 331 may be connected to the connecting part 41B.

Meanwhile, at least one sealing member adhered closely to the top surface of the capsule accommodation body 36 and the bottom surfaces of the water supply bodies 41, 42, and 43 may be disposed between the capsule accommodation body 36 and the water supply bodies 41, 42, and 43. A first sealing member 47A disposed between the bottom surface of the first water supply body 41 and the top surface of the capsule accommodation body 36, a second sealing member 47B disposed between the bottom surface of the second water supply body 42 and the top surface of the capsule accommodation body 36, and a third sealing member 47C disposed between the bottom surface of the third water supply body 43 and the top surface of the capsule accommodation body 36 may be disposed between the capsule accommodation body 36 and the lid module 37.

The lid module 37 may include the plurality of lockers 48, 49, and 50.

The lockers 48, 49, and 50 may be disposed to be rotated about vertical center axes. The lockers 48, 49, and 50 may serve as pushers that press the water supply bodies 41, 42, and 43 using the capsule accommodation parts 31, 32, and 33. If the user rotates the lockers 48, 49, and 50 in a locking direction, the lockers 48, 49, and 50 may pressurize the water supply bodies 41, 42, and 43 in directions close to the capsule accommodation parts 31, 32, and 33, and the water supply bodies 41, 42, and 43 may pressurized by the capsules C1, C2, and C3 accommodated in the capsule accommodation parts 31, 32, and 33.

The lockers 48, 49, and 50 may be provided in the water supply bodies 41, 42, and 43, respectively, and one locker may correspond to one water supply body.

When the first water supply body 41, the second water supply body 42, and the third water supply body 43 are disposed at the lid 38, the first locker 48 capable of pressing the first water supply body 41 in the lower direction, the second locker 49 capable of pressing the second water supply body 42 in the lower direction, and the third locker 50 capable of pressing the third water supply body 43 in the lower direction may be provided in the lid 38.

The first locker 48 may include a water supply body accommodation part that accommodates the first water supply body 41 therein, and the water supply body accommodation part may be disposed to surround the outer circumferential surface and top surface of the first water supply body 41.

The second locker 49 may include a water supply body accommodation part that accommodates the second water supply body 42 therein, and the water supply body accommodation part may be disposed to surround the outer circumferential surface and top surface of the second water supply body 42.

The third locker 50 may include a water supply body accommodation part that accommodates the third water supply body 43 therein, and the water supply body accommodation part may be disposed to surround the outer circumferential surface and top surface of the third water supply body 43.

The plurality of lockers 48, 49, and 50 disposed in the lid 38 have different arrangement positions, but may have the same detailed structure. Hereinafter, for convenience, common detailed components of the lockers 48, 49, and 50 are designated by like reference numerals.

Each of the locker 48, 49, and 50 may include a hollow cylinder 48A having a space in which the water supply body is accommodated, the hollow cylinder 48A surrounding the outer circumference of the water supply body, and a top plate part 48B formed at the top of the hollow cylinder 48A to cover the top surface of the water supply body. Each of the lockers 48, 49, and 50 may further include a handle part 48C protruding from the top plate body 48B.

The hollow cylinder 48A may have an internal diameter where a locker holding part 364 formed in the capsule accommodation body 36 is inserted thereinto. The internal diameter of the hollow cylinder 48A may be greater than an external diameter of the locker holding part 364 formed in the capsule accommodation body 36. The hollow cylinder 48A may be restricted or unrestricted by the locker holding part 364 in a state in which the hollow cylinder 48A surrounds the locker holding part 364.

Each of the lockers 48, 49, and 50 may further include a projection 48D formed at the hollow cylinder 48A to be held by the locker holding part 364 formed in the capsule accommodation body 36 or to pass through a projection entrance part 365 formed at the locker holding part 364.

The projection 48D may be formed to protrude at the lower inner circumferential surface of the hollow cylinder 48A. A plurality of projections 48D may be formed at an equal distance at the inner circumference of the hollow cylinder 48A.

A plurality of locker holding parts 364 may be formed in the capsule accommodation body 36. The locker holding part 364 may be formed as many as the number of lockers 48, 49, and 50 in the capsule accommodation body 36. The plurality of locker holding parts 364 may be formed to be spaced apart from each other in the front-rear direction in the capsule accommodation body 36.

The locker holding part 364 may include a protruding part 364A protruding in the upper direction from the horizontal plate 361 of the capsule accommodation body 36, and a ring part 364B protruding in a ring shape at the upper outer circumference of the protruding part 364A.

The projection entrance part 365 may be formed to penetrate in the top-bottom direction at a portion of the ring part 364B. The projection entrance part 365 may be formed at the ring part 364a to have the same number as the projections 48D. A plurality of projection entrance parts 365 may be formed at an equal distance at the ring part 364A.

The projection 48D may pass through the projection entrance part 365 at the upper side of the projection entrance part 365. When the locker is rotated, the projection 48D may be moved downward of the ring part 364B, and be held by the ring part 364B in the upper direction.

An avoidance hole 482 that avoids the connecting part formed in the water supply body may be formed long in the hollow cylinder 48A. The avoidance hole 48E may be formed at a portion of the hollow cylinder 48A, and be formed long in the circumferential direction along the hollow cylinder 48A.

The top surface of the top plate part 48B and the handle part 48C may be exposed to the lid 38, and the user may lock or unlock each of the lockers 48, 49, and 50 to or from the capsule accommodation body 36 by rotating the handle part 48C clockwise or counterclockwise.

Meanwhile, each of lockers 48, 49, and 50 may further include a pressurizing part 48F protruding from the bottom surface of the top plate part 48B to pressurize the water supply body in the direction of the capsule accommodation body.

The pressurizing part 48F may protrude in the opposite direction of the handle part 48C. The pressurizing part 48F may include a convex part 48G convexly formed downward from the bottom surface of the top plate part 48B of each of the lockers 48, 49, and 50, and a pressurizing projection 48H protruding downward at the center of the convex part 48G to pressurize the top surface of the water supply body.

If the projection 48D formed at an inner lower portion of the hollow cylinder 48A is moved downward of the projection entrance part 365 by passing through the projection entrance part 365 of the locker holding part 364, the pressurizing projection 48H of the pressurizing part 48F may be in contact with the top surface of the water supply body to pressurize the water supply body in the lower direction.

In this state, if the user rotates the handle part 48C, the projection 48D formed at the inner lower portion of the hollow cylinder 48A may be rotated downward of the ring part 364B about the center of the center axis of the ring part 364B to be locked to the ring part 364B, and the pressurizing part 48F may continuously pressurize the water supply body in the lower direction.

The supplier 3 may further include a spring 481 disposed between the water supply body and the top plate part 48B. When an external force does not act, the spring 481 may push the top plate part 48B of the lock and the water supply body in directions opposite to each other. The spring 481 may be configured as a plate spring entirely formed in a ring shape.

Figure 14:
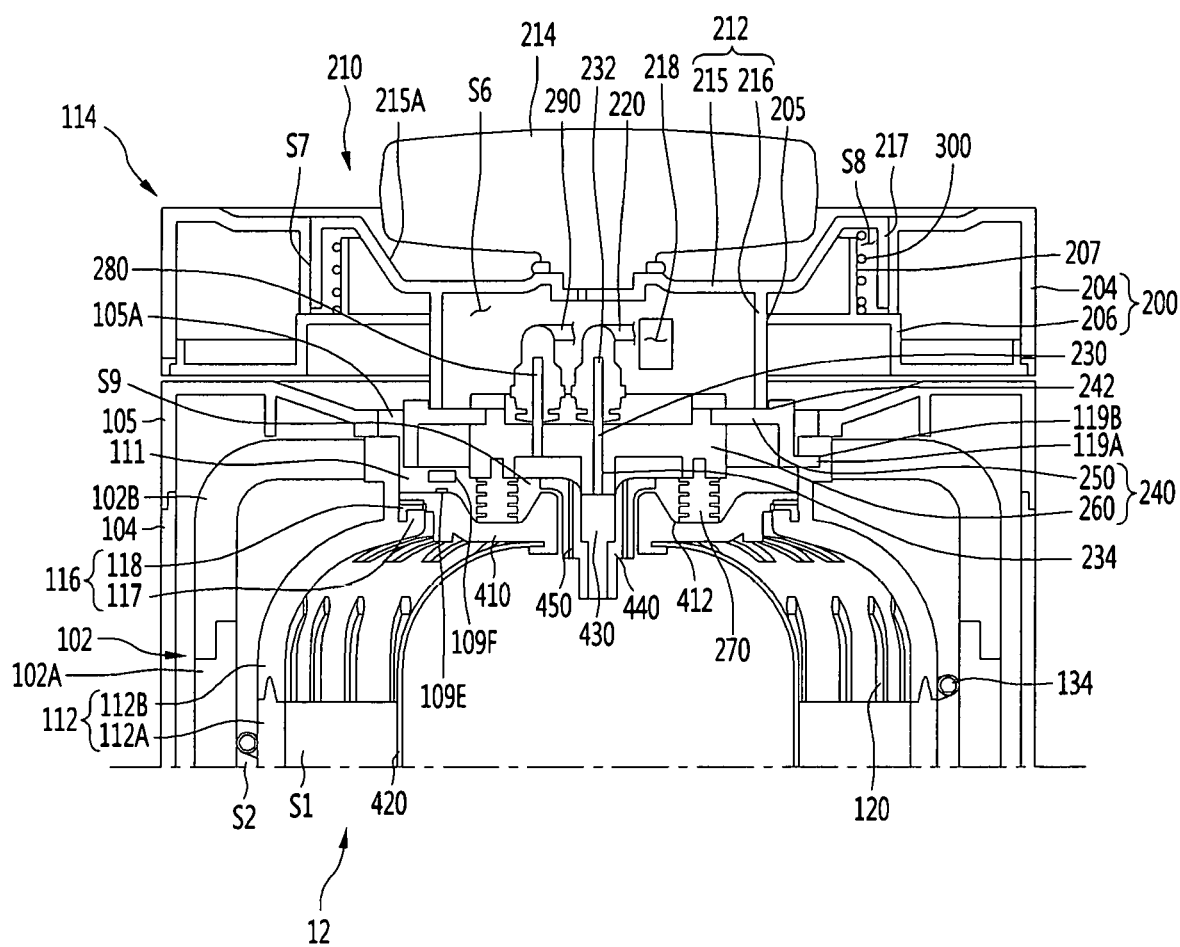
FIG. 14 is a diagram illustrating an example of a sectional view of an inside of a container, such as a fermentation tank assembly, of the beverage maker according to some implementations.
Figure 15:
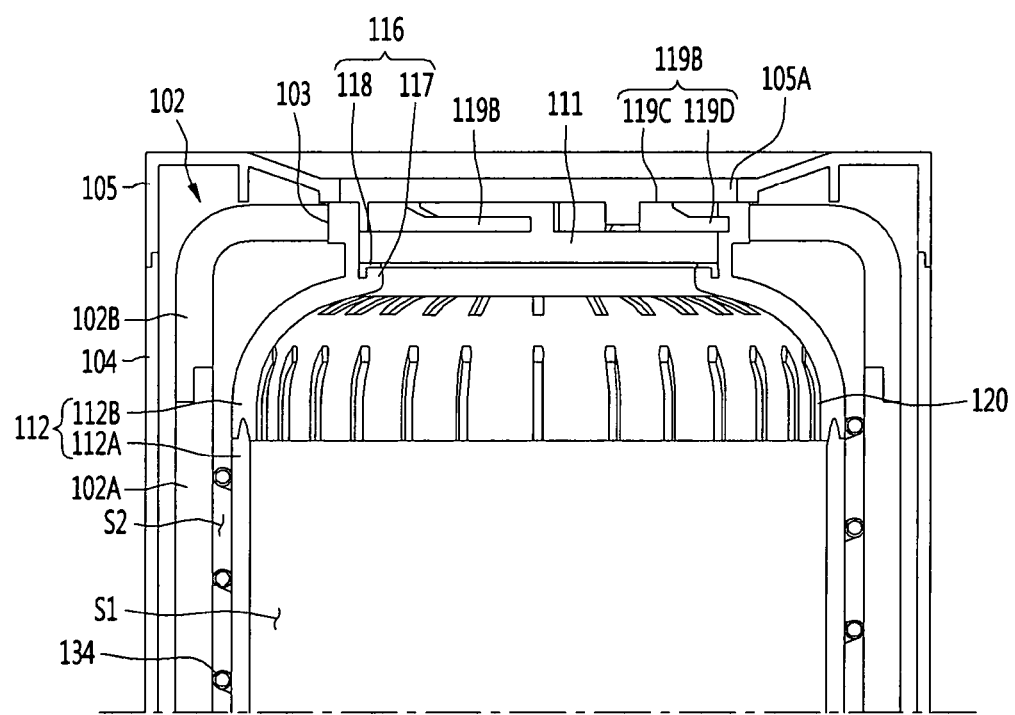
FIG. 15 is a diagram illustrating an example of a sectional view when an opening shown in FIG. 14 is opened.

FIG. 14 is a sectional view illustrating an example of an inside of the fermentation tank assembly of the beverage maker according to some implementations. FIG. 15 is a sectional view when the opening shown in FIG. 14 is opened.

An upper through-hole 105A disposed such that a portion of the fermentation tank cover 114 passes therethrough may be formed at an upper portion of the heat insulating wall cover 104 and 105. The upper through-hole 105A may be formed to be opened in the top-bottom direction in the upper heat insulating wall cover 105.

The fermentation tank 112 may include the seat part 116 on which an upper portion of the beverage brewing pack 12 is mounted.

The seat part 116 may include a sealing member supporting bump 117 protruding from the fermentation tank 112 and a fermentation tank sealing member 118 placed on the sealing member supporting bump 117.

The sealing member supporting bump 117 may protrude in a ring shape in the opening 111.

The fermentation tank sealing member 118 may be placed on the top surface of the sealing member supporting bump 117.

A circumferential portion of the beverage brewing pack 12 may be placed on the top surface of the fermentation tank sealing member 118, and the inside of the fermentation tank 112 may be sealed by the beverage brewing pack 12 and the fermentation tank sealing member 118.

An inserting guide 119B into an inserting projection 119A formed at the fermentation tank cover 114 is rotatably inserted may be formed in the opening 111 of the fermentation tank 112. The inserting guide 119B may be formed at a portion of the opening 111 of the fermentation tank 112. The inserting guide 119B may include a vertical guide groove 119C through which the inserting projection 119A passes approximately in the top-bottom direction, and a horizontal guide groove 119D formed long in the circumferential direction along the opening 111 at a lower portion of the vertical guide groove 119C to guide movement of the inserting projection 119A.

The inserting projection 119A may be protrude in the horizontal direction at a position capable of facing the opening 111 of the fermentation tank 112 when the fermentation tank cover 114 is closed.

The inserting guide 119B may be formed in a recessed shape at a higher position than the sealing member supporting bump 117.

A plurality of ribs 120 that allow a flexible container 420 of the beverage ingredient pack 12, which will be described later, to be spaced apart from the inner surface of the fermentation tank 112 may protrude from the inner wall of the fermentation tank 112. As materials are fermented, gas may be generated in the beverage ingredient pack 12, and the flexible container 420 may be expanded by the gas in the beverage ingredient pack 12. In the beverage maker, when a beverage product is extracted, air supplied from the beverage extraction pressurizing device 15 shown in FIG. 15 may be introduced between the flexible container 420 and the inner surface of the fermentation tank 112, and the plurality of ribs 120 formed on the inner wall of the fermentation tank 112 may assist smooth flow of the air supplied to the inside of the fermentation tank 112 from the beverage extraction pressurizing device 15.

The plurality of ribs 120 may be formed long in the top-bottom direction. The plurality of ribs 120 may be spaced apart from one another in the circumferential direction of the fermentation tank 112 along the inner surface of the fermentation tank 112.

The plurality of ribs 120, referring to FIG. 4, may be formed at each of upper and lower portions of the inner wall of the fermentation tank 112.

In some implementations, the beverage maker 1 may include at least two channels that connect to the beverage ingredient pack (e.g., beverage brewing pack 12) mounted inside the fermentation tank assembly 11. These channels may supply or extract liquids or gases to or from the beverage ingredient pack 12. For example, as shown in the example of FIG. 14, one such channel may include at least the main tube 220 and/or the main flow path part 230. This channel may connect to the inner hollow part 430 of the beverage ingredient pack 12. Another such channel, also shown in the example of FIG. 14, may include at least the sub-tube 290 and/or the sub-flow path part 280. This channel may connect to the gas discharge flow path 450 of beverage ingredient pack 12. In the example of FIG. 14, both of these channels are formed through the fermentation tank cover 114, although implementations are not limited thereto.

Hereinafter, an example of the fermentation tank cover 114 in FIG. 14 will be described in more detail.

The fermentation tank cover 114 may include an outer body 200, an inner body 210 rotatably disposed at the outer body 200, and a lower body assembly 240 coupled to a lower portion of the inner body 210. The lower body assembly 240 may include a main flow path part 230 to which the main tube 220 is connected. An inner space S6 may be formed in at least one of the inner body 210 and the lower body assembly 240. In addition, at least one portion of the main tube 220 may be accommodated in the inner space S6. The main tube 220 may be connected to the main flow path part 230 in the inner space S6 of the main tube 220.

The lower body assembly 240 may include a lower body 250 coupled to the inner body 210, and a flow path body 260 in which the main flow path part 230 is formed.

The outer body 200 may form an appearance of the circumferential surface of the fermentation tank cover 114. The fermentation tank cover 114 may be hinge-connected to the fermentation tank 112 or the heat insulating wall cover 105. In this case, the outer body 200 may be hinge-connected to the fermentation tank 112 or the heat insulating wall cover 105. The outer body 200 may be mounted on the top surface of the heat insulating cover 105. The outer body 200 is preferably connected to the heat insulating wall cover 105 by a hinge.

An inner body accommodation space S7 in which the inner body 210 can be rotatably accommodated may be formed in the outer body 200.

The outer body 200 may surround the outer circumference of the inner body 210 accommodated in the inner body accommodation space S7, and protect the outer circumference of the inner body 210.

The inner body 210 may be disposed in the inner body accommodation space S7 to rotate about a vertical center axis.

The inner body 210 may include an inner frame 212 rotatably disposed in the outer body 200, the inner frame 212 having the inner space S6 formed at a lower portion thereof.

The inner body 210 may include a handle 214 disposed at the top surface of the inner frame 212. The user may rotate the inner body 210 about the vertical center axis of the inner body 210 while grasping the handle 214. When the inner body 210 is rotated, the lower body assembly 240 may be rotated together with the inner body 210.

The inner frame 212 may include an inner upper body part 215, an inner lower body part 216 protruding from the bottom surface of the inner upper body part 215, the inner lower body part 216 having the inner space S6 formed therein, and an outer hollow part 217 protruding at the outer circumference of the inner upper body part 215, the outer hollow part 217 being spaced apart from the inner lower body part 216.

A tube through-hole 218 through which the main tube 220 and a sub-tube 290 which will be described later pass may be formed in the inner frame 212. The tube through-hole 218 may be a hole through which the main tube 220 and the sub-tube 290, extending to the outside from the inner space S6, pass. The tube through-hole 218 is preferably formed at one side of the inner lower body part 216.

The inner upper body part 215 may include a handle accommodation groove part 215A in which at least one portion of the handle 214 is accommodated. The handle accommodation groove part 215A may be formed in a downwardly recessed shape, and be formed larger than the handle 214.

The inner lower body part 216 may protrude in a hollow cylindrical shape from the bottom surface of the inner upper body part 215. The inner space S6 may be formed in the inner lower body part 216 such that the bottom surface of the inner space S6 is opened.

The outer hollow part 217 may be formed to protrude in the lower direction at the outer circumference of the inner upper body part 215. The outer hollow part 217 may be configured as a hollow cylindrical part formed larger than the inner lower body part 216. The outer hollow part 217 may be in surface contact with the inner circumferential surface of the outer body 200, and be supported by the outer body 200.

Meanwhile, the outer body 200 may include an outer frame 204 and an outer base 206 coupled to the outer frame 204, the outer base 206 including an inner body through-hole 205 through which the inner body 210 passes.

The outer body 200 may include an inner hollow part 207 having a smaller size than the outer hollow part 217, the inner hollow part 207 facing the outer hollow part 217. A return spring accommodation space S8 in which a return spring 300 which will be described later is accommodated may be formed between the inner hollow part 207 and the outer hollow part 217.

The inner hollow part 207 may protrude from the top surface of the outer base 206. The inner hollow part 207 may be formed to have a smaller size than the outer hollow part 217 of the inner body 210.

The main tube 220 and the main flow path part 230 may constitute the main flow path connecting part 115 shown in FIG. 1. The main tube 220 may constitute a portion of the main flow path 2 shown in FIG. 1, and the main flow path part 230 may constitute the main flow path connecting part 115 shown in FIG. 2.

The main tube 220 may extend to the outside of the fermentation tank cover 114 through the tube through-hole 218 formed in the fermentation tank cover 114.

The main flow path part 230 may include an upper flow path part 232 protruding to the inner space S6 at an upper portion of the flow path body 260, and a lower flow path part 234 protruding toward the space S1 of the fermentation tank 112 at a lower portion of the flow path body 260.

A lower portion of the main flow path part 230 may be in contact with a pack main flow path formed in the beverage brewing pack 12, which will be described later. The main flow path part 230 may communicate with the pack main flow path of the beverage brewing pack 12.

The lower body assembly 240 may be coupled to the inner frame 212 to seal the inner space S6.

An inner frame insertion groove part 242 into which a bottom end of the inner frame 212 is inserted may be formed in the lower body assembly 240.

The lower body 250 may be coupled to a lower portion of the inner body 210, and at least one portion of the lower body 250 may be inserted into the opening 111.

The inserting projection 119A sliding along the inserting guide 119B formed in the opening 111 of the fermentation tank 112 may be formed at the outer circumferential surface of the lower body 250.

The flow path body 260 may be installed at the lower body 250.

The fermentation tank cover 114 may include a lower sealing member 270 mounted to at least one of the lower body 250 and the flow path body 260, the lower sealing member 270 being adhered closely to the beverage brewing pack 12.

A communication path S9 that guides gas extracted from the beverage brewing pack 12 to a sub-flow path part 280 which will be described later may be formed in the lower sealing member 270. The lower sealing member 270 may be a hollow elastic member having the communication path S9 formed therein.

A portion of the main flow path part 230 may protrude to the communication path S9, and the lower sealing member 270 may protect the main flow path part 230.

Meanwhile, the sub-flow path part 280 communicating with the communication path S9 may be formed in the vicinity of the main flow path part 230.

The sub-flow path part 280 may be formed in the flow path body 260. The sub-flow path part 280 may include an upper flow path part protruding to the inner space S6 at an upper portion of the flow path body 260.

The sub-tube 290 that guides gas passing through the sub-flow path part 280 may be connected to the sub-flow path part 280. At least one portion of the sub-tube 290 may be accommodated in the inner space S6. The sub-tube 290 may extend to the outside of the fermentation tank cover 114 through the tube through-hole 218 formed in the fermentation tank cover 114.

The gas extraction flow path 71 shown in FIG. 1 may be connected to the sub-tube 290, and the sub-tube 290 may constitute a portion of the gas extraction flow path 71 shown in FIG. 1.

The pressure sensor 72 shown in FIG. 1 may sense a pressure of the gas passing through the sub-tube 290.

When the gas extraction valve 73 shown in FIG. 1 is opened, gas in the beverage brewing pack 12 may sequentially pass through a gas discharge flow path 450 formed in the beverage brewing pack 12, the communication path S9 of the lower sealing member 270, the sub-flow path part 280, and the sub-tube 290 and then flow in the pressure sensor 72. The pressure sensor 72 may sense a pressure of the gas in the beverage brewing pack 12 in a state in which the fermentation tank cover 114 is not opened.

The fermentation tank cover 114 may further include the return spring 300 connected to the outer body 200 and the inner body 210. One end of the return spring 300 may be connected to the outer body 200, and the other end of the return spring 300 may be connected to the inner body 210. The return spring 300 may be configured as a coil spring. When the user holds and turns the handle 214 of the inner body 210, the return spring 300 may be elastically deformed, and a return force that rotates the inner body 210 in the opposite direction may be applied to the inner body 210.

Figure 16:
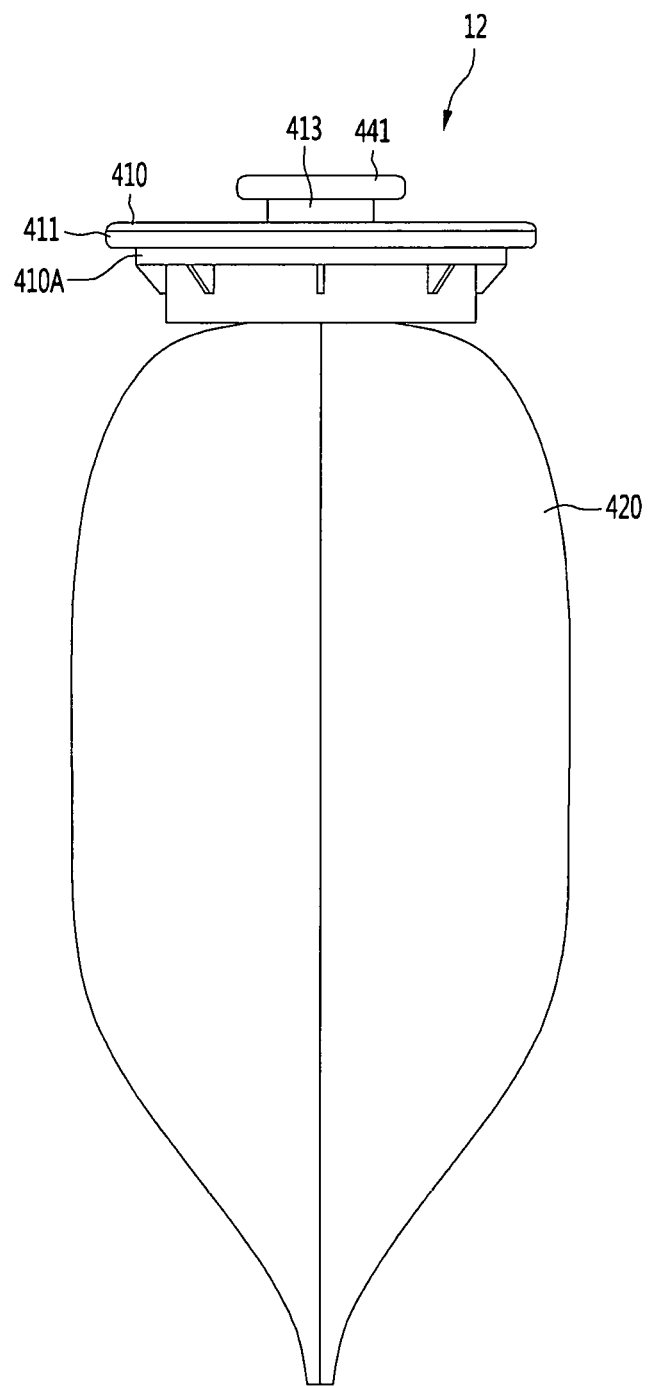
FIG. 16 is a diagram illustrating a side view of an example of a beverage ingredient pack of the beverage maker according to some implementations.

Meanwhile, as shown in FIGS. 14 and 16, the beverage ingredient pack 12 may include an interface portion 410 that provides an interface with the fermentation tank cover 114 in a state in which the fermentation tank cover 114 is closed. In addition to the interface portion 410, the beverage ingredient pack 12 may include the flexible container 420 connected to the interface portion 410, the flexible container 420 accommodating the beverage ingredient materials therein, a main flow path body 440 provided in the interface portion 410, the main flow path body 440 having an inner hollow part 430 formed therein. The gas discharge flow path 450 through which the gas in the beverage ingredient pack 12 is discharged may be formed in the beverage ingredient pack 12.

A sealing member mounting groove part 412 on which a lower portion of the lower sealing member 270 is inserted and mounted may be formed at the top surface of the interface portion 410. The sealing member mounting groove part 412 may be formed in a shape recessed downward from the top surface of the interface portion 410. The sealing member mounting groove part 412 may be formed in a ring shape at the top surface of the interface portion 410. The bottom end of the lower sealing member 270 as a hollow elastic member may be placed on the sealing member mounting groove part 412.

When the beverage ingredient pack 12 is inserted into the fermentation tank 112 to be mounted on the seat part 116, the inner hollow part 430 of the beverage ingredient pack 12 and the gas discharge flow path 450 of the beverage ingredient pack 12 may face upward. The inner hollow part 430 of the beverage ingredient pack 12 and the gas discharge flow path 450 of the beverage ingredient pack 12 may be exposed to the inside of the opening 111 of the fermentation tank 112.

The fermentation tank cover 114 may fall down to cover the opening 111 of the fermentation tank 112 after the beverage ingredient pack 12 is mounted in the fermentation tank 112. When the inner body 210 is rotatably inserted into the opening 111 by a manipulation of the handle 214, the lower sealing member 270 of the fermentation tank cover 114 may be mounted on the sealing member mounting groove part 412. The lower sealing member 270 of the fermentation tank cover 114 may surround the upper outer circumference of the main flow path body 440.

When the fermentation tank cover 114 is closed and inserted into the fermentation tank 112 while covering the opening 111 of the fermentation tank 112 as described above, a lower portion of the main flow path part 230 of the flow path body 260 may communicate with the inner hollow part 430 of the beverage ingredient pack 12. In addition, when the fermentation tank cover 114 is closed, the gas discharge flow path 450 of the beverage ingredient pack 12, the communication path S9 of the lower sealing member 270, and the sub-flow path part 280 of the flow path body 260 may sequentially communicate with each other.

As such, in a state in which the fermentation tank cover 114 closes the opening 111 of the fermentation tank 112, the supply path along which the main tube 220, the main flow path part 230 of the flow path body 260, and the inner hollow part 430 of the beverage ingredient pack 12 are sequentially continued may be formed in the fermentation tank assembly 11. In addition, a beverage extraction path along which the inner hollow part 430 of the beverage ingredient pack 12, the main flow path part 230 of the flow path body 260, and the main tube 220 are sequentially continued may be formed in the fermentation tank assembly 11. In addition, a gas discharge path along which the gas discharge flow path 450 of the beverage ingredient pack 12, the communication path S9 of the lower sealing member 270, the sub-flow path part 280 of the flow path body 260, and the sub-tube 290 are sequentially continued may be formed in the fermentation tank assembly 11.

In a beverage maker, the supply of material, the extraction of beverage, and the calculation of a fermentation degree of the beverage can be performed in a state in which the fermentation tank cover 114 is not opened but closed.

Figure 17:
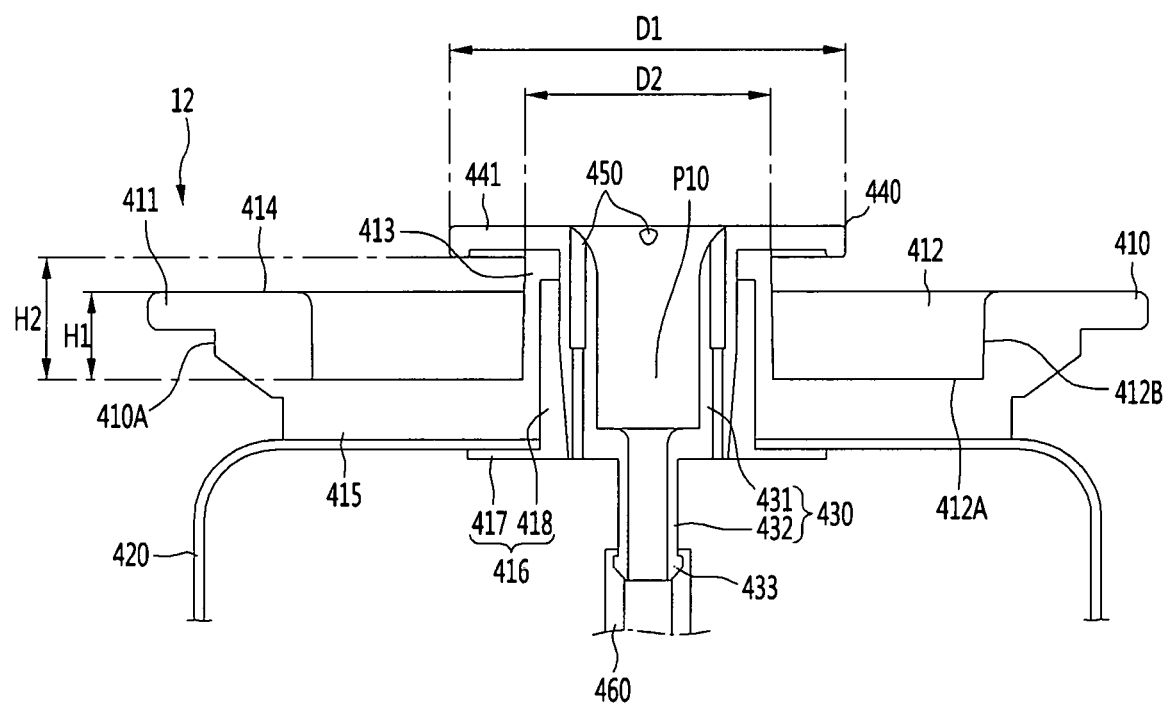
FIG. 17 is a diagram illustrating a sectional view of the example of the beverage ingredient pack of the beverage maker according to some implementations.

FIG. 16 is a side view illustrating an example of the beverage ingredient pack of the beverage maker according to some implementations. FIG. 17 is a sectional view illustrating the example of the beverage ingredient pack of the beverage maker according to some implementations.

The beverage ingredient pack 12 may include an interface portion 410 including a mounting part 411 mounted in the fermentation tank assembly 11 shown in FIGS. 14 and 15, the interface portion 410 having an outer hollow part 413 protruding therefrom; the flexible container 420 coupled to the interface portion 410; the main flow path body 440 including the inner hollow part 430 inserted and accommodated in the outer hollow part 413, and the main flow path body 440 having a handle part 441 located at the top of the outer hollow part 413; and a tubular portion, such as flexible tube 460, connected to the inner hollow part 430, the flexible tube 460 protruding to the inside of the flexible container 420. In some implementations, the flexible tube 460 may be part of the interface portion 410.

The external diameter of the interface portion 410 may be smaller than the internal diameter of the opening 111 of the fermentation tank 112 shown in FIGS. 14 and 15, and be greater than the internal diameter of the seat part 116 shown in FIGS. 14 and 15.

The mounting part 411 may be placed and mounted on the seat part 116 shown in FIG. 15. The mounting part 411 may be a part protruding to have a thinner thickness than the other part along an outer circumference 410A of the interface portion 410. The mounting part 411 may protrude in the radial direction from the interface portion 410. The mounting part 411 may be formed in a ring shape along the outer circumference 410A of the interface portion 410.

The beverage ingredient pack 12, as shown in FIG. 14, may be easily mounted in the fermentation tank 112 through a simple operation of inserting the flexible container 420 into the space S1 of the fermentation tank 112 and placing the mounting part 411 on the seat part 116 shown in FIG. 14.

A recessed part may be formed at the top surface of the interface portion 410. The recessed part formed at the top surface of the interface portion 410 may be concavely recessed at the top surface of the interface portion 410 such that a portion of a finger of the user is easily inserted thereinto. The recessed part formed at the top surface of the interface portion 410 may be the sealing member mounting groove part 412 shown in FIG. 14. The recessed part may assist the user to easily grasp the handle part 441 of the main flow path body 440 when the beverage ingredient pack 12 is carried. When the beverage ingredient pack 12 is mounted in the fermentation tank 112 as shown in FIG. 14, the recessed part may be in contact with the lower sealing member 270 of the fermentation tank cover 114. Hereinafter, for convenience, the recessed part will be described using the same reference numeral as the sealing member mounting groove part.

The outer hollow part 413 may protrude in the upper direction at the center of the interface portion 410.

The outer hollow part 413 may protrude in the upper direction from a bottom surface 412A of the recessed part 412. The outer hollow part 413 may protrude higher than a height H1 of the recessed part 412. A height H2 of the outer hollow part 413 may be higher than the height H1 of the recessed part 412. The outer hollow part 413 may support the handle part 441 of the main flow path body 440 such that the handle part 441 is located higher than a top surface 414 of the interface portion 410.

The flexible container 420 may be joined with the interface portion 410 to be integrated with the interface portion 410. A portion of the flexible container 420 may be inserted into the interface portion 410.

The interface portion 410 may be configured by joining a plurality of members, and the flexible container 420 may be fixed to the interface portion 410 by joining a plurality of members in a state in which portions of the flexible container 420 is inserted between the plurality of members.

The interface portion 410 may include a main body 415 having the mounting part 411 and the outer hollow part 413, formed therein, and a joining body 416 joined with the main body 415, the joining body 416 being joined with the flexible container 420.

The joining body 416 may include a joining part 417 joined with the flexible container 420, the joining part 417 disposed under the main body 415, and a center hollow part 418 inserted into the outer hollow part 413 at the joining part 417, the center hollow part 413 joined with the main body 415.

The top surface of the joining part 417 may face the bottom surface of the main body 415. The joining part 417 may include a ring-shaped plate body in which the flexible container 420 is joined with the top surface thereof.

When the inner hollow part 430 of the main flow path body 440 is inserted into the outer hollow part 413, the center hollow part 418 may be located between the inner circumferential surface of the outer hollow part 413 and the outer circumferential surface of the inner hollow part 430.

The inner hollow part 430 may include an upper hollow part 431 disposed in the outer hollow part 413, and a tube connecting part 432 protruding at a lower portion of the upper hollow part 431, the tube connecting part 432 having a smaller diameter than the upper hollow part 431, the tube connecting part 432 being connected to the flexible tube 460.

The inner hollow part 430 may be separably inserted into the interface portion 410. When the inner hollow part 430 is inserted into the interface portion 410, the inner hollow part 430 may be inserted into the interface portion 410 to be in surface contact with the outer body 200 and the center hollow part 418. The inner hollow part 430 may be inserted into the interface portion 410 to be capable of being escaped from the interface portion 410 when the user strongly pulls the handle part 441 in the upper direction.

The main flow path body 440 may be separated from the interface portion 410. When a pack main flow path 210 is blocked or when the flexible tube 460 is not normally spread or bent, the main flow path body 440 may be separated from the interface portion 410. The user may take an action of replacing the main flow path body 440 or the flexible tube 460.

The pack main flow path 210 may be formed in the inner hollow part 430. The pack main flow path P10 may be formed long in the top-bottom direction in the inner hollow part 430. The pack main flow path P10 may be formed at the upper hollow part 431 and the tube connecting part 432. The pack main flow path P10 may be formed long in the top-bottom direction from the top end of the upper hollow part 431 to the bottom end of the tube connecting part 432. The pack main flow path P10 may be formed such that an area of the upper hollow part 431 is wider than that of the tube connecting part 432.

At least one gas discharge flow path 450 may be formed in the vicinity of the pack main flow path P10 in the upper hollow part 431. A plurality of gas discharge flow paths 450 may be formed in parallel to the pack main flow path P10 between the pack main flow path P10 and the outer circumferential surface of the upper hollow part 431.

The tube connecting part 432 may include a flexible tube attaching/detaching part 433 to/from which the flexible tube 460 is attached/detached.

The handle part 441 of the main flow path body 440 may be formed to protrude at an upper portion of the inner hollow part 430. The handle part 441 may be formed in a hollow disk shape at the upper portion of the inner hollow part 430. The user may carry the beverage ingredient pack 12 while grasping the mounting part 411 or the handle part 441. An outer diameter D1 of the handle part 441 may be greater than that D2 of the outer hollow part 413. The bottom surface of the handle part 441 may be placed on the top end of the outer hollow part 413. The handle part 412 has a smaller size than the recessed part 412. The handle part 441 may be spaced apart from the top surface 414 of the interface portion 410 and a circumferential surface 412B of the recessed part 412.

The user may grasp the handle part 441 of the main flow path body 440 while putting a finger of the user in the recessed part 412, and carry the beverage ingredient pack 12 to the upper side of the fermentation tank 112 shown in FIG. 15. The user may insert the flexible container 420 into the space S1 of the fermentation tank 112, and place the mounting part 411 on the seat part 116 as shown in FIG. 14. Thus, beverage ingredient pack 12 can be simply mounted in the fermentation tank 112.

Meanwhile, when the user extracts the beverage ingredient pack 12 from the fermentation tank 112, the user may grasp the handle part 441 of the main flow path body 440 with a hand of the user by putting a hand of the user in the opening of the fermentation tank 112, and upwardly lift the beverage ingredient pack 12. The beverage ingredient pack 12 may be escaped to the upper side of the opening 111 of the fermentation tank 112. Thus, the beverage ingredient pack 12 can be easily extracted from the fermentation tank 112.

The flexible tube 460 may guide water or air guided to the pack main flow path P10 to a deep position in the flexible container 420, and beverage contained at a lower portion of the flexible container 420 may easily flow in the pack main flow path P10 through the flexible tube 460.

The flexible tube 460 may be roundly curved or bent at least once in the flexible container 420. The flexible tube 460 may be curved or bent before the beverage ingredient pack 12 is inserted into the fermentation tank 112. When air or hot water is supplied to the pack main flow path P10, the flexible tube 460 may be spread long in the length direction by the air or hot water.

When the flexible container 420 is maximally expanded, the flexible tube 460 may have a length where the bottom end of the flexible tube 460 is spaced apart from the inner bottom end of the flexible container 420.

The bottom end of the flexible tube 460 may be sharply formed, and have a shape of which portion is opened in the circumferential direction thereof.

The flexible tube 460 may have a lower hardness than the main flow path body 440. The flexible tube 460 is preferably connected to the tube connecting part 432 of the main flow path body 440 after the flexible tube 460 is manufactured separately from the main flow path body 440.

The flexible tube 460 is not connected to the main flow path body 440, but a hollow part through which a fluid can pass may integrally protrude long at a lower portion of the main flow path body 440. However, in this case, the compactness of the beverage ingredient pack 12 may not be easily performed, or it may be inconvenience for the user to grasp the handle part 441 with a hand of the user, depending on the hardness of the main flow path body 440. More specifically, the hardness of the entire main flow path body 440 may be formed low such that the hollow part can be curved or bent. In this case, when the user grasps the handle part 441 of a hand of a user, the handle part 441 may also be curved or bent by the hand of the user. In addition, it may not be easy for the user to grasp the handle part 441 with the hand of the user.

On the contrary, the hardness of the entire main flow path body 440 including the hollow part may be formed high such that the hardness of the handle part 441 increases. In this case, the main flow path body 440 may have a structure in which the hollow part is not curved or bent, and the compactness of the beverage ingredient pack 12 may not be easily performed.

That is, the flexible tube 460 is preferably connected to the main flow path body 440 after the main flow path body 440 and the flexible tube 460 are manufactured separately from each other. The user can easily grasp the handle part having a high hardness with a hand of the user, and the flexible tube 460 having a relatively low hardness can assist the compactness of the beverage ingredient pack 12 as the hollow part is curved or bent in the flexible tube 460.

Figure 18:
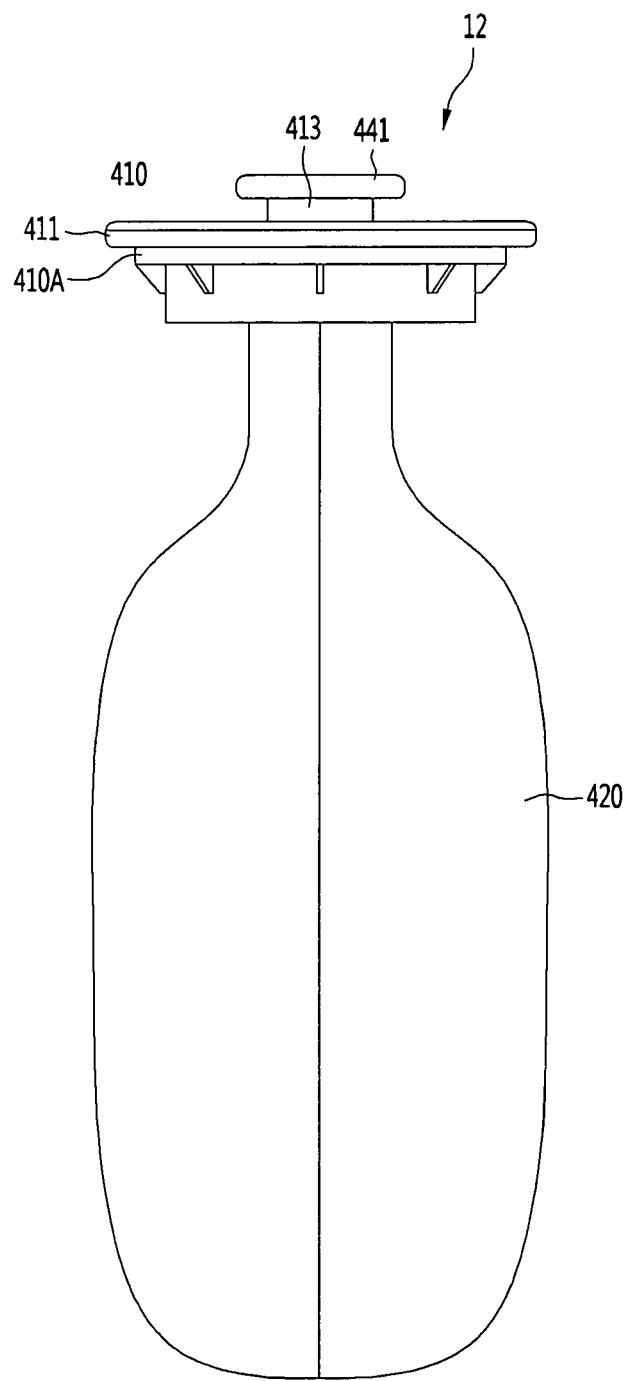
FIG. 18 is a diagram illustrating a side view of another example of the beverage ingredient pack of the beverage maker according to some implementations.
Figure 19:
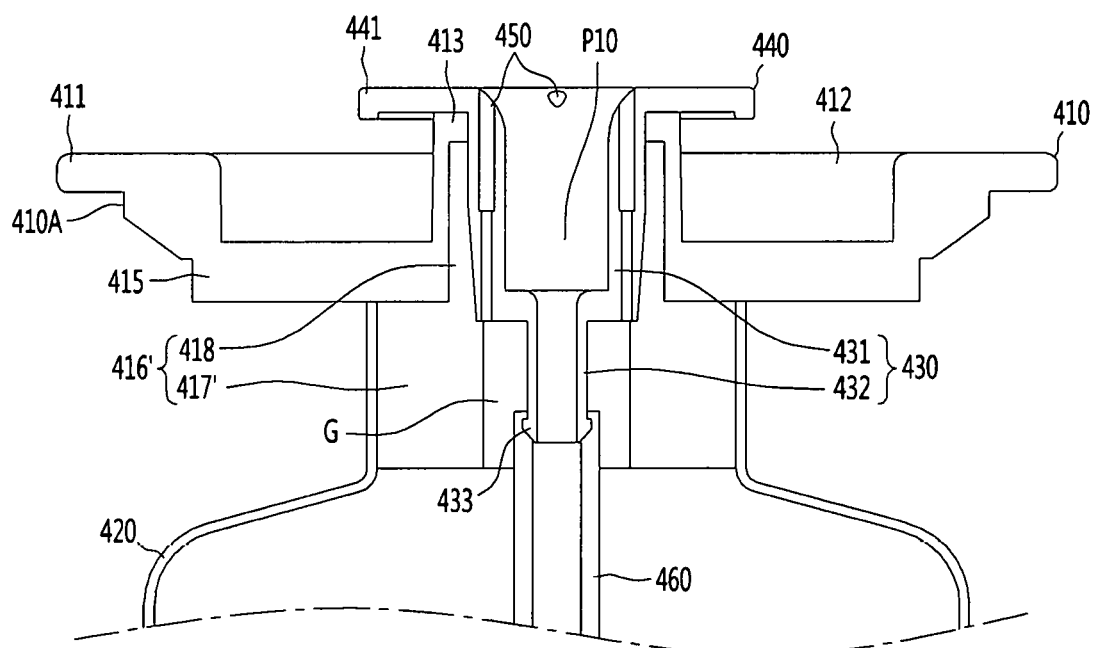
FIG. 19 is a diagram illustrating a sectional view of the another example of the beverage ingredient pack of the beverage maker according to some implementations.

FIG. 18 is a side view illustrating another example of the beverage ingredient pack of the beverage maker according to some implementations. FIG. 19 is a sectional view illustrating the another example of the beverage ingredient pack of the beverage maker according to some implementations.

In the beverage ingredient pack 12 shown in FIGS. 18 and 19, a joining position of the flexible container 420 may be different from that in the example of the beverage ingredient pack shown in FIGS. 16 and 17, and a configuration of a joining body 416' may be different from that in the beverage ingredient pack shown in FIGS. 16 and 17.

The joining body 416' of the beverage ingredient pack 12 shown in FIGS. 18 and 19 may include a joining part 417' disposed on the bottom surface of the main body 415, and the joining part 417' having the flexible container 420 joined therewith, and the center hollow part inserted into the outer hollow part 413 at the joining part 417'. The joining part 417' may include a hollow body of which top surface faces the bottom surface of the main body 415, the hollow body having the flexible container 420 is joined with the circumferential surface thereof.

In the beverage ingredient pack shown in FIGS. 18 and 19, the other components except the joining body 416' are identical or similar to those in the example of the beverage ingredient pack shown in FIGS. 16 and 17. Therefore, like reference numerals are used for like components, and their descriptions are omitted.

The joining part 417' shown in FIGS. 18 and 19 may has a higher height than the tube connecting part 432, and surround the outer circumference of the tube connecting part 432. A gap G into which the flexible tube 460 is inserted may be formed between the outer circumferential surface of the joining part 417' and the tube connecting part 432.

The flexible tube 460 may be inserted into the joining part 417' to be connected to the tube connecting part 432.

The joining part 417' shown in FIGS. 18 and 19 may protect a connecting part between the tube connecting part 432 and the flexible tube 460 and the outer circumference of the tube connecting part 432 by surrounding the connecting part between the tube connecting part 432 and the flexible tube 460 and the outer circumference of the tube connecting part 432. Thus, damage of the tube connecting part 432 can be minimized.

Figure 20:
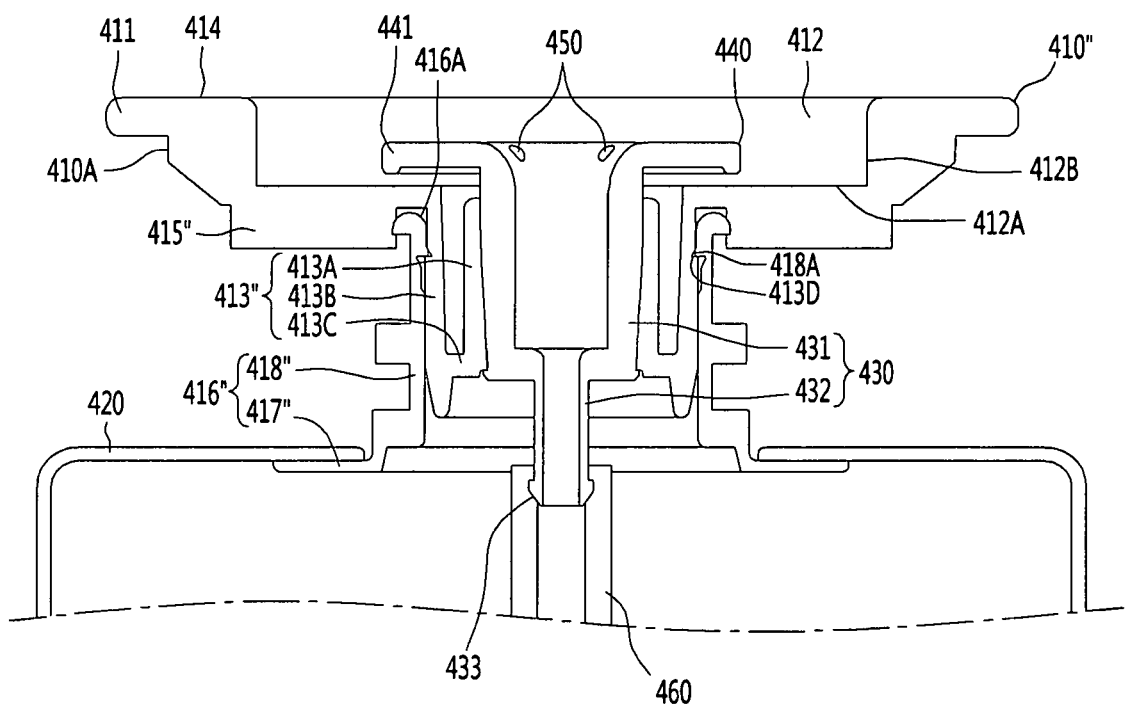
FIG. 20 is a diagram illustrating a sectional view of still another example of the beverage ingredient pack of the beverage maker according to some implementations.

FIG. 20 is a sectional view illustrating still another example of the beverage ingredient pack of the beverage maker according to some implementations.

In the beverage ingredient pack shown in FIG. 20, a protruding direction of an outer hollow part 413" and a detailed shape of the outer hollow part 413" may be different from those in the outer hollow part 413 of the interface portion 410 shown in FIGS. 18 and 19. In addition, an interface portion 410" may include a main body 415" and a connecting body 416", which are different from those of the interface portion 410 shown in FIGS. 18 and 19.

In the beverage ingredient pack of this implementation, configurations and operations of the flexible container, the main flow path body 440, and the flexible tube 460 except the interface portion 410" are identical to those in the beverage ingredient pack shown in FIGS. 18 and 19. Therefore, like reference numerals are used for like components, and their descriptions are omitted.

The interface portion 410" may include the mounting part 411, the recessed part 412, and the outer hollow part 413", and the mounting part 411 and the recessed part 412 are identical to those in the beverage ingredient pack shown in FIGS. 18 and 19. Therefore, like reference numerals are used for like components, and their descriptions are omitted.

The outer hollow part 413" may protrude in the lower direction at the center of the interface portion 410". The outer hollow part 413" may protrude in the lower direction under the recessed part 412.

The outer hollow part 413" may support the main flow path body 440 such that the handle part 441 of the main flow path body 440 is located higher than the bottom surface 412A of the recessed part 412 as the handle part 441 is located lower than the top surface 414 of the interface portion 410".

The outer hollow part 413" may be formed to be elastically deformed. The outer hollow part 413" may include a first hollow part 413A into which the inner hollow part 430 of the main flow path body 440 is inserted, a second hollow part 413B formed larger than the first hollow part 413A, the second hollow part 413B surrounding the outer circumference of the first hollow part 413A, and a connecting part 413C connecting the first hollow part 413A and the second hollow part 413B.

If necessary, the first hollow part 413A may be elastically deformed in a state in which the first hollow part 413A is connected to the second hollow part 413B through the connecting part 413C.

The interface portion 410" may include the main body 415" in which the mounting part 411 and the outer hollow part 413" are formed, and the connecting body 416" connected to the main body 415" and the flexible container 420.

The connecting body 416" may include a lower hollow part 418" surrounding the outer circumference of the outer hollow part 413".

The lower hollow part 418" may be formed in a hollow cylindrical shape. The lower hollow part 418" may be attached/detached to/from the main body 415".

A lower hollow part inserting groove part 416A into which an upper portion of the lower hollow part 418" is inserted may be formed in the main body 415". The lower hollow part inserting groove part 416A may be formed to be recessed in the vicinity of the outer hollow part 413" of the main body 415".

The connecting body 416" may be separably connected to the main body 415".

A holding bump 413D may protrude from the outer surface of the outer hollow part 413", and a holding projection 418A mounted on the holding bump 413D to be held by the holding bump 413D may be formed at the inner circumferential surface of the lower hollow part 418".

When an upper portion of the connecting body 416" is inserted into the lower hollow part inserting groove part 416A, the holding projection 418A may be placed on the holding bump 413D to be held by the holding bump 413D. If an external force is not applied to the connecting body 416", a state in which the connecting body 416" is coupled to the main body 415" may be maintained.

The connecting body 416" may further include a joining part 417" protruding at a lower portion of the lower hollow part 418", the joining part 417" having the flexible container 420 joined with at least one of the top and bottom surfaces thereof.

The flexible container 420 may be thermally fused to the top or bottom surface of the joining part 417".

The top surface of the joining part 417" may face the bottom surface of the main body 415". The joining part 417" may include a ring-shaped plate body having the flexible container 420 joined with the top surface thereof.

Figure 21:
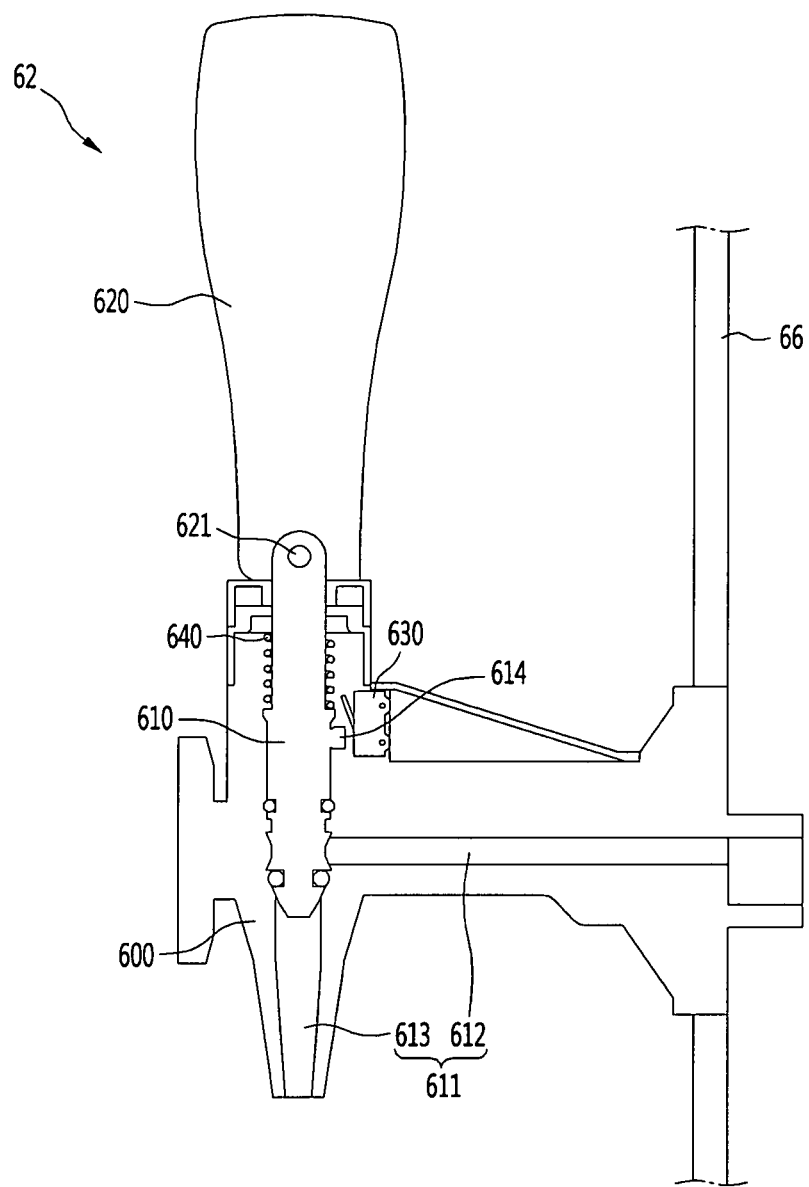
FIG. 21 is a diagram illustrating an example of a sectional view of a beverage extraction valve of the beverage maker according to some implementations.

FIG. 21 is a sectional view illustrating the beverage extraction valve of the beverage maker according to some implementations.

The beverage extraction valve 62 may include a valve body 600 in which a valve flow path 611 connected to the beverage extraction flow path 61 shown in FIG. 1 is formed; a lifting valve body 610 disposed in the valve body 600 to move up/down, the lifting valve body opening/closing the valve flow path 611; a rotating lever 620 rotatably connected to an upper portion of the lifting valve body 610 to moves up/down the lifting valve body 610 when the rotating lever 620 is rotated; and the micro switch 630 switched by the lifting valve body 610. The beverage extraction valve 62 may further include a valve spring 640 built in the valve body 600 to elastically pressurize the lifting valve body 610 in the lower direction.

The valve body 600 may be mounted to the center cover shown in FIG. 2. The valve flow path 611 may include a horizontal flow path 612 formed long in the front-rear direction along the valve body 600, and a vertical flow path 613 formed to be bent in the lower direction at the front end of the horizontal flow path 612. Beverage guided to the beverage extraction flow path 61 shown in FIG. 1 may sequentially pass through the horizontal flow path 612 and the vertical flow path 613 when the horizontal flow path 612 is opened, and then drop downward from the vertical flow path 613. The valve body 600 may include a horizontal part in which the horizontal flow path 612 is formed, and a vertical part formed perpendicular to the horizontal part, the vertical part having the vertical flow path 613 formed therein.

The lifting valve body 610 may be disposed to move up/down in the valve flow path 611, particularly, the vertical flow path 613. The lifting valve body 610 may move down to a height at which the horizontal flow path 612 is blocked, and move up to a height at which the horizontal flow path 612 is opened. The lifting valve body 610 may be disposed such that an upper portion of the lifting valve body 610 protrudes upward of the valve body 600. A manipulating projection 614 that allows the micro switch to be point-contacted when the lifting valve body 610 moves up may protrude at the lifting valve body 610.

The rotating lever 620 may be connected to the upper portion of the lifting valve body 610 by a hinge 621. The rotating lever 620 may be erected in the vertical direction or laid in the horizontal direction in a state in which the rotating lever 620 is connected to the lifting valve body 610.

When the rotating lever 620 is laid in the horizontal direction, the lifting valve body 610 may move up to open the horizontal flow path 612. When the rotating lever 620 is erected in the vertical direction, the lifting valve body 610 may move down to close the horizontal flow path 612.

The micro switch 630 may be connected to the controller 109 shown in FIG. 3, and the controller 109 may control the beverage maker according to on/off of the micro switch 630.

The valve spring 640 may be disposed at an upper portion of the vertical part of the valve body 600 to elastically pressurize the lifting valve body 610 in the lower direction.

Figure 22:
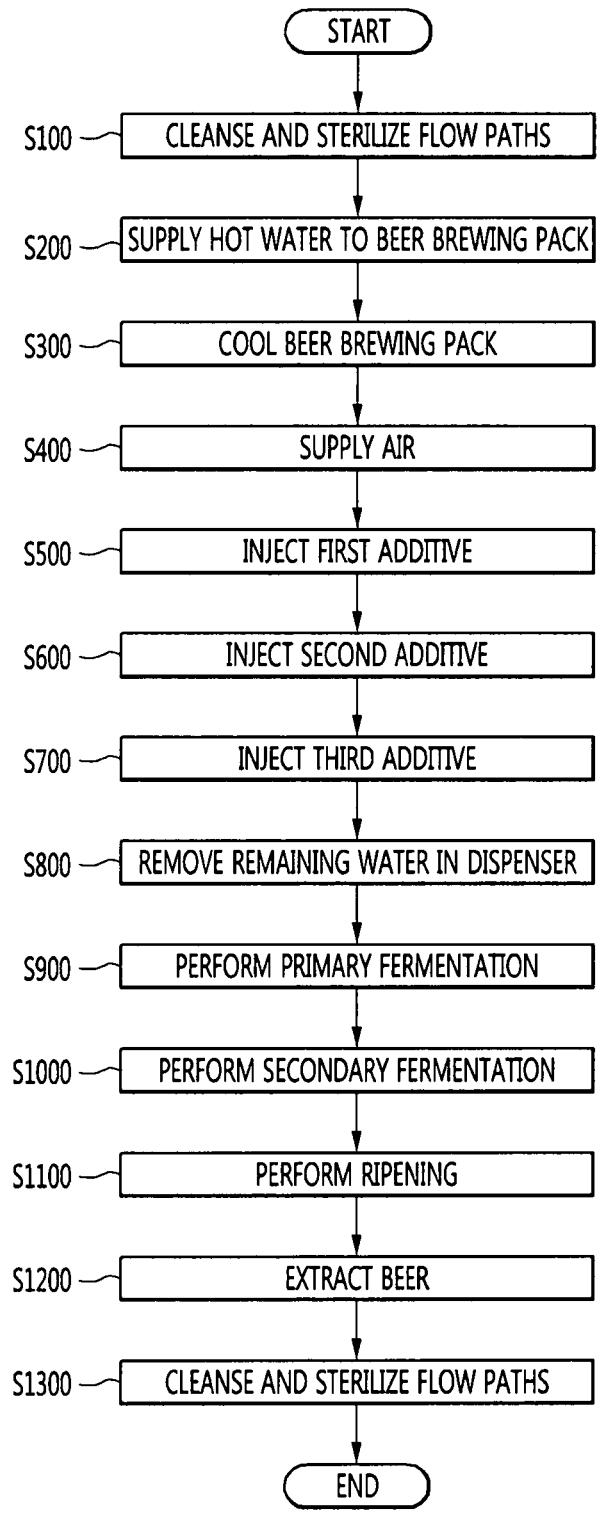
FIG. 22 is a flowchart illustrating an example of a control sequence of the beverage maker according to some implementations.

FIG. 22 is a flowchart illustrating a control sequence of the beverage maker according to some implementations.

The beverage maker of this implementation includes the controller 109. The user may input an operation command of the beverage maker by manipulating a wireless communication device such as the rotary knob 109A, or a remote controller, or a portable terminal. The controller 109 may control the beverage maker using a preset program according to a switching state of the rotary switch 109B or a signal applied to the wireless communication element. Here, the preset program may control the beverage maker according to a beverage ingredient process of the beverage maker.

Hereinafter, an operation of the beverage maker of this implementation will be described as follows. The following description will provide an example of a beer maker, although implementations may be used to make any suitable beverage by fermentation.

The beverage maker of this implementation may include a cleansing and sterilizing course for cleansing and sterilizing flow paths in the beverage maker. The cleansing and sterilizing course may be performed separately from a beverage brewing course.

The cleansing and sterilizing course is preferably performed before the beverage brewing course is performed.

In addition, the cleansing and sterilizing course may be performed by a user input during the beverage brewing course. In this case, the cleansing and sterilizing course may be performed in a step in which the main valve 9 is closed and no additive is contained in the supplier 3, such as a primary fermentation step or secondary fermentation step which will be described later.

The cleansing and sterilizing course may be performed in a state in which the capsules C1, C2, and C3 are not accommodated in the supplier 3, and the beverage brewing course may be performed in a state in which the capsules C1, C2, and C3 are accommodated in the supplier 3 and the beverage brewing pack 12 is accommodated in the fermentation tank 112.

Hereinafter, the cleansing and sterilizing course will be first described.

The user may input a cleansing and sterilizing command through the input unit, remote controller, or portable terminal provided in the controller 109. The controller 109 may control the beverage maker in the cleansing and sterilizing course as the cleansing and sterilizing command is input.

The user may manipulate the beverage extraction valve to be opened, and then input the cleansing and sterilizing command through the input unit, remote controller, or portable terminal.

If the micro switch 630 of the beverage extraction valve 62 is turned on, the controller 109 may turn on the water supply pump 52 and the water supply heater 53 so as to cleanse and sterilize the flow paths, and turn on the bypass valve 35 and the first, second, and third opening/closing valves 313, 323, and 333.

In this case, the controller 109 may maintain the main valve 9 to be in a closed state. When the bypass valve 35 and the first, second, and third opening/closing valves 313, 323, and 333 are turned on, the bypass valve 35 and the first, second, and third opening/closing valves 313, 323, and 333 may all be opened.

When the water supply pump 52 is turned on, water of the water tank 51 may be discharged from the water tank 51 to pass through the water supply pump 52, and flow in the water supply heater 53 to be heated by the water supply heater 53. The water (i.e., hot water) heated by the water supply heater 53 may flow in the bypass flow path 34, the first capsule accommodation part 31, the second capsule accommodation part 32, and the third capsule accommodation part 33 through the water supply flow path 4. The water flowing in the bypass flow path 34, the first capsule accommodation part 31, the second capsule accommodation part 32, and the third capsule accommodation part 33 may flow in the main flow path 2. The water flowing in the main flow path 2 may pass through the beverage extraction flow path 61 and then be discharged through the beverage extraction valve 62.

In the above-described control of the beverage maker, the water supply flow path 4, the bypass flow path 34, the bypass valve 35, the first capsule accommodation part 31, the second capsule accommodation part 32, the third capsule accommodation part 33, the main flow path 2, the beverage extraction flow path 61, and the beverage extraction valve 62 may be cleansed and sterilized by the hot water heated by the water supply heater 53.

In the beverage maker, the above-described cleansing and sterilization may be performed for a cleansing setting time, and the cleansing and sterilizing step (S100) may be completed after the cleansing setting time. After the cleansing setting time elapses, the controller 109 may turn off the water supply pump 52 and the water supply heater 53, and turn off all of the bypass valve 35 and the first, second, and third opening/closing valves 313, 323, and 333. When the bypass valve 35 and the first, second, and third opening/closing valves 313, 323, and 333 are turned off, all of the bypass valve 35 and the first, second, and third opening/closing valves 313, 323, and 333 may be closed.

The user may manipulate the beverage extraction valve to be closed such that contamination through the beverage extraction valve 62 is blocked in the cleansing and sterilizing step (S100).

In addition, the beverage maker of this implementation may include the beverage brewing course for brewing beverage.

Hereinafter, the beverage brewing course will be described.

In order to perform the beverage brewing course, the user may mount the beverage brewing pack 12 in the fermentation tank 112 by opening the fermentation tank cover 114 and inserting the beverage brewing pack 12 into the fermentation tank 112. After that, the user may shut the fermentation tank cover 114, and the beverage brewing pack 12 may be accommodated and kept in the fermentation tank 112 and the fermentation tank cover 114. In addition, the user may insert the plurality of capsules C1, C2, and C3 into the supplier 3 and then cover the plurality of capsule accommodation parts 31, 32, and 33 with the lid module 37 before/after the beverage brewing pack 12 is mounted in the fermentation tank 112.

The user may input a beverage brewing command through the input unit, remote controller, or portable terminal provided in the controller 109. The controller 109 may control the beverage maker in the beverage brewing course as the beverage brewing command is input.

The controller 109 may initiate a water supplying step (S200) of supplying water to the beverage brewing pack 12 in the beverage brewing course. In the example of the beverage-making apparatus being beer maker, the water supplying step S200 may be a liquid malt forming step of forming liquid malt by uniformly mixing malt with hot water.

The controller 109, in the water supply step (S200), may turn on the water supply pump 52 and the water supply heater 53, turn on the bypass valve 35, and turn on the main valve 9. The controller 109 may open the main valve 9 by turning on the main valve 9 that is in a turn-off state. The controller 109, in the water supplying step (S200), may maintain the first, second, and third opening/closing valves 313, 323, and 333 to be turned off. Meanwhile, the controller 109 may turn on the gas extraction valve 73 when water is supplied to the beverage brewing pack 12.

Water of the water tank 51 may be discharged from the water tank 51 to pass through the water supply pump 52, and flow in the water supply heater 53 to be heated by the water supply heater 53. The water heated by the water supply heater 53 may flow in the main flow path 2 by passing through the water supply flow path 4, the bypass flow path 34, and the bypass valve 35. The water flowing in the main flow path 2 may be introduced into the beverage brewing pack 12 by passing through the main valve 9. In the example of the beverage-making apparatus being a beer-maker, the hot water introduced into the beer brewing pack 12 may be mixed with malt accommodated in the beer brewing pack 12, and the malt in the beer brewing pack 12 may be mixed with water to be gradually diluted. Further in this example of a beer maker, since the hot water is supplied to the beer brewing pack 12, the malt accommodated in the beer brewing pack 12 can be rapidly and uniformly mixed with the hot water.

In the above-described water supplying step (S200), the bypass flow path 34 and the main flow path 2 may be in a state in which the bypass flow path 34 and the main flow path 2 have already been cleansed and sterilized by the cleansing and sterilizing step (S100), and uncontaminated clean hot water may be supplied to the beverage brewing pack 12.

Meanwhile, in the above-described water supplying step (S200), the water supply heater 53 preferably heats water to a temperature of 50° C. to 70° C., and the controller 109 may control the water supply heater 53 according to a temperature sensed by the thermistor 57.

The beverage maker may perform the above-described water supply step (S200) until an amount of water, sensed by the flow meter 56, reaches a set flow rate. If the amount of water, sensed by the flow meter 56, reaches the set flow rate, the water supplying step (S200) may be completed. When the water supply step (S200) is completed, the controller 109 may turn off the water supply pump 52 and the water supply heater 53, and turn off the bypass valve 35. In addition, the controller 109 may turn off the gas extraction valve 73 when the water supply step (S200) is completed.

The beverage maker, in the above-described water supplying step (S200), may be controlled such that air is introduced into the beverage brewing pack 12.

In addition, the controller 109 may complete the water supply step (S200) by primarily supplying hot water to the inside of the beverage brewing pack 12, injecting air into the beverage brewing pack 12, and then secondarily injecting hot water into the beverage brewing pack 12.

As an example of the water supplying step (S200), only a hot water supplying process may be performed.

As another example of the water supplying step (S200), a primary hot water supplying process of primarily supplying hot water, an air injecting process of injecting air, and a secondary hot water supplying process of secondarily injecting hot water may be sequentially performed.

First, the case where only the hot water supplying process is performed as an example of the water supplying step (S200) will be first described as follows.

When the hot water supplying process is initiated, the controller 109 may turn on the water supply pump 52 and the water supply heater 53, turn on the bypass valve 35, and turn on the main valve 9. The controller 109 may turn on the gas extraction valve 73 when the hot water supplying process is initiated. In addition, when the hot water supplying process is completed, the controller 109 may turn off the water supply pump 52 and the water supply heater 53, and turn off the bypass valve 35. The controller 109 may turn off the gas extraction valve 73 when the hot water supplying process is completed.

Hereinafter, a case where the primary hot water supplying process, the air injecting process, and the secondary hot water supplying process are sequentially performed as another example of the water supplying step (S200) will be described as follows.

When the primary hot water supplying process is initiated, the controller 109 may turn on the water supply pump 52 and the water supply heater 53, turn on the bypass valve 35, and turn on the main valve 9. In addition, the controller 109 may turn off the water supply pump 52 and the water supply heater 53 when the primary hot water supplying process is completed. The controller 109 may maintain the turn-on state of the bypass valve 35 and the main valve 9 when the primary hot water supplying process is completed. The controller 109 may maintain the turn-on state of the gas extraction valve 73 when the primary hot water supplying process is completed.

When the air injecting process is initiated, the controller 109 may turn on the air injection pump 82. While the air injection pump 82 is being turned on, air pumped by the air injection pump 82 may be introduced into the water supply flow path 4 through the air injection flow path 81, and then introduced into the beverage brewing pack 12 through the bypass flow path 34, the main flow path 2, and the main valve 9. The air introduced into the beverage brewing pack 12 may bump into liquid malt to assist the malt and the hot water to be more uniformly mixed together.

If a pressure sensed by the pressure sensor 72 is equal to or greater than a set pressure, the controller 109 may complete the air injecting process, and turn off the air injection pump 82 so as to complete the air injecting process. When the air injecting process is completed, the controller 109 may maintain the main valve 9, the bypass valve 35, and the gas extraction valve 73 to be turned on.

When the secondary hot water supplying process is initiated, the controller 109 may turn on the water supply pump 52 and the water supply heater 53. Like the primary water supply process, water of the water tank 51 may be supplied to the beverage brewing pack 12, and new hot water may be additionally supplied to the beverage brewing pack 12. The controller 109 may determine whether the secondary hot water supplying process has been completed according to a flow rate sensed by the flow meter 56 during the secondary hot water supplying process. If the flow rate sensed by the flow meter 56 during the secondary hot water supplying process reaches a set flow rate, the controller 109 may determine that the secondary hot water supplying process has been completed, turn off the water supply pump 52 and the water supply heater 53, and turn off the main valve 9, the bypass valve 35, and the gas extraction valve 73.

Meanwhile, if the water supplying step (S200) is completed, the beverage maker may perform a fermentation tank cooling step (S300) of cooling the fermentation tank 112.

The controller 109 may control the compressor 131 and the expansion device 133 of the refrigeration cycle apparatus 13 so as to cool the fermentation tank 112. A refrigerant compressed by the compressor 131 may be condensed by the condenser 132 and then expanded by the expansion device 133. The refrigerant expanded by the expansion device 133 may take heat from the fermentation tank 112 while passing through the evaporator 134, and be evaporated. The refrigerant passing through the evaporator 134 may be sucked into the compressor 131. The fermentation tank 112 may be gradually cooled when the compressor 131 is driven, and the beverage brewing pack 12 accommodated in the fermentation tank 112 and the liquidized ingredients accommodated in the beverage brewing pack 12 may be cooled.

When the fermentation tank 112 is cooled as described above, the beverage maker may cool the beverage brewing pack 12 to a medium temperature, e.g., a temperature of 23° C. to 27° C., and the controller 109 may control the compressor 131 according to a temperature sensed by the temperature sensor 16 installed in the fermentation tank 112. If the temperature sensed by the temperature sensor 16 exceeds a compressor-on temperature, the controller 109 may turn on the compressor 131. If the temperature sensed by the temperature sensor 16 is equal to or less than a compressor-off temperature, the controller 109 may turn off the compressor 131.

If the temperature sensed by the temperature sensor 16 is equal to or less than the compressor-off temperature at least once after the above-described fermentation tank cooling step S300 is initiated, the beverage maker may perform a mixing step (S400) of mixing the liquidized ingredients by supplying air to the inside of the beverage brewing pack 12.

The beverage maker may control the compressor 131 to be turned on/off according to the temperature sensed by the temperature sensor 16 even during the mixing step (S400), and the on/off control of the compressor 131 may be continued until additive injecting steps (S500, S600, and S700) which will be describe later are completed.

The controller 109 may turn on the air injection pump 82, and turn on the bypass valve 35, the main valve 9, and the gas extraction valve 73. While the air injection pump 82 is being turned on, the air pumped by the air injection pump 82 may be introduced into the water flow path 4 through the air injection flow path 81, and then introduced into the beverage brewing pack 12 through the bypass flow path 34, the main flow path 2, and the main valve 9. The air introduced into the beverage brewing pack 12 may bump into liquidized ingredients (e.g., liquid malt in the case of a beer maker) to assist the ingredients and the hot water to be more uniformly mixed together.

The controller 109 may turn on the air injection pump 82 and mix the liquid malt with air for a mixing set time. If the air injection pump 82 is turned on and the mixing set time elapses, the controller 109 may turn off the air injection pump 82, and turn off the bypass valve 35 and the gas extraction valve 73. If the mixing set time elapses, the beverage maker may complete the mixing step (S400).

The beverage maker may perform the additive injecting steps (S500, S600, and S700) after the mixing step (S400).

In the additive injecting steps (S500, S600, and S700), the beverage maker may simultaneously or sequentially inject an additive of the first capsule C1, an additive of the second capsule C2, and an additive of the third capsule C3.

The controller 109 may sequentially perform an additive injecting process (S500) of the first capsule C1, an additive injecting process (S600) of the second capsule C2, and an additive injecting process (S700) of the third capsule C3.

In the additive injecting process (S500) of the first capsule C1, the controller 109 may turn on the water supply pump 52, the main valve 9, the first extraction valve 313, and the gas extraction valve 73 for a first additive set time. When the water supply pump 52 is turned on, water of the water tank 51 may be introduced into the first capsule C1 by passing through the water supply pump 52, passing through the water supply heater 53, and then passing through the water supply flow path 4. The water introduced into the first capsule C1 may be mixed with the additive accommodated in the first capsule C1, flow in the main flow path together with the additive accommodated in the first capsule C1, and be injected into the beverage brewing pack 12 through the main flow path 2. If the first additive set time elapses, the controller 109 may turn off the water supply pump 52 and the first opening/closing valve 313, and complete the additive injecting process (S500) of the first capsule C1.

In the additive injecting process (S600) of the second capsule C2, the controller 109 may turn on the water supply pump 52 and the second opening/closing valve 323 for a second additive set time. When the water supply pump 52 is turned on, water of the water tank 51 may be introduced into the second capsule C2 by passing through the water supply pump 52, passing through the water supply heater 53, and then passing through the water supply flow path 4. The water introduced into the second capsule C2 may be mixed with the additive accommodated in the second capsule C2, flow in the main flow path 2 together with the additive accommodated in the second capsule C2, and be injected into the beverage brewing pack 12 through the main flow path 2. If the second additive set time elapses, the controller 109 may turn off the water supply pump 52 and the second opening/closing valve 323, and complete the additive injecting process (S600) of the second capsule C2.

In the additive injecting process (S700) of the third capsule C3, the controller 109 may turn on the water supply pump 52 and the third opening/closing valve 333 for a third additive set time. When the water supply pump 52 is turned on, water of the water tank 51 may be introduced into the third capsule C3 by passing through the water supply pump 52, passing through the water supply heater 53, and then passing through the water supply flow path 4. The water introduced into the third capsule C3 may be mixed with the additive accommodated in the third capsule C3, flow in the main flow path 2 together with the additive accommodated in the third capsule C3, and be injected into the beverage brewing pack 12 through the main flow path 2. If the third additive set time elapses, the controller 109 may turn off the water supply pump 52 and the third opening/closing valve 333, and complete the additive injecting process (S700) of the third capsule C3.

If all of the additive injecting steps (S500, S600, and S700) are completed, the beverage maker may perform a supplier remaining water removing step (S800) of removing remaining water in the supplier 3.

In the supplier remaining water removing step (S800), the controller 109 may turn on the air injection pump 82, turn on the first opening/closing valve 313, the second opening/closing valve 323, and the third opening/closing valve 333, and turn on the main valve 9 and the gas extraction valve 73.

When the air injection pump is turned on, air may pass through the air injection flow path 81 and the water supply flow path 4 and then be supplied to the first capsule accommodation part 31, the second capsule accommodation part 32, and the third capsule accommodation part 33, to blow water remaining in the first capsule accommodation part 31, the second capsule accommodation part 32, and the third capsule accommodation part 33. The air may be moved to the beverage brewing pack 12 together with the remaining water moved in the first capsule accommodation part 31, the second capsule accommodation part 32, and the third capsule accommodation part 33.

The controller 109 may turn on the air injection pump 82 for a remaining water removing set time. If the remaining water removing set time elapses, the controller 109 may turn off the air injection pump 82, and turn off the first opening/closing valve 313, the second opening/closing valve 323, the third opening/closing valve 333, the main valve 9, and the gas extraction valve 73.

If the remaining water removing set time elapses, the beverage maker may complete the supplier remaining water removing step (S800).

After the supplier remaining water removing step (S800) is completed, the beverage maker may sequentially perform a first fermentation step (S900) and a second fermentation step (S1000).

In the primary fermentation step (S900), the controller 109 may control the compressor 131 to a primary fermentation target temperature, and control the compressor 131 such that the temperature sensed by the temperature sensor 16 maintains a primary fermentation set temperature range. After the first fermentation step (S900) is initiated, the controller 109 may periodically turn on and then turn off the gas extraction valve 73, and store a pressure sensed by the pressure sensor 72 in a storage part (not shown) while the gas extraction valve 73 is being turned on. If a change in pressure periodically sensed by the pressure sensor 72 exceeds a primary fermentation set pressure, the controller 109 may determine that primary fermentation has been completed, and complete the primary fermentation step (S900).

After the primary fermentation step (S900) is completed, the controller 109 may initiate the secondary fermentation step (S1000). In the secondary fermentation step (S1000), the controller 109 may control the compressor 131 to a secondary fermentation target temperature, and control the compressor 131 such that the temperature sensed by the temperature sensor 16 maintains a secondary fermentation set temperature range. After the second fermentation step (S1000) is initiated, the controller 109 may periodically turn on and then turn off the gas extraction valve 73, and store a pressure sensed by the pressure sensor 72 in the storage part (not shown) while the gas extraction valve 73 is being turned on. If a change in pressure periodically sensed by the pressure sensor 72 exceeds a secondary fermentation set pressure, the controller 109 may determine that secondary fermentation has been completed, and complete the secondary fermentation step (S1000).

If both of the primary fermentation step (S900) and the secondary fermentation step (S1000) are completed, the beverage maker may perform a ripening step (S1100).

In the ripening step (S1100), the controller 109 may wait during a ripening time, and control the compressor 131 such that the temperature of beverage maintains between an upper limit value of a set ripening temperature and a lower limit value of the set ripening temperature during the ripening time. If the temperature sensed by the temperature sensor 16 is equal to or less than the lower limit value of the set ripening temperature, the controller 109 may turn off the compressor 131. If the temperature sensed by the temperature sensor 16 is equal to or greater than the upper limit value of the set ripening temperature, the controller 109 may turn on the compressor 131.

In the beverage maker, if the ripening time elapses, all of the steps of brewing beverage may be completed, and the user may extract the beverage by manipulating the beverage extraction valve 62.

If the user manipulates the beverage extraction valve 62 to be opened, the micro switch 630 may be point-contacted, and the controller 109 may open the main valve 9 in the state in which all of the steps of brewing the beverage are completed. In addition, the controller 109 may turn on the air pump 152 and the air control valve 156.

When the air pump 152 is turned on, air may be supplied to the inside of the fermentation tank assembly 11 through the air supply flow path 154. The air supplied to the inside of the fermentation tank assembly 11 may pressurize the beverage ingredient pack 12. When the beverage ingredient pack 12 is pressurized by the air, beverage of which fermentation and ripening have been completed in the beverage ingredient pack 12 may flow in the main flow path 2. The beverage flowing in the main flow path 2 may pass through the beverage extraction flow path 61, flow in the beverage extraction valve 62, and then be extracted to the outside through the beverage extraction valve 62.

Figure 23:
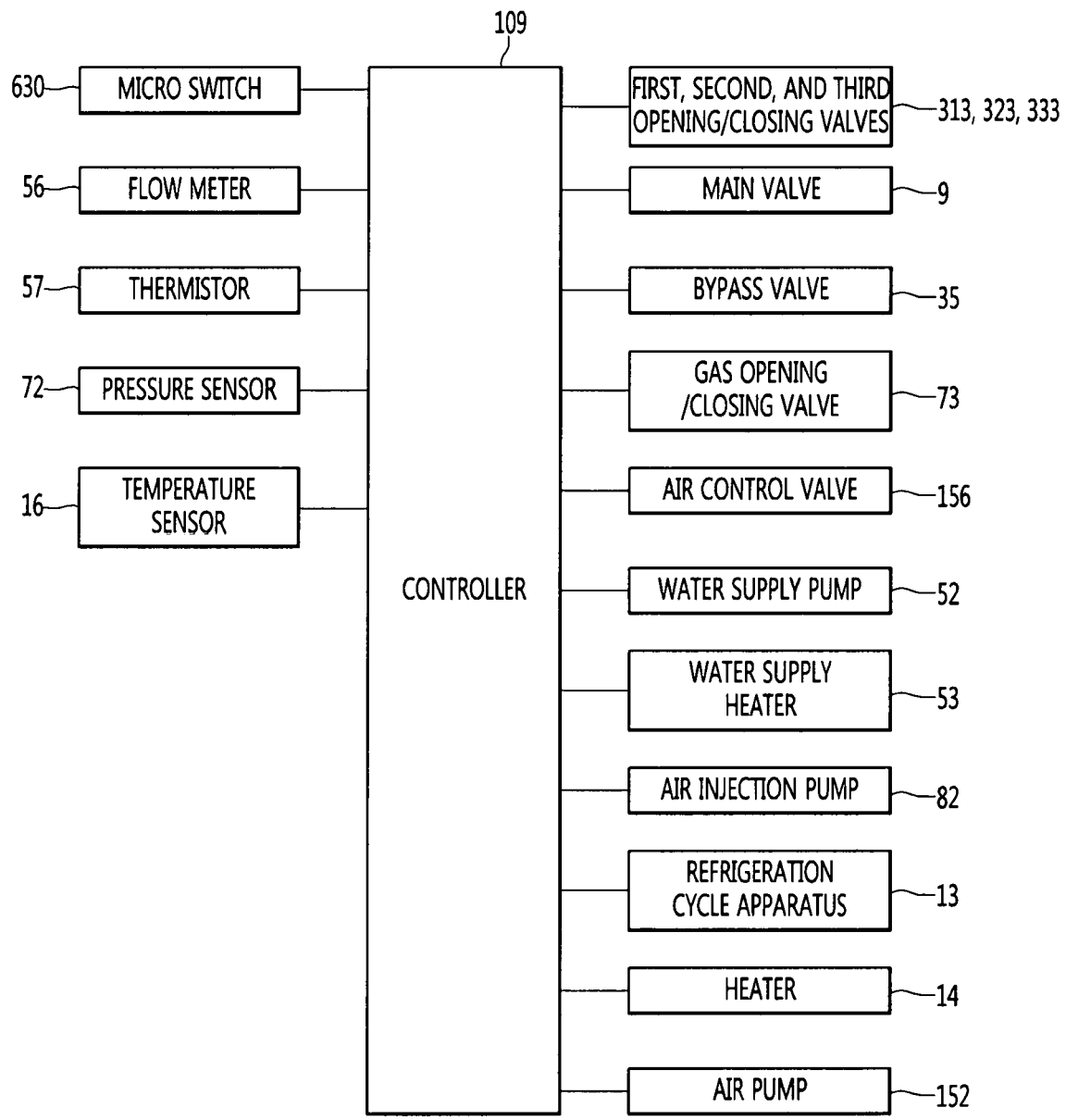
FIG. 23 is a diagram illustrating an example of an entire configuration view of a beverage maker according to another implementation.

FIG. 23 is a block diagram illustrating a control configuration of the beverage maker according to the implementation.

Again, some of the description below will describe an example in which the beverage-making apparatus is a beer maker. However, implementations are not limited therefore, as the described cleansing and sterilizing may be implemented in any suitable beverage-making apparatus that implements fermentation as described above.

Referring to FIG. 23, the controller 109 may sense on/off of the micro switch 630. Also, the controller 109 may receive measurement values from the flow meter 56, the thermistor 57, the pressure sensor 72, and the temperature sensor 16.

The micro switch 630 turned on/off according to opening/closing of the beverage extraction valve 62 may be provided in the beverage extraction valve 62, and the controller 109 may receive an on/off signal of the micro switch 630.

The water supply module 5 may include the flow meter 56 that measures a flow rate of the water supply pump outlet flow path 55, and the controller 109 may receive information on a flow rate measured by the flow meter 56.

The water supply module 5 may include the thermistor 57 that measures a temperature of the water supply heater 53 or a temperature of hot water heated by the water supply heater 53, and the controller 109 may receive information on a temperature measured by the thermistor 57. At this time, the thermistor 57 is preferably installed in at least one of the water supply heater 53 and the water supply flow path 4.

The gas discharger 7 may include the pressure sensor 72 installed in the gas extraction flow path 71, and the pressure sensor 72 may measure a pressure in the beverage brewing pack 12. The controller 109 may receive information on a pressure measured by the pressure sensor 72.

The fermentation module 1 may include the temperature sensor 16 capable of measuring a temperature of the fermentation tank assembly 11. The controller 109 may receive information on a temperature measured by the temperature sensor 16.

Meanwhile, the controller 109 may control on/off of various types of valves included in the beverage maker. Each of the valves may be opened when the valve is turned on, and be closed when the valve is turned off.

In more detail, the controller 109 may control on/off of the first, second, and third opening/closing valves 313, 323, and 333, the main valve 9, the bypass valve 35, the gas opening/closing valve 73, and the air control valve 156.

The controller 109 may control on/off of the first, second, and third opening/closing valves 313, 323, and 333. The first, second, and third opening/closing valves 313, 323, and 333 may be installed in the first, second, and third supplier entrance flow paths 311, 321, and 331, respectively. When the first, second, and third supplier entrance flow paths 311, 321, and 331 are turned on, water or air flowing in the water supply flow path 4 may be introduced into each of the first, second, and third capsule accommodation parts 31, 32, and 33 of the supplier 3. On the other hand, when the first, second, and third supplier entrance flow paths 311, 321, and 331 are turned off, the water or air flowing in the water supply flow path 4 cannot be introduced into each of the first, second, and third capsule accommodation parts 31, 32, and 33 of the supplier 3.

The controller 109 may control on/off of the main valve 9. The main valve 9 may be installed in the main flow path 2, and be installed posterior to the connecting part 91 of the main flow path 2 and the beverage extraction flow path 61 according to the flowing direction of water or air. When the main valve 9 is turned on, water or air flowing in the main flow path 2 may be introduced into the beverage brewing pack 12, and beverage may be extracted from the beverage brewing pack 12. On the other hand, when the main valve 9 is turned off, the water or air flowing in the main flow path 2 cannot be introduced into the beverage brewing pack 12, and the beverage cannot be extracted from the beverage brewing pack 12.

The controller 109 may control on/off of the bypass valve 35. The bypass valve 35 may be installed in the bypass flow path 34. When the bypass valve 34 is turned on, water or air flowing in the water supply flow path 4 may flow in the main flow path 2 through the bypass flow path 34. On the other hand, when the bypass valve 34 is turned off, the water or air flowing in the water supply flow path cannot flow in the main flow path 2 through the bypass flow path 34.

The controller 109 may control on/off of the gas opening/closing valve 73. The gas opening/closing valve 73 may be installed in the gas extraction flow path 71. The gas opening/closing valve 73 may be installed posterior to the pressure sensor 72 according to the flowing direction of gas in the gas extraction flow path 71. When the gas opening/closing valve 73 is turned on, air or gas in the beverage brewing pack 12 may flow to the outside of the beverage brewing pack 12 through the gas extraction flow path 71, and a pressure in the beverage brewing pack 12 may be maintained equal or similar to the external atmospheric pressure. On the other hand, when the gas opening/closing valve 73 is turned off, the air or gas in the beverage brewing pack 12 cannot flow to the outside of the beverage brewing pack 12 through the gas extraction flow path 71, and the pressure in the beverage brewing pack 12 may become higher than the external atmospheric pressure.

The controller 109 may control on/off of the air control valve 156. The air control valve 156 may be installed in the air supply flow path 154. When the air control valve 156 is turned on, air may be introduced into or discharged from the fermentation tank 112 through the air supply flow path 154 by an operation of the air pump 152. On the other hand, when the air control valve 156 is turned off, the air cannot be introduced into or discharged from the fermentation tank 112 through the air supply flow path 154.

Meanwhile, the controller 109 may control the water supply pump 52, the water supply heater 53, the air injection pump 82, the refrigeration cycle apparatus 13, the heater 14, and the air pump 152.

The controller 109 may control the water supply pump 52. The controller 109 may control on/off of the water supply pump 52, and control a flow rate of water flowed by the water supply pump 52. When the water supply pump 52 is turned on, water of the water tank 51 may flow in the water supply flow path 4 by passing through the water supply pump 52.

The controller 109 may control the water supply heater 53. The controller 109 may control on/off of the water supply heater 53, and control a temperature of the water supply heater 53. When the water supply heater 53 is turned on, water passing through the water supply pump 52 may be heated by the water supply heater 53 to flow in the water supply flow path 4.

The controller 109 may control the air injection pump 82. The controller 109 may control on/off of the air injection pump 82, and control a flow rate of air flowed by the air injection pump 82. When the air injection pump 82 is turned on, air passing through the air injection pump 82 may be injected into the air injection flow path 81, and flow in the water supply flow path 4 through the air injection flow path 81.

The controller 109 may control a temperature controller. In more detail, the controller 109 may control the refrigeration cycle apparatus 13 and the heater 14. The controller 109 may control on/off of the refrigeration cycle apparatus 13 and the heater 14, and control a temperature of the fermentation tank 112 heated or cooled by the refrigeration cycle apparatus 13 and the heater 14.

A case where the evaporator 134 is installed to be in contact with the fermentation tank 112 will be described as an example. If the compressor 131 of the refrigeration cycle apparatus 13 is operated, the temperature of the fermentation tank 112 may decrease as a heat exchange is performed between the evaporator 134 and the outer surface of the fermentation tank 112. On the other hand, when the heater 14 is turned on, the temperature of the fermentation tank 112 may increase as the heater 14 supplies heat to the outer surface of the fermentation tank 112.

The controller 109 may control the air pump 152. The controller 109 may control on/off of the air pump 152, and control the flow rate and direction of air flowing in the air supply flow path 154 by the air pump 152. If the air pump 152 is operated to supply air to the fermentation tank 112, the air passing through the air pump 152 may flow in the air supply flow path 154 to be injected into the fermentation tank 112. On the other hand, if the air pump 152 is operated to discharge air of the fermentation tank 112, the air in the fermentation tank 112 may be discharged through the air supply flow path 154.

Some of the components controllable by the controller 109 may be omitted, changed, or added within a range where those skilled in the art can invent with ease.

Figure 24:
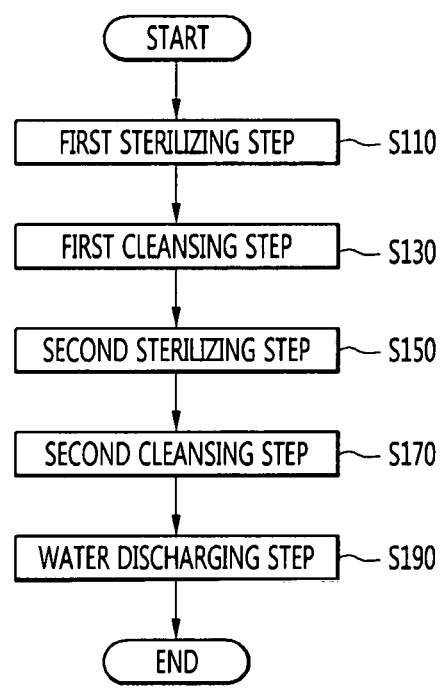
FIG. 24 is a flowchart illustrating an example of a control sequence of a cleansing and sterilizing step of the beverage maker according to some implementations.

FIG. 24 is a flowchart illustrating a control sequence of a cleansing and sterilizing step of the beverage maker according to some implementations.

A beverage brewing method of the beverage maker according to some implementations may include cleansing and sterilizing steps (S100 and S1300) of cleansing and sterilizing the flow paths and the supplier 3 in the beverage maker.

The cleansing and sterilizing steps (S100 and S1300) may be performed separately from the beverage brewing course. The cleansing and sterilizing step (S100) may be performed before the beverage brewing course is performed, and the cleansing and sterilizing step (S1300) may also be performed after the beverage brewing course is performed. Hereinafter, the cleansing and sterilizing step (S100) before the beverage brewing course will be described, and the cleansing and sterilizing step (S1300) after the beverage brewing course can be identically understood.

The user may input a cleansing and sterilizing command through the input unit or rotary knob 109A provided in the controller 100, the remote controller, the portable terminal, or the like.

The controller 109 may determine whether the cleansing and sterilizing command has been input. If the cleansing and sterilizing command is input, the cleansing and sterilizing command (S100) may be initiated. In addition, the cleansing and sterilizing step (S100) may be automatically initiated before the beverage brewing course.

In the cleansing and sterilizing step (S100), materials may not be accommodated in the material accommodation part. That is, the first, second, and third capsules C1, C2, and C3 may not be accommodated in the first, second, and third capsule accommodation parts 31, 32, and 33, respectively. In addition, the beverage brewing pack 12 is not accommodated in the fermentation tank 112, but a sterilizing and cleansing pack (not shown) may be accommodated in the fermentation tank 112.

In the cleansing and sterilizing step (S100), the sterilizing and cleansing pack may be accommodated in the fermentation tank 112, instead of the beverage brewing pack 12. Water for performing cleansing and sterilization may be introduced into the sterilizing and cleansing pack. In addition, if the cleansing and sterilizing step (S100) is completed, the sterilizing and cleansing pack may be removed from the fermentation tank 112 by the user.

The controller 109 may control the beverage maker in the cleansing and sterilizing step (S100) using a preset program according to a switching state of the rotary switch 109B or a signal applied to the wireless communication element.

If the beverage maker is controlled in the cleansing and sterilizing step (S100), the controller 109 may display, on the display 109D, a state in which the beverage maker is currently controlled in the cleansing and sterilizing step (S100).

Referring to FIG. 24, the cleansing and sterilizing step (S100) may include a first sterilizing step (S110), a first cleansing step (S130), a second sterilizing step (S150), a second cleansing step (S170), and a water discharging step (S190). The steps may be sequentially performed.

In the cleansing and sterilizing step (S100), the second sterilizing step (S150), the second cleansing step (S170), the first sterilizing step (S110), the first cleansing step (S130), and the water discharging step (S190) may be sequentially performed. Only some steps among the first sterilizing step (S110), the first cleansing step (S130), the second sterilizing step (S150), the second cleansing step (S170), and the water discharging step (S190) may be performed.

In the first sterilizing step (S110), hot water heated by the water supply heater 53 may perform sterilization by flowing in the supplier 3, the bypass flow path 34, the main flow path 2, and the main flow path connecting part 115. Also, the hot water may perform the sterilization by being introduced into the sterilizing and cleansing pack through the main tube 220 and the main flow path part 230 of the fermentation tank cover 114 and the inner hollow part 430.

In the first cleansing step (S130), water at a normal temperature may perform cleansing by flowing in the supplier 3, the bypass flow path 34, the main flow path 2, and the main flow path connecting part 115. Also, the water may perform the cleansing by being introduced into the sterilizing and cleansing pack through the main tube 220 and the main flow path part 230 of the fermentation tank cover 114 and the inner hollow part 430. In addition, the sterilizing and cleansing pack may be compressed by the air pump 152 such that the water in the sterilizing and cleansing pack is discharged to the outside of the beverage maker through the gas extraction flow path 71.

In the second sterilizing step (S150), hot water heated by the water supply heater 53 may perform sterilization by flowing in the supplier 3, the bypass flow path 34, and the main flow path 2. Also, the hot water may perform the sterilization by being discharged to the beverage extraction valve through the beverage extraction flow path 61.

In the second cleansing step (S170), water at the normal temperature may perform cleansing by flowing in the supplier 3, the bypass flow path 34, and the main flow path 2. Also, the water may perform the cleansing by being discharged to the beverage extraction valve 62 through the beverage extraction flow path 61.

In the water discharging step (S190), air flowed in the water supply flow path 4 by the air injection pump 82 may remove water remaining in a sterilizing and cleansing process by flowing in the supplier 3, the bypass flow path 34, and the main flow path 2. The air flowing in the main flow path 2 may be discharged together with the remaining water to the beverage extraction valve 62 through the beverage extraction flow path 61. Alternatively, the air flowing in the main flow path 2 may be introduced together with the remaining water into the sterilizing and cleansing pack accommodated in the fermentation tank 112 by passing through the fermentation tank cover 114.

Figure 25:
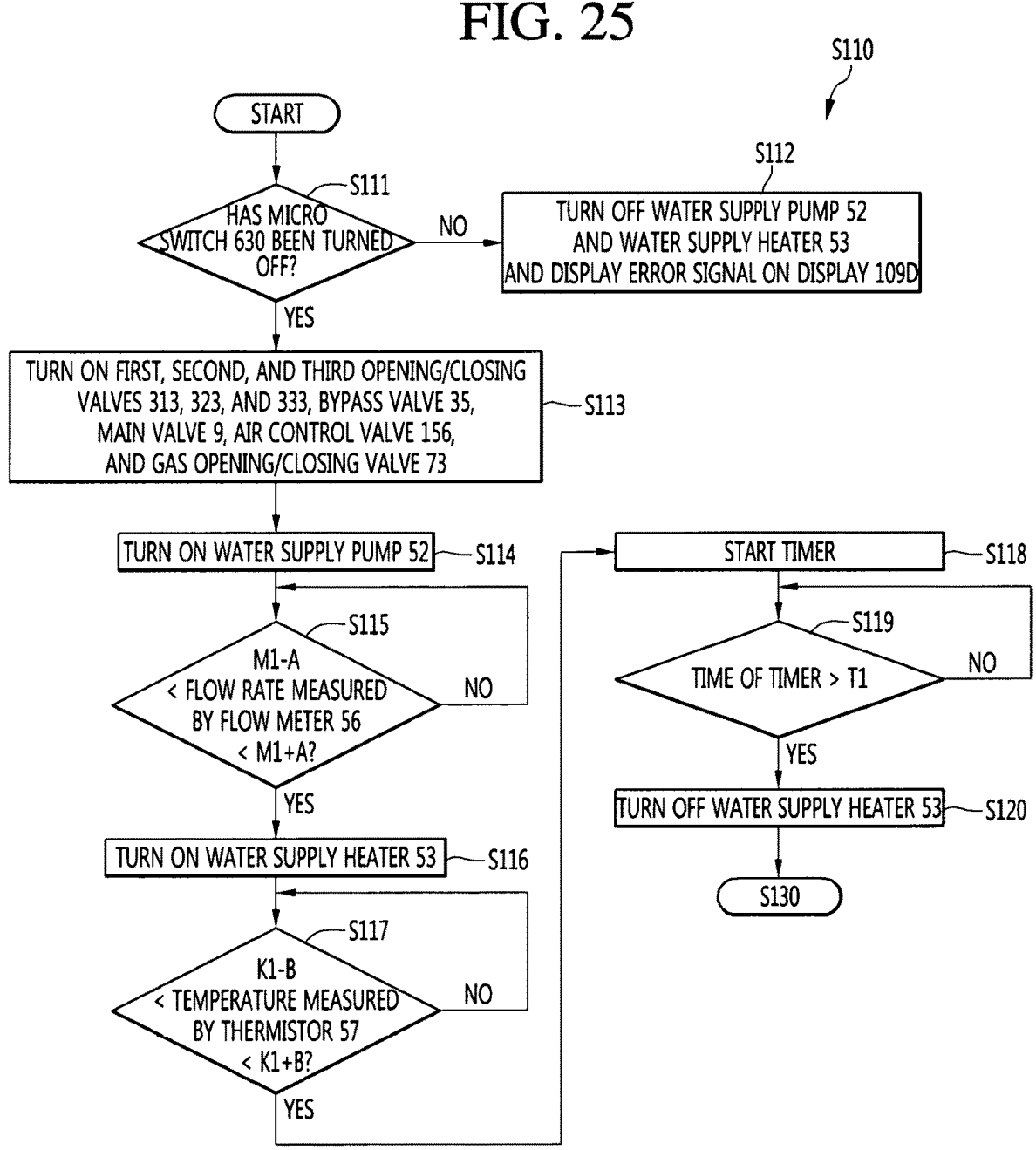
FIG. 25 is a flowchart illustrating an example of a detailed control sequence of a first sterilizing step shown in FIG. 24.

FIG. 25 is a flowchart illustrating a detailed control sequence of the first sterilizing step shown in FIG. 24.

Referring to FIG. 25, the controller 109 may initiate the first sterilizing step (S110). The first sterilizing step (S110) may include control steps (S111 to S120) which will be described later.

If the first sterilizing step (S110) is initiated, the controller 109 may determine whether the micro switch 630 of the beverage extraction valve 62 is in an off-state (S111).

If the micro switch 630 is turned on, the controller 109 may turn off the water supply pump 52 and the water supply heater 53. Simultaneously, the controller 109 may display an error signal on the display 109D (S112).

If the water supply pump 52 and the water supply heater 53 had been previously in the off-state, the water supply pump 52 and the water supply heater 53 may continuously maintain the off-state.

The error signal may include a notification that the beverage extraction valve 62 is to be closed. Alternatively, the error signal may include a notification that the rotating lever 620 is to be returned to the original position.

If the user returns the rotating lever 620 to the original position by viewing the error signal displayed on the display 109D, the lifting valve body 610 included in the beverage extraction valve 62 may move down, and the manipulating projection 614 protruding as the lifting valve body 610 moves down may be separated from the micro switch 630.

That is, if the user returns the rotating lever 620 to the original position, the micro switch 630 may be turned off as the manipulating projection 612 being in contact therewith is separated, and the controller 109 may detect that the micro switch 630 has been turned off.

In the entire first sterilizing step (S110), if the micro switch 630 is turned on, the controller 109 may turn off the water supply pump 52 and the water supply heater 53. This is because, if the micro switch 630 is turned on, hot water is discharged to the beverage extractor 6. Simultaneously, the controller 109 may display an error signal on the display 109D.

Meanwhile, the micro switch 630 is turned off, the controller 109 may turn on the first, second, and third opening/closing valves 313, 323, and 333, the bypass valve 35, the main valve 9, the air control valve 156, and the gas opening/closing valve 73 (S113).

If the first, second, and third opening/closing valves 313, 323, and 333, the bypass valve 35, the main valve 9, the air control valve 156, and the gas opening/closing valve 73 had been previously in an on-state, the controller 109 may maintain the on-state of the first, second, and third opening/closing valves 313, 323, and 333, the bypass valve 35, the main valve 9, the air control valve 156, and the gas opening/closing valve 73.

When the first, second, and third opening/closing valves 313, 323, and 333 are turned on, water flowing in the water supply flow path 4 may flow in the main flow path 2 by passing through the first, second, and third capsule accommodation parts 31, 32, and 33 as the material accommodation parts of the supplier 3.

When the bypass valve 35 is turned on, the water flowing in the water supply flow path 4 may flow in the main flow path 2 through the bypass flow path 34.

When the main valve 9 is turned on, water flowing in the main flow path 2 may be introduced into the fermentation tank 112 through the main flow path connecting part 115.

When the air control valve 156 is turned on, the pressure in the fermentation tank 112 may be constantly maintained. Therefore, if water is introduced into the sterilizing and cleansing pack accommodated in the fermentation tank 112, the sterilizing and cleansing pack may be unfolded or expanded to swell.

When the gas opening/closing valve 73 is turned on, steam caused by hot water introduced into the sterilizing and cleansing pack may flow in the gas extraction flow path 71, so that the pressure in the sterilizing and cleansing pack can be constantly maintained.

The controller 109 may turn on the water supply pump 52 (S114).

When the water supply pump 52 is turned on, water of the water tank 51 may be discharged from the water tank 51 to pass through the water supply pump 52. The water flowed by the water supply pump 52 may be introduced into the water supply flow path 4 by passing through the water supply heater 53.

The controller 109 may determine whether a flow rate measured by the flow meter 56 is within an error range of a first set flow rate M1 (S115). In this case, the error range may mean a predetermined numerical value range (between M1−a and M1+a) based on the first set flow rate M1.

The first set flow rate M1 is preferably 0.2 LPM.

The flow meter 56 that measures a flow rate of the water supply pump outlet flow path 55 may be installed in the water supply pump outlet flow path 55. The flow meter 56 may measure a flow rate of water introduced into the water supply heater 53.

If the flow rate measured by the flow meter 56 is greater by a predetermined numerical vale "a" or more than the first set flow rate M1, the controller 109 may control a number of revolutions of the water supply pump 52 to be decreased. If the flow rate measured by the flow meter 56 is smaller by the predetermined numerical value "a" or more than the first set flow rate M1, the controller 109 may control the number of revolutions of the water supply pump 52 to be increased.

If the flow rate measured by the flow meter 56 is within the error range of the first set flow rate M1, the controller 109 may turn on the water supply heater 53 (S116).

When the water supply heater 53 is turned on, water of the water tank 51 may be discharged from the water tank 51 to pass through the water supply pump 52, and flow in the water supply heater 53 to be heated by the water supply heater 53. The water (i.e., hot water) heated by the water supply heater 53 may flow in the bypass flow path 34, the first capsule accommodation part 31, the second capsule accommodation part 32, and the third capsule accommodation part 33 through the water supply flow path 4. The hot water flowing in the bypass flow path 34, the first capsule accommodation part 31, the second capsule accommodation part 32, and the third capsule accommodation part 33 may flow in the main flow path 2, and be introduced into the fermentation tank 112 through the main flow path connecting part 115. In more detail, the hot water flowing in the main flow path 2 may be introduced into the sterilizing and cleansing pack by passing through the main tube 220 and the main flow path part 230 of the fermentation tank cover 114 and the inner hollow part 430.

In the above-described control, the water supply flow path 4, the bypass flow path 34, the first capsule accommodation part 31, the second capsule accommodation part 32, the third capsule accommodation part 33, the main flow path 2, the main flow path connecting part 115, the main tube 220, the main flow path part 230, and the inner hollow part 430 may be sterilized by the hot water heated by the water supply heater 53.

The controller 109 may determine whether a temperature measured by the thermistor 57 is within an error range of a first set temperature K1 (S117). In this case, the error range may mean a predetermined numerical value range (between K1−b and K1+b) based on the first set temperature K1.

The first set temperature is preferably 70° C.

The thermistor 57 may be installed in at least one of the water supply heater 53 and the water supply flow path 4, and measure a temperature of water passing through the water supply heater 53.

If the temperature measured by the thermistor 57 is higher by a predetermined numerical value "b" or more than the first set temperature K1, the controller 109 may control a caloric value of the water supply heater 53 to be decreased. If the temperature measured by the thermistor 57 is lower by the predetermined numerical value "b" or more than the first set temperature K1, the controller 109 may control the caloric value of the water supply heater 53 to be increased.

If the temperature measured by the thermistor 57 is within the error range of the first set temperature K1, the controller 109 may start a timer (S118).

The controller 109 may determine whether a time of the timer has exceeded a first set time t1 (S119).

Until before the time of the timer reaches the first set time t1, the water supply flow path 4, the bypass flow path 34, the first, second, and third capsule accommodation parts 31, 32, and 33, the main flow path 2, the main flow path connecting part 115, the main tube 220, the main flow path part 230, and the inner hollow part 430 may be continuously sterilized by the hot water heated by the water supply heater 53.

If the time of the timer exceeds the first set time t1, the controller may turn off the water supply heater 53 (S120). The timer may be ended. Accordingly, the first sterilizing step (S110) may be completed, and the first cleansing step (S130) may be initiated.

Figure 26:
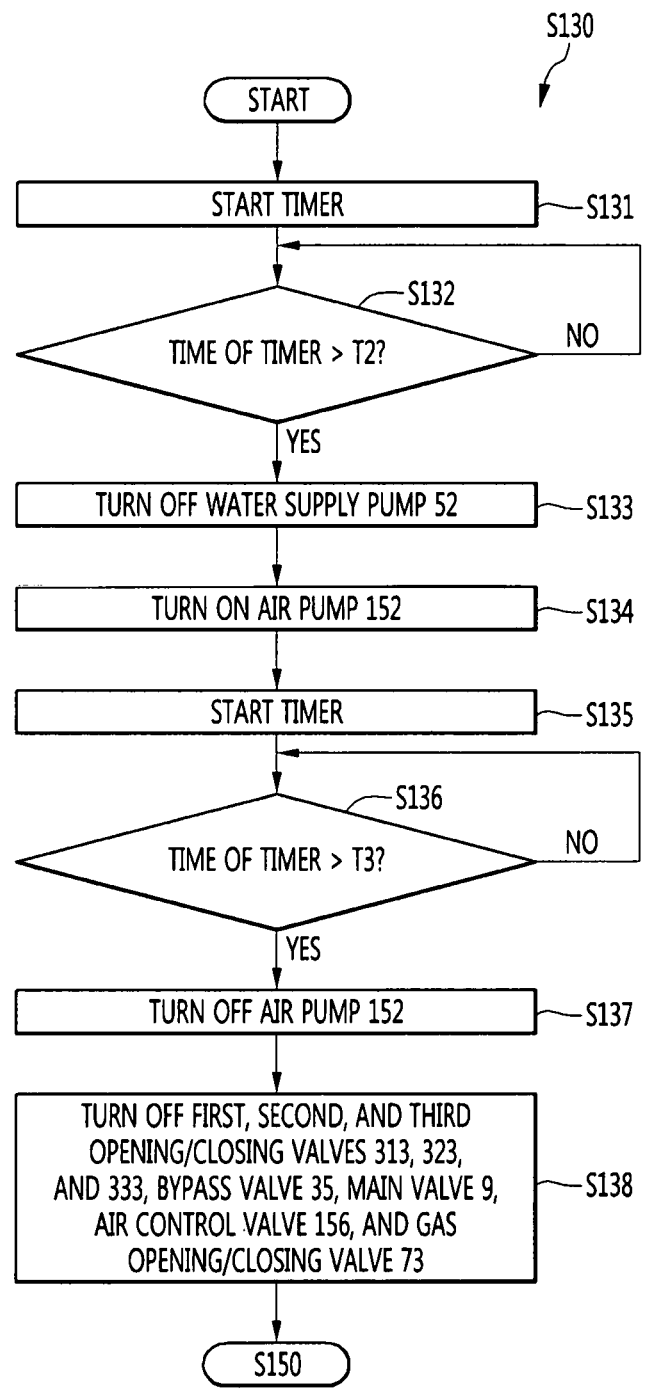
FIG. 26 is a flowchart illustrating an example of a detailed control sequence of a first cleansing step shown in FIG. 24.

FIG. 26 is a flowchart illustrating a detailed control sequence of the first cleansing step shown in FIG. 24.

Referring to FIG. 26, the controller 109 may initiate the first cleansing step (S130). The first cleansing step (S130) may include control steps (S131 to S138) which will be described later.

If the first cleansing step (S130) is initiated, the controller 109 may start the timer (S131).

Currently, the water supply pump 52 may be turned on, and the water supply heater 53 may be turned off. Therefore, water of the water tank 51 may be discharged from the water tank 51 to pass through the water supply pump 52, and flow in the water supply flow path 4 by passing through the water supply heater 53. In this case, since the water supply heater 53 is turned off, the water flowing in the water supply flow path 4 may be water at the normal temperature, which is not heated.

The water flowing in the water supply flow path 4 may flow in the bypass flow path 34, the first capsule accommodation part 31, the second capsule accommodation part 32, and the third capsule accommodation part 33. The water flowing in the bypass flow path 34, the first capsule accommodation part 31, the second capsule accommodation part 32, and the third capsule accommodation part 33 may flow in the main flow path 2, and be introduced into the fermentation tank 112 through the main flow path connecting part 115. In more detail, the water flowing in the main flow path 2 may be introduced into the sterilizing and cleansing pack by passing through the main tube 220 and the main flow part 230 of the fermentation tank cover 114 and the inner hollow part 430.

In the above-described control, the water supply path 4, the bypass flow path 34, the first capsule accommodation part 31, the second capsule accommodation part 32, the third capsule accommodation part 33, the main flow path 2, the main flow path connecting part 115, the main tube 220, the main flow path part 230, and the inner hollow part 430 may be cleansed by the water at the normal temperature.

The controller 109 may determine whether a time of the timer has exceeded a second set time t2 (S132).

Until before the time of the timer reaches the second set time t2, the water supply path 4, the bypass flow path 34, the first, second, and third capsule accommodation parts 31, 32, and 33, the main flow path 2, the main flow path connecting part 115, the main tube 220, the main flow path part 230, and the inner hollow part 430 may be continuously cleansed.

If the time of the timer exceeds the second set time t2, the controller 109 may turn off the water supply pump 52 (S133). The timer may be ended.

The controller 109 may turn on the air pump 152 (S134).

Water performing sterilization and cleansing may be in a state in which the water is accommodated in the sterilizing and cleansing pack. In this case, the air pump 152 may increase the pressure in the fermentation tank 112 by supplying air to the inside of the fermentation tank 112 through the air supply flow path 154. Therefore, the sterilizing and cleansing pack may be compressed by a pressure difference. If the sterilizing and cleansing pack is compressed, the water accommodated in the sterilizing and cleansing pack may be discharged to the outside of the beverage maker through the gas extraction flow path 71.

The controller 109 may start the timer (S135).

The controller 109 may determine whether a time of the timer has exceeded a third set time t3 (S136).

Until before the time of the timer exceeds the third set time t3, the sterilizing and cleansing pack may be continuously compressed as the air pump 152 is operated.

If the time of the timer exceeds the third set time t3, the controller 109 may turn off the air pump 152 (S137). The timer may be ended. After that, the user may remove the empty sterilizing and cleansing pack from the fermentation tank 112.

The controller 109 may turn off the first, second, and third opening/closing valves 313, 323, and 333, the bypass valve 35, the main valve 9, the air control valve 156, and the gas opening/closing valve 73 (S138).

Accordingly, the first cleansing step (S130) may be completed.

However, the steps (S134 to S137) of removing the water from the sterilizing and cleansing pack may not be included in the first cleansing step (S130). After that, the user may remove the sterilizing and cleansing pack containing water.

Figure 27:
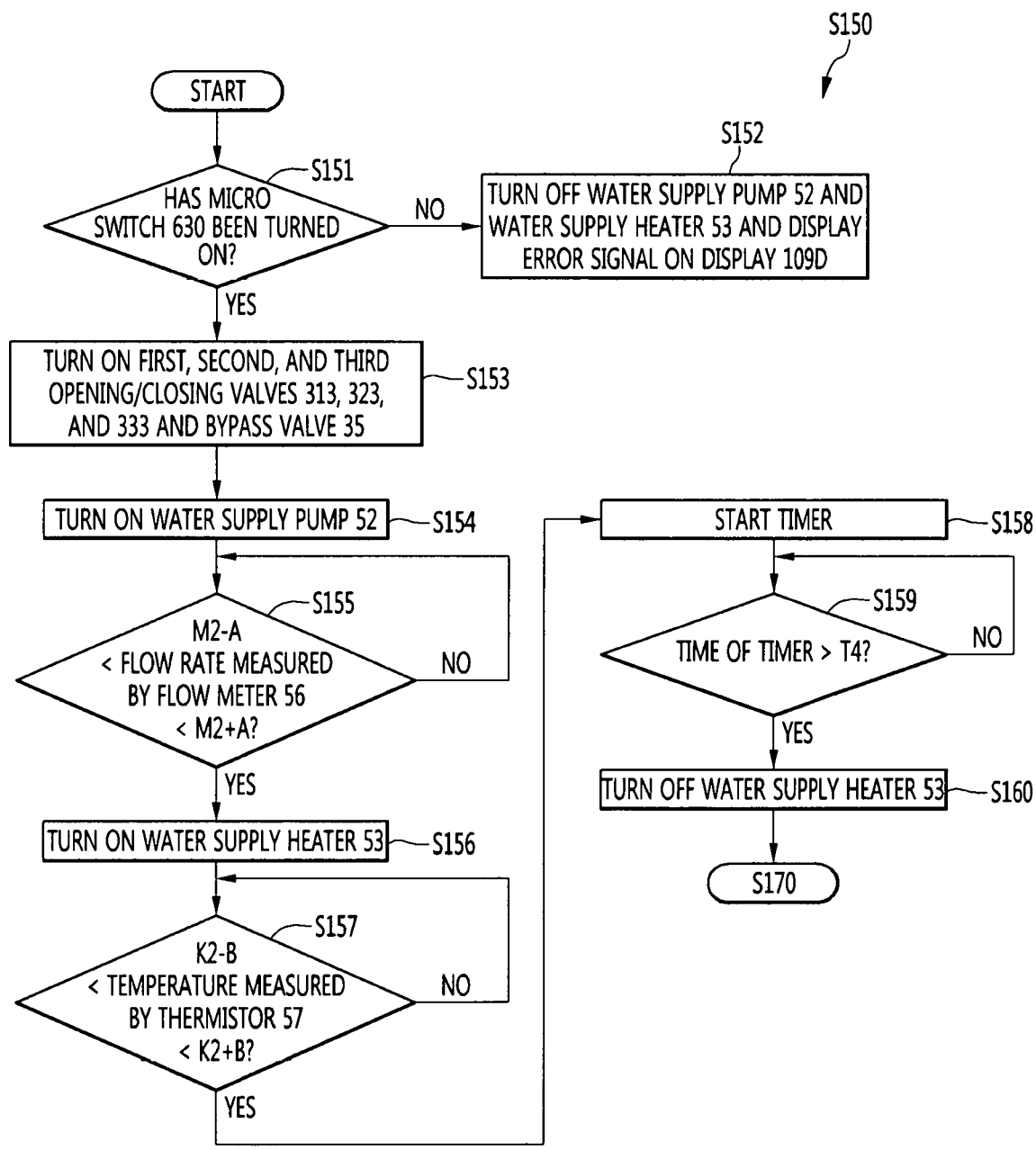
FIG. 27 is a flowchart illustrating an example of a detailed control sequence of a second sterilizing step shown in FIG. 24.

FIG. 27 is a flowchart illustrating a detailed control sequence of the second sterilizing step shown in FIG. 24.

Referring to FIG. 27, the controller 109 may initiate the second sterilizing step (S150). The second sterilizing step (S150) may include control steps (S151 to S160) which will be described later.

Hereinafter, descriptions of contents overlapping with those of the above-described first sterilizing step (S110) are omitted, and differences from the above-described first sterilizing step (S110) will be mainly described.

If the second sterilizing step (S150) is initiated, the controller 109 may determine whether the micro switch 630 of the beverage extraction valve 62 is in the on-state (S151).

If the micro switch 630 is turned off, the controller 109 may turn off the water supply pump 52 and the water supply heater 53. Simultaneously, the controller 109 may display an error signal on the display 109D (S152).

The error signal may include a notification that the beverage extraction valve 62 is to be opened. Alternatively, the error signal may include a notification that the rotating lever 620 is to be pulled.

If the user pulls the rotating lever 620 by viewing the error signal displayed on the display 109D, the lifting valve body 610 included in the beverage extraction valve 62 may move up, and the manipulating projection 612 may be in contact with the micro switch 630 as the lifting valve body 610 moves up.

That is, if the user pulls the rotating lever 620, the manipulating projection 612 may be in contact with the micro switch 630 to be turned on, and the controller 109 may detect that the micro switch 630 has been turned on.

In the entire second sterilizing step (S150), if the micro switch 630 is turned off, the controller 109 may turn off the water supply pump 52 and the water supply heater 53. This is because, if the micro switch 630 is turned off, hot water cannot be discharged to the beverage extractor 6. Simultaneously, the controller 109 may display an error signal on the display 109D.

Meanwhile, if the micro switch 630 is turned on, the controller 109 may turn on the first, second, and third opening/closing valves 313, 323, and 333 and the bypass valve 35 (S153). The main valve 9, the air control valve 156, and the gas opening/closing valve 73 may maintain the off-state.

Since the main valve 9 is in the off-state and the beverage extraction valve 62 is in the on-state, water flowing in the main flow path 2 cannot be introduced into the fermentation tank 112, and may flow in the beverage extraction flow path 61 to be discharged to the outside of the beverage maker through the beverage extraction valve 62.

The controller 109 may turn on the water supply pump 52 (S154).

The controller 109 may determine whether a flow rate measured by the flow meter 56 is within an error range of a second set flow rate M2 (S155). In this case, the error range may mean a predetermined numerical value range (e.g., between a value M2−a and a value M2+a) based on the second set flow rate M2.

The second set flow rate is preferably 0.2 LPM.

If the flow rate measured by the flow meter 56 is greater by a predetermined numerical value "a" or more than the second set flow rate M2, the controller 109 may control a number of revolutions of the water supply pump 52 to be decreased. If the flow rate measured by the flow meter 56 is smaller by the predetermined numerical value "a" or more than the second set flow rate M2, the controller 109 may control the number of revolutions of the water supply pump 52 to be increased.

If the flow rate measured by the flow meter 56 is within the error range of the second set flow rate M2, the controller 109 may turn on the water supply heater 53 (S156).

When the water supply heater 53 is turned on, water (i.e., hot water) heated by the water supply heater 53 may flow in the bypass flow path 34, the first capsule accommodation part 31, the second capsule accommodation part 32, and the third capsule accommodation part 33 through the water supply flow path 4. The hot water flowing in the bypass flow path 34, the first capsule accommodation part 31, the second capsule accommodation part 32, and the third capsule accommodation part 33 may flow in the main flow path 2. The hot water flowing in the main flow path 2 may flow in the beverage extraction flow path 61, and be discharged to the outside of the beverage maker through the beverage extraction valve 62.

In the above-described control, the water supply flow path 4, the bypass flow path 34, the first capsule accommodation part 31, the second capsule accommodation part 32, the third capsule accommodation part 33, the main flow path 2, the beverage extraction flow path 61, and the beverage extraction valve 62 may be sterilized by the hot water heated by the water supply heater 53.

The controller 109 may determine whether a temperature measured by the thermistor 57 is within an error range of a second set temperature K2 (S157). In this case, the error range may mean a predetermined numerical value range (between K2−b and K2+b) based on the second set temperature K2.

The second set temperature K2 is preferably 70° C.

If the temperature measured by the thermistor 57 is higher by a predetermined numerical value "b" or more than the second set temperature K2, the controller 109 may control a caloric value of the water supply heater 53 to be decreased. If the temperature measured by the thermistor 57 is lower by the predetermined numerical value "b" or more than the second set temperature K2, the controller 109 may control the caloric value of the water supply heater 53 to be increased.

If the temperature measured by the thermistor 57 is within the error range of the second set temperature K2, the controller 109 may start the timer (S158).

The controller 109 may determine whether a time of the timer has exceeded a fourth set time t4 (S159).

Until before the time of the timer reaches the fourth set time t4, the water supply flow path 4, the bypass flow path 34, the first, second, and third capsule accommodation parts 31, 32, and 33, the main flow path 2, the beverage extraction flow path 61, and the beverage extraction valve 62 may be continuously sterilized by the hot water heated by the water supply heater 53.

If the time of the timer exceeds the fourth set time t4, the controller 109 may turn off the water supply heater 53

(S160). The timer may be ended. Accordingly, the second sterilizing step (S150) may be completed, and the second cleansing step (S170) may be initiated.

Figure 28:
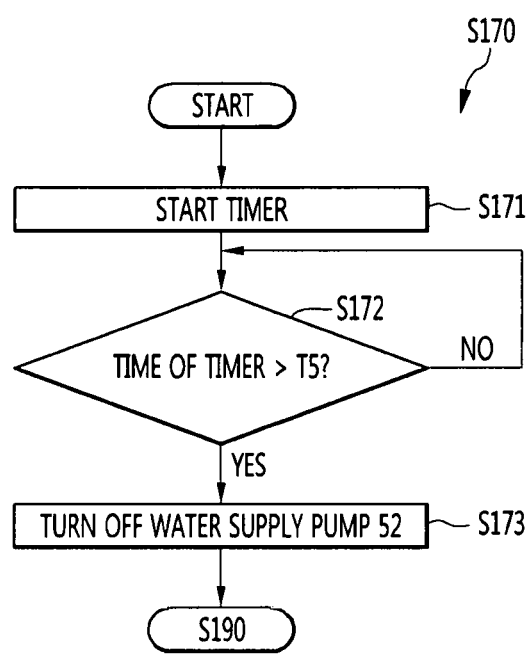
FIG. 28 is a flowchart illustrating an example of a detailed control sequence of a second cleansing step shown in FIG. 24.

FIG. 28 is a flowchart illustrating a detailed control sequence of the second cleansing step shown in FIG. 24.

Referring to FIG. 28, the controller 109 may initiate the second cleansing step (S170). The second cleansing step (S170) may include control steps (S171 to S173) which will be described later.

Hereinafter, descriptions of contents overlapping with those of the above-described first cleansing step (S130) are omitted, and differences from the above-described first cleansing step (S130) will be mainly described.

If the second cleansing step (S170) is initiated, the controller 109 may start the timer (S171).

Currently, the water supply pump 52 may be in the on-state, and the water supply heater 53 may be in the off-state. Therefore, water of the water tank 51 may be discharged from the water tank 51 to pass through the water supply pump 52, and flow in the water supply flow path 4 by passing through the water supply heater 53. In this case, since the water supply heater 53 is turned off, the water flowing in the water supply flow path 4 may be water at the normal temperature.

The water flowing in the water supply path 4 may flow in the bypass flow path 34, the first capsule accommodation part 31, the second capsule accommodation part 32, and the third capsule accommodation part 33. The water flowing in the bypass flow path 34, the first capsule accommodation part 31, the second capsule accommodation part 32, and the third capsule accommodation part 33 may flow in the main flow path 2. The water flowing in the main flow path 2 may flow in the beverage extraction flow path 61, and be discharged to the outside of the beverage maker through the beverage extraction valve 62.

In the above-described control, the water supply flow path 4, the bypass flow path 34, the first capsule accommodation part 31, the second capsule accommodation part 32, the third capsule accommodation part 33, the main flow path 2, the beverage extraction flow path 61, and the beverage extraction valve 62 may be cleansed by the water at the normal temperature.

The controller 109 may determine whether a time of the timer has exceeded a fifth set time t5 (S172).

Until before the time of the timer reaches the fifth set time t5, the water supply flow path 4, the bypass flow path 34, the first capsule accommodation part 31, the second capsule accommodation part 32, the third capsule accommodation part 33, the main flow path 2, the beverage extraction flow path 61, and the beverage extraction valve 62 may be continuously cleansed.

If the time of the time exceeds the fifth set time t5, the controller 109 may turn off the water supply pump 52 (S173). The timer may be ended.

Accordingly, the second cleansing step (S170) may be completed, and the water discharging step (S190) may be initiated.

Figure 29:
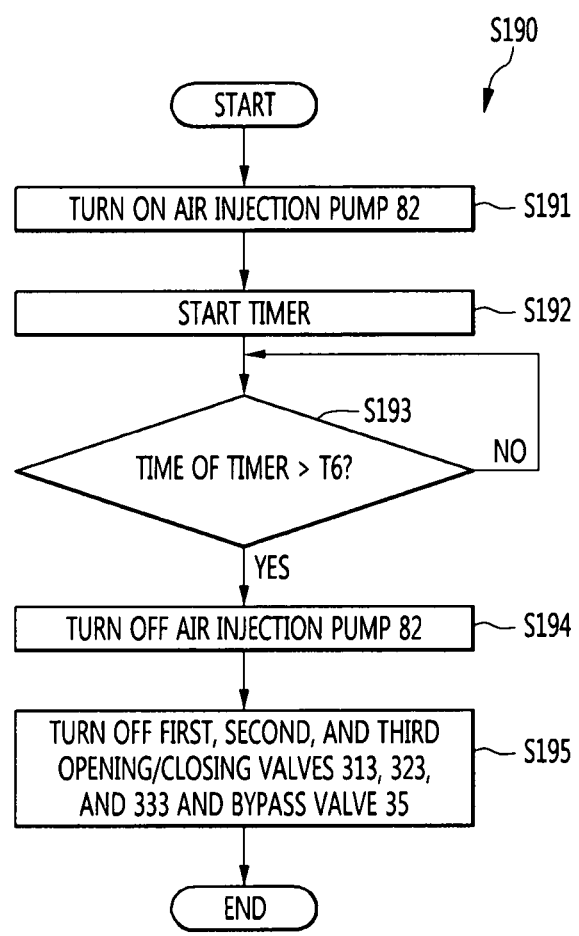
FIG. 29 is a flowchart illustrating an example of a control sequence according to a first implementation of a water discharging step shown in FIG. 24.

FIG. 29 is a flowchart illustrating a control sequence according to a first implementation of the water discharging step shown in FIG. 24.

Referring to FIG. 29, the controller 109 may initiate the water discharging step (S190).

If the water discharging step (S190) according to this implementation is initiated, the controller 109 may turn on the air injection pump 82 (S191).

Currently, the beverage extraction valve 62 may be in the on-state, and the first, second, and third opening/closing valves 313, 323, and 333 and the bypass valve 35 may be in the on-state. In addition, the main valve 9 may be in the off-state.

Therefore, air injected by the air injection pump 82 to be introduced into the water supply flow path 4 may flow in the bypass flow path 34, the first capsule accommodation part 31, the second capsule accommodation part 32, and the third capsule accommodation part 33. The air flowing in the bypass flow path 34, the first capsule accommodation part 31, the second capsule accommodation part 32, and the third capsule accommodation part 33 may flow in the main flow path 2. The air flowing in the main flow path 2 may flow in the beverage extraction flow path 61, and be discharged to the outside of the beverage maker through the beverage extraction valve 62.

In the above-described control, water remaining in the water supply flow path 4, the bypass flow path 34, the first capsule accommodation part 31, the second capsule accommodation part 32, the third capsule accommodation part 33, the main flow path 2, the beverage extraction flow path 61, and the beverage extraction valve 62 may be discharged together with the air to the outside of the beverage maker. That is, the remaining water in the beverage maker may be removed.

The controller 109 may start the timer (S192).

The controller 109 may determine whether a time of the timer has exceeded a sixth set time t6 (S193).

Until before the time of the timer reaches the sixth set time t6, the air injected by the air injection pump 82 may remove remaining water while flowing along the water supply flow path 4, the bypass flow path 34, the first, second, and third capsule accommodation parts 31, 32, and 33, the main flow path 2, the beverage extraction flow path 61, and the beverage extraction valve 62.

If the time of the time exceeds the sixth set time t6, the controller 109 may turn off the air injection pump 82 (S194). The timer may be ended.

The controller 109 may turn off the first, second, and third opening/closing valves 313, 323, and 333 and the bypass valve 35 (S195). Accordingly, the water discharging step (S190) may be completed, and simultaneously, the cleansing and sterilizing step (S100) may be completed.

The controller 109 may display, on the display 109D, that the cleansing and sterilizing step (S100) has been completed.

Figure 30:
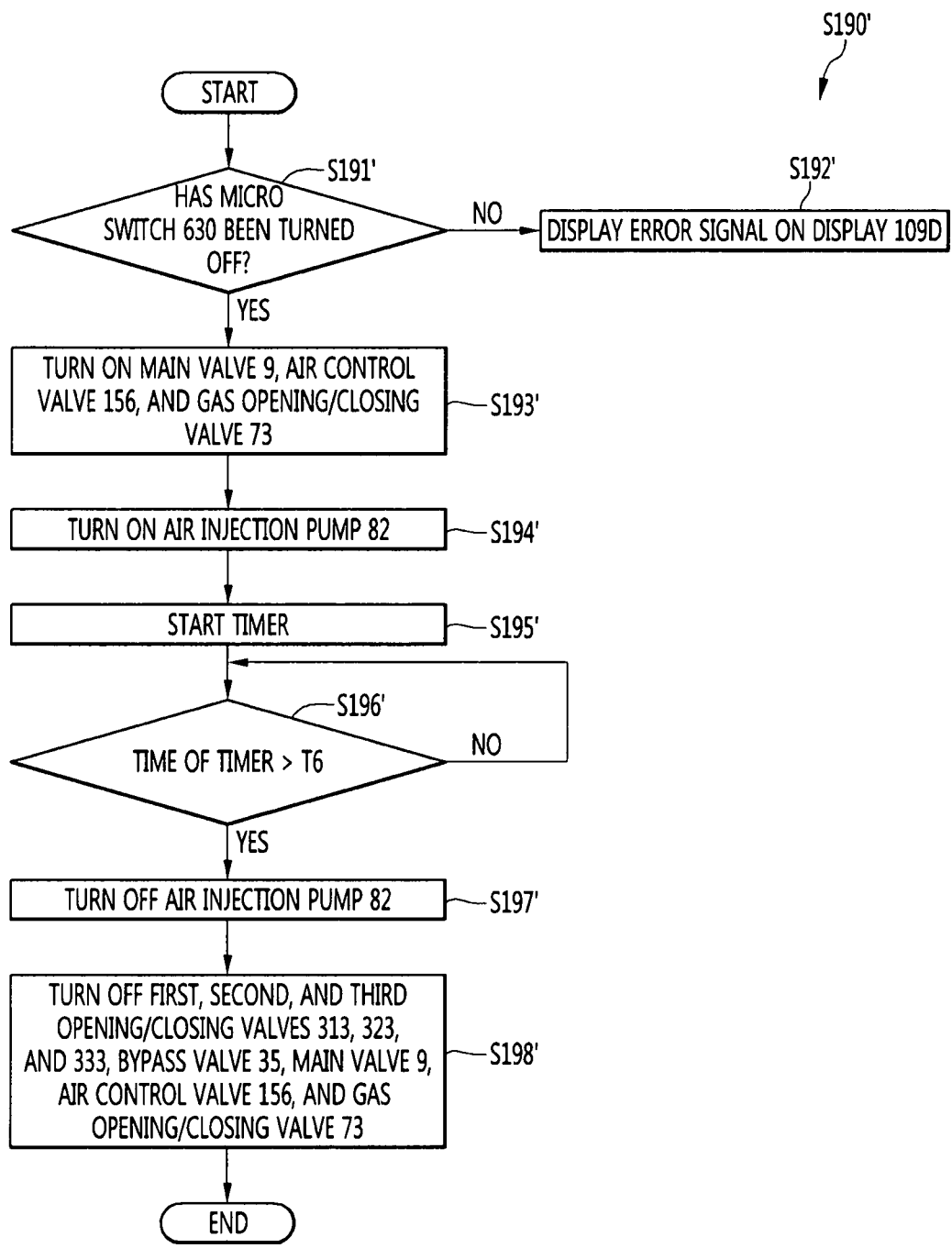
FIG. 30 is a flowchart illustrating an example of a control sequence according to a second implementation of the water discharging step shown in FIG. 24.

FIG. 30 is a flowchart illustrating a control sequence according to a second implementation of the water discharging step shown in FIG. 24.

Hereinafter, descriptions of contents overlapping with those of the first implementation (S190) of the water discharging step are omitted, and differences from the first implementation (S190) of the water discharging step will be mainly described.

Referring to FIG. 30, the controller 109 may initiate the water discharging step (S190').

If the water discharging step (S190') according to this implementation is initiated, the controller 109 may determine whether the micro switch 630 of the beverage extraction valve 62 is in the off-state (S191').

If the micro switch 630 is turned on, the controller 109 may display an error signal on the display 109D (S192').

The error signal may include a notification that the beverage extraction valve 62 is to be closed. Alternatively, the error signal may include a notification that the rotating lever 620 is to be returned to the original position.

If the user returns the rotating lever 620 to the original position by viewing the error signal displayed on the display 109D, the lifting valve body 610 included in the beverage extraction valve 62 may move down, and the manipulating projection 612 may be separated from the micro switch 630 as the lifting valve body 610 moves down.

That is, if the user returns the rotating lever 620 to the original position, the micro switch 630 may be separated from the manipulating projection in contact therewith to be turned off, and the controller 109 may detect that the micro switch 630 has been turned off.

If the micro switch 630 is turned off, the controller 109 may turn on the main valve 9, the air control valve 156, and the gas opening/closing valve 73 (S193'). In addition, the first, second, and third opening/closing valves 313, 323, and 333 and the bypass valve 35 may maintain the on-state.

The controller 109 may turn on the air injection pump 82 (S194').

Air flowing in the water supply flow path 4 may flow in the bypass flow path 34, the first capsule accommodation part 31, the second capsule accommodation part 32, and the third capsule accommodation part 33. The air flowing in the bypass flow path 34, the first capsule accommodation part 31, the second capsule accommodation part 32, and the third capsule accommodation part 33 may flow in the main flow path 2, and be introduced into the fermentation tank 112 through the main flow path connecting part 115. In more detail, the air flowing in the main flow path 2 may be introduced into the sterilizing and cleansing pack by passing through the main tube 220 and the main flow path part 230 of the fermentation tank cover 114 and the inner hollow part 430.

In the above-described control, water remaining in the water supply path 4, the bypass flow path 34, the first capsule accommodation part 31, the second capsule accommodation part 32, the third capsule accommodation part 33, the main flow path 2, the main flow path connecting part 115, the main tube 220, the main flow path part 230, and the inner hollow part 430 may be introduced together with the air to the sterilizing and cleansing pack. That is, the remaining water in the beverage maker may be removed.

The controller 109 may start the timer (S195').

The controller 109 may determine whether a time of the timer has exceeded the sixth set time t6 (S196').

Until before the time of the timer reaches the sixth set time t6, the air injected by the air injection pump 82 may remove the remaining water while flowing along the water supply path 4, the bypass flow path 34, the first, second, and third capsule accommodation parts 31, 32, and 33, the main flow path 2, the main flow path connecting part 115, the main tube 220, the main flow path part 230, and the inner hollow part 430.

If the time of the timer exceeds the sixth set time t6, the controller 109 may turn off the air injection pump 82 (S197'). The timer may be ended.

The controller 109 may turn off the first, second, and third opening/closing valves 313, 323, and 333, the bypass valve 35, the main valve 9, the air control valve 156, and the gas opening/closing valve 73 (S198').

Figure 31:
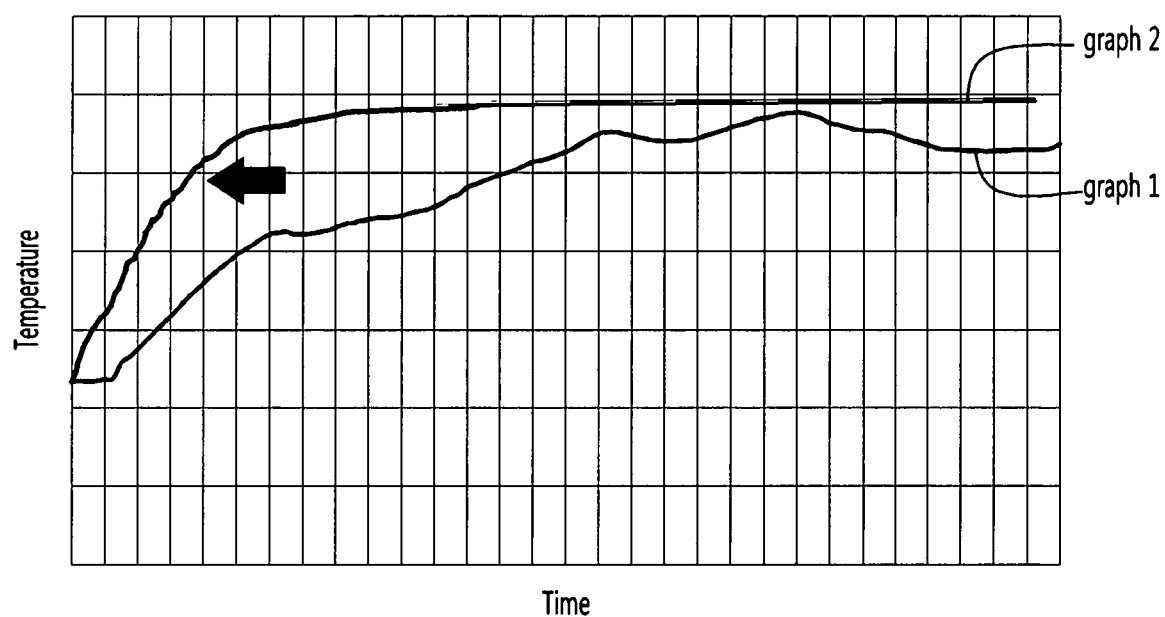
FIG. 31 is a graph illustrating an example of changes in temperature measured by a thermistor as a flow rate of a water supply pump is controlled.

FIG. 31 is a graph illustrating changes in temperature measured by the thermistor as a flow rate of the water supply pump is controlled.

Referring to FIG. 31, the controller 109 may control the temperature of hot water heated by the water supply heater 53 by controlling the number of revolutions of the water supply pump 52 in the sterilizing and cleansing step (S100).

Graph 1 shown in FIG. 31 is a graph illustrating changes in temperature of hot water with respect to time when the water supply pump 52 and the water supply heater 53 are simultaneously turned on. Graph 2 shown in FIG. 31 is a graph illustrating changes in temperature of hot water with respect to time when the water supply pump 52 and the water supply heater 53 are sequentially turned on. Hereinafter, this will be described in detail.

In the first sterilizing step (S110) and the second sterilizing step (S150), as described above, the flow paths and the components in the beverage maker may be sterilized by hot water heated by the water supply heater 53. In this case, a desired sterilization effect may be generated only when the hot water is to have a sufficiently high temperature, and the sterilization is to be performed for a sufficiently long time.

The water flowed by the water supply pump 52 may be heated by passing through the water supply heater 53. In this case, if a flow speed of the water passing through the water supply heater 53 is excessively fast, a heating time is decreased, and hence, an increase in temperature of the water may be slowly performed.

Therefore, in order to decrease the time required to reach a desired temperature of hot water, preheating of the water supply heater 53 and the flow speed of water, caused by the number of revolutions of the water supply pump 52 may be gradually increased at an early stage in which heating is started.

To this end, the controller 109 may control the flow rate of water passing through the water supply heater 53 by turning on the water supply pump 52 and then controlling the number of revolutions of the water supply pump 52 (S115 and S155). After that, the water supply heater 53 may be turned on, thereby early reaching a desired set temperature (S117 and S157).

Accordingly, the amount of water used in the cleansing and sterilizing step (S100) can be minimized.

Some of the control steps of the cleansing and sterilizing step (S100 and S1300) may be replaced, changed, excluded, or added within a range in which those skilled in the art may easily modify the control steps.

Through the cleansing and sterilizing step (S100), the beverage maker according to the implementation can cleanse and sterilize the inside of the supplier and the flow paths. Further, as the cleansing and sterilizing step (S100) is performed before the beverage brewing course, beverage can be sanitarily brewed. Furthermore, as the cleansing and sterilizing step (S100) is performed even after the beverage brewing course, a clean state can be maintained even when the beverage maker is not used.

According to the present disclosure, water introduced into the water supply flow path flows in the supplier and the main flow path, so that the inside of the supplier and the flow paths can be cleansed and sterilized.

Further, cleansing and sterilization can be performed using only components required to brew beverage.

Further, the water flowing in the main flow path is introduced into the fermentation tank assembly, so that flow paths used when beverage is brewed can be cleansed and sterilized.

Further, the water flowing in the main flow path is discharged to the outside through the beverage extraction flow path, so that flow paths used when beverage is extracted can be sterilized and cleansed.

Meanwhile, the flow path including the main flow path 2, the water supply flow path 4, the beer extraction flow path 61, the gas extraction flow path 71, the air injection flow path 81, the air supply flow path 154, and the like, which are described in the present disclosure, may be formed a hose or tube through which a fluid can pass. The flow path may be configured with a plurality of hoses or tubes continued in the length direction thereof. The flow path may include two hoses or tubes disposed with another component such as a control valve, interposed therebetween.

The foregoing implementations are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A beverage-making method comprising:
   providing first ingredients contained in a first container to a second container via a first channel between the first container and the second container;
   regulating a fermentation process for a mixture of the first ingredients and second ingredients contained in the second container based on a temperature of the mixture to make a beverage;
   extracting the beverage from the second container via an extraction channel coupled to the second container; and
   providing a cleaning liquid to the first channel,
   wherein a part of the first channel merges with a part of the extraction channel to form a main flow channel that couples to the second container, and
   wherein providing the cleaning liquid to the first channel comprises:
      providing the cleaning liquid from the first container to the second container via a remaining part of the first channel and the main flow channel.

2. The beverage-making method of claim 1, wherein extracting the beverage from the second container via an extraction channel coupled to the second container comprises:
   extracting the beverage from the second container via the extraction channel by opening an extraction valve provided in the extraction channel.

3. A beverage-making method comprising:
   providing first ingredients contained in a first container to a second container via a first channel between the first container and the second container;
   regulating a fermentation process for a mixture of the first ingredients and second ingredients contained in the second container based on a temperature of the mixture to make a beverage;
   extracting the beverage from the second container via an extraction channel coupled to the second container; and
   providing a cleaning liquid to the first channel,
   wherein a part of the first channel merges with a part of the extraction channel to form a main flow channel that couples to the second container, and
   wherein providing the cleaning liquid to the first channel comprises:
      providing the cleaning liquid from the first container to outside via a remaining part of the first channel and a remaining part of the extraction channel.

4. The beverage-making method of claim 3, wherein extracting the beverage from the second container via an extraction channel coupled to the second container comprises:
   extracting the beverage from the second container via the extraction channel by opening an extraction valve provided in the extraction channel.

* * * * *